United States Patent
Kaku et al.

(10) Patent No.: US 6,831,112 B2
(45) Date of Patent: Dec. 14, 2004

(54) POLYETHER, ACTIVE-HYDROGEN INGREDIENT, RESIN-FORMING COMPOSITION, AND PROCESS FOR PRODUCING FOAM

(75) Inventors: Motonao Kaku, Kyoto (JP); Hidefumi Ohta, Kyoto (JP); Hideo Kitagawa, Kyoto (JP); Kenji Nishiyama, Kyoto (JP); Munekazu Satake, Kyoto (JP); Kunikiyo Yoshio, Kyoto (JP); Koji Tsutsui, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 10/148,225

(22) PCT Filed: Sep. 27, 2001

(86) PCT No.: PCT/JP01/08413

§ 371 (c)(1),
(2), (4) Date: May 24, 2002

(87) PCT Pub. No.: WO02/26864

PCT Pub. Date: Apr. 4, 2002

(65) Prior Publication Data

US 2003/0100623 A1 May 29, 2003

(30) Foreign Application Priority Data

| Sep. 28, 2000 | (JP) | 2000-297487 |
| Sep. 28, 2000 | (JP) | 2000-297534 |
| Nov. 2, 2000 | (JP) | 2000-336601 |
| Dec. 4, 2000 | (JP) | 2000-369177 |
| Mar. 28, 2001 | (JP) | 2001-094060 |
| Mar. 30, 2001 | (JP) | 2001-099503 |
| Apr. 10, 2001 | (JP) | 2001-111471 |
| Apr. 20, 2001 | (JP) | 2001-122065 |

(51) Int. Cl.$^7$ .......................................... C08G 18/28
(52) U.S. Cl. ................ 521/174; 521/137; 252/182.24; 252/182.27
(58) Field of Search ................. 521/137, 174; 252/182.24, 182.27

(56) References Cited

U.S. PATENT DOCUMENTS

| 3,265,641 A | | 8/1966 | Wismer et al. | |
| 3,393,243 A | | 7/1968 | Cuscurida et al. | |
| 4,125,505 A | | 11/1978 | Critchfield et al. | |
| 6,051,624 A | * | 4/2000 | Bastin et al. | 521/174 |
| 6,337,356 B1 | * | 1/2002 | Zaschke et al. | 521/174 |

FOREIGN PATENT DOCUMENTS

| EP | 1125961 A | 8/2001 |
| GB | 1120223 | 7/1968 |
| JP | 53-13700 A | 2/1978 |
| JP | 57-209920 A | 12/1982 |
| JP | 3-244632 A | 10/1991 |
| JP | 8-253547 A | 10/1996 |
| JP | 10-204171 A | 8/1998 |
| JP | 11-217431 A | 8/1999 |
| JP | 11-315138 | 11/1999 |
| JP | 2001-261813 | 9/2001 |

* cited by examiner

Primary Examiner—John M. Cooney
(74) Attorney, Agent, or Firm—Merchant & Gould P.C.

(57) ABSTRACT

The present invention relates to polyether compounds, active hydrogen compounds and resin-forming compositions composed of the polyols, and methods for producing foams by employing the active hydrogen components. These polyether compounds have a decreased number of moles of added EO thereby maintaining the hydrophobicity and have sufficient reactivity as polyol components of resins, thereby having high reaction rates. Therefore, it is possible to provide resins having excellent resin properties (tensile strength, flexural strength, water-absorption swelling ratio, etc.).

35 Claims, 5 Drawing Sheets

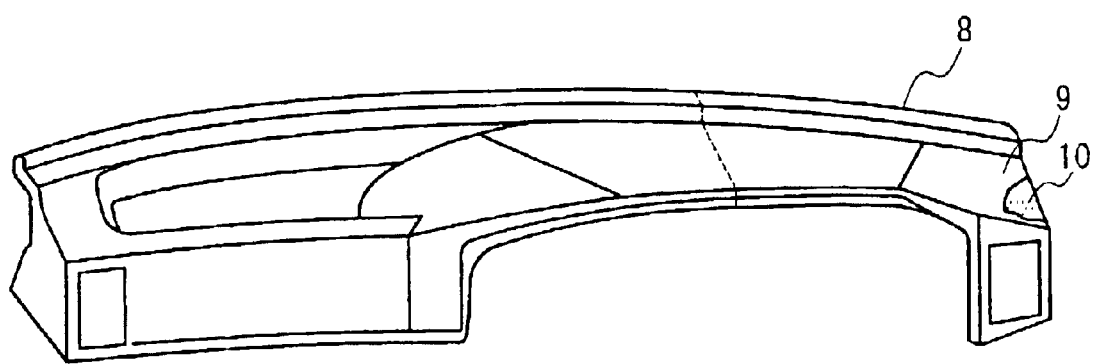
F I G. 5
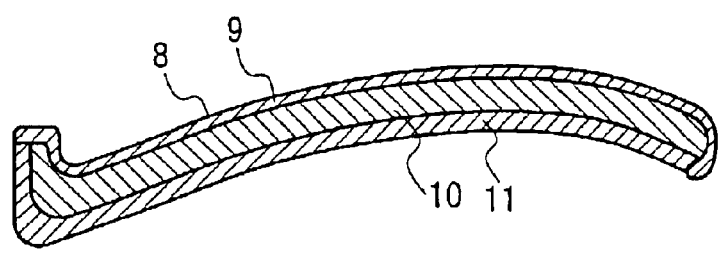
F I G. 6

POLYETHER, ACTIVE-HYDROGEN INGREDIENT, RESIN-FORMING COMPOSITION, AND PROCESS FOR PRODUCING FOAM

TECHNICAL FIELD

The present invention relates to a novel polyether compound, an active hydrogen component comprising the polyether, a resin-forming composition employing the polyether or the active hydrogen component, a method for producing a foam (particularly, polyurethane foam) employing the polyether or the active hydrogen component, and a method for producing the active hydrogen component and the foam, employing a polyether having a higher primary hydroxyl content of terminal hydroxyl groups. More specifically, it relates to a polyether having a higher primary hydroxyl content of terminal hydroxyl groups, and to the use of the same.

BACKGROUND ART

<Polyether and Resin Composition>

Polyethers such as polyoxyalkylene polyols, which are obtained by a ring-opening reaction of monoepoxides such as alkylene oxides (hereinafter abbreviated as AO) with active hydrogen compounds, are widely used as resin materials for polyurethane, polyester, etc., surfactants, lubricants, and for other various purposes. Particularly, the use of various kinds of polyether compounds has been considered conventionally for a purpose of applying flexibility, softness, low-temperature rubber-like elasticity, and other characteristics to aromatic polyester resins, unsaturated polyester resins, thermoplastic polyester elastomers, thermosetting urethane resins, thermoplastic polyurethane elastomers, and acrylic resins. It has been known that, as the polyether compounds, polyether compounds having side chains, such as propylene oxide (hereinafter abbreviated as PO) adducts of glycerin or polypropylene glycol, for instance, are highly effective, and generally, they are obtained by ring-opening addition polymerization of PO with hydroxyl-group-containing compounds such as glycerin or propylene glycol in the presence of alkaline catalysts.

However, in the case where ring-opening-polymerization products made of only PO by the foregoing method are used, most of the hydroxyl groups at terminals are secondary hydroxyl groups, and normally, primary hydroxyl groups are present at only less than 5% of the terminals. This results in an excessively low reactivity of polyether compounds, and it takes a significantly long time to obtain a reaction ratio that allows inherent properties to be exhibited, which is not practical. To solve such a problem, polyethers in which a primary hydroxyl content of terminal hydroxyl groups is increased often are used, which are obtained by the foregoing ring-opening addition polymerization of PO followed by ring-opening addition polymerization of ethylene oxide (hereinafter abbreviated as EO).

However, such polyethers obtained by addition polymerization of much EO at terminals have increased hydrophilicity, and therefore, cured resins employing these, which are used in moldings, adhesives, paints, films, etc., exhibit undesirable properties such as increasing of water-absorbing properties, impairment of waterproofness, etc. As a result, they are used only for limited purposes.

Therefore, in light of the aforementioned situations, one of the objects of the present invention is to provide polyether compounds suitable as polyol components having sufficient reactivity as materials for forming resins without impairing the hydrophobicity of polyethers, and to provide resins obtained from the polyether compounds.

<Rigid Polyurethane Foam>

Conventionally, rigid polyurethane foams have been used widely as heat insulation materials used in the fields of civil engineering, transport vehicles, household electrical appliances, etc. Recently, for improving the productivity, polyols having an increased primary hydroxyl content for an increased reactivity with isocyanate are used. Normally, terminal-EO adducts of AO adducts are used as the polyols having an increased primary hydroxyl content, but rigid polyurethane foams obtained by using terminal-EO adducts of AO adducts in which EOs are added to terminals in an ordinary manner are excellent in hardenability, but have drawbacks in that they swell when released from molds, and that they are inferior in foam strength.

Another object of the present invention is to provide a method for producing a rigid polyurethane foam with an excellent hardenability, a minimum degree of swelling when released from a mold, and an increased foam strength.

<Semi-Rigid Polyurethane Foam>

Conventionally, semi-rigid polyurethane foams have been widely used as a shock absorbing material or a cushioning material of interiors of cars. Recently, for improving the productivity, polyols having an increased primary hydroxyl content for an increased reactivity with isocyanate are used. Normally, terminal-EO adducts of AO adducts are used as the polyols having an increased primary hydroxyl content, but semi-rigid polyurethane foams obtained by using terminal-EO adducts of AO adducts in which EOs are added to terminals in an ordinary manner are excellent in hardenability, but have drawbacks in that they swell, or in contrast, shrink significantly, when released from molds.

Still another object of the present invention is to provide a method for producing a semi-rigid polyurethane foam with an excellent hardenability and a minimum degree of swelling or shrinkage when released from a mold.

<Flexible Polyurethane Foam>

Conventionally, as polyether polyols used in the production of flexible polyurethane foams, polypropylene polyols are used to whose terminals EOs are added so as to increase a primary hydroxyl content of terminal hydroxyl groups, from the viewpoint of the reactivity with isocyanate used. The conventional methods have had a drawback in that the obtained foam has EO units, which are hydrophilic groups, thereby having an inferior moisture resistance.

Further, as a urethane foam produced using such a polyether polyol, only a urethane foam having a non-uniform density is obtained in which the density at a skin portion of the urethane foam is greater than the density at a core portion. Therefore, the properties of the urethane foam have to be adjusted according to the properties at a portion with a lower density, that is, the properties of the core portion, and consequently, the urethane foam as a whole is designed to have a relatively great foam density.

Accordingly, still another object of the present invention is to provide a method for producing a flexible polyurethane foam having a uniform density without the deterioration of a moisture resistance.

<Flexible Polyurethane Slab Foam>

Conventionally, as a method for producing a flexible polyurethane slab foam, a method in which a polyether polyol is reacted with an organic polyisocyanate in the presence of a foaming agent, a catalyst, a foam stabilizer, etc. has been known widely. However, in the conventional method, it has been necessary to use organic heavy-metal catalysts in large quantity, which is expensive and could adversely affect the environment, in order to stabilize cells of a polyurethane slab foam when foamed.

Still another object of the present invention is to provide a method for producing a flexible polyurethane slab foam that is excellent in foaming stability and is producible without using organic heavy-metal catalysts in large quantity.

DISCLOSURE OF THE INVENTION

The inventors of the present invention made earnest studies to solve the above-described problems, and consequently found that any polyether of the first through third inventions described below has a sufficient reactivity while having decreased moles of added EO as a polyol component of a resin, thereby maintaining the hydrophobicity. Thus, the inventors have reached the present invention. Furthermore, they invented active hydrogen components comprising the foregoing polyethers and resin-forming compositions using the foregoing polyethers, methods for producing foams employing the foregoing active hydrogen components, and methods for producing active hydrogen components and foams employing polyethers relevant to the foregoing polyethers, which are the fourth through eighteenth inventions.

[Invention Relating to Polyether]

<First Invention>

A polyether polyol is obtained by random and/or block addition of an alkylene oxide to an active hydrogen compound, the alkylene oxide including a 1,2-alkylene oxide having not less than three carbon atoms as a principal constituent and also including ethylene oxide, wherein, a mean number x of moles of the added ethylene oxide per one active hydrogen atom is not more than 20, a primary hydroxyl content y of terminal hydroxyl groups is not less than 40%, and x and y satisfy a relationship expressed by a formula (1) shown below when x is 10 to 20, and satisfy a relationship expressed by a formula (2) shown below when x is not more than 10:

$$y \geq 0.328x + 90.44 \quad (1)$$

$$y \geq 42x^{0.47}(1 - x/41) \quad (2)$$

<Second Invention>

A monohydroxy or polyhydroxy polyether is obtained by adding an ethylene oxide to terminal hydroxyl groups of a polyoxyalkylene polyol or monool (j) and satisfies requirements (i) to (iii) shown below, wherein the polyoxyalkylene polyol or monool (j) is expressed by a formula (4) shown below, and not less than 40% (not less than 60% in the case of a monool) of —AO—H groups of the polyoxyalkylene polyol or monool (j), as hydroxyl-group-containing groups positioned at terminals, are primary-hydroxyl-group-containing groups expressed by a formula (5) shown below:

(i) a mean number x of moles of the added ethylene oxide per one hydroxyl group is not more than 20;

(ii) a primary hydroxyl content y of terminal hydroxyl groups is not less than 60% in the case of a monohydroxy polyether, and not less than 40% in the case of a polyhydroxy polyether;

(iii) $x \leq 5.5 \times z - 6.5 \times Ln(z) - 6.46$     (3)

where z represents 1.03−y/100; Ln(z) represents a natural logarithm of z,

where, in (4)

$R^1$ represents a m-valent group, which is obtained by removing active hydrogen from water, an alcohol compound, a phenol compound, an amine compound, a carboxylic acid compound, a thiol compound, or a phosphoric acid compound, Z represents an alkylene group or a cycloalkylene group having 2 to 12 carbon atoms, which may be substituted with a halogen atom or an aryl group, A represents an alkylene group having 3 to 12 carbon atoms, which may be substituted with a halogen atom or an aryl group, m represents a number of 1 or 2 to 100, p represents a number of 0 or not less than 1 q represents a number of not less than 1 in average, and p+q is 1 to 200 in average, and, in (5)

$R^2$ represents an alkyl group having 1 to 10 carbon atoms or an aryl group having 6 to 10 carbon atoms, which may be substituted with a halogen atom.

<Third Invention>

A polyether polyol is obtained by random and/or block addition of an alkylene oxide to an active hydrogen compound, the alkylene oxide including 1,2-alkylene oxides having not less than three carbon atoms as a principal constituent and also including an ethylene oxide, wherein a hydrophilic-lipophilic balance (HLB) and a primary hydroxyl content (%) of terminal hydroxyl groups of the polyether polyol satisfy a relationship expressed by a formula (6) shown below:

$$(HLB) \leq 0.1 \times (\text{primary hydroxyl content}) - 2 \quad (6)$$

[Invention Relating to Active Hydrogen Component]

<Fourth Invention>

An active hydrogen component is provided for production of a rigid polyurethane foam, the active hydrogen component comprising a polyether polyol (a1), the polyether polyol (a1) comprising a polyether polyol obtained by further adding an ethylene oxide to a polyether polyol that is obtained by adding a 1,2-alkylene oxide having not less than three carbon atoms to a polyhydric alcohol so that not less than 1 mole of the 1,2-alkylene oxide is added per one primary hydroxyl group, wherein, in the polyether polyol (a1), a hydroxyl value is not less than 200, a mean number x of moles of the added ethylene oxide per one active hydrogen atom is not more than 2, a primary hydroxyl content y is not less than 20%, and x and y satisfy a relationship expressed by a formula (2) shown below:

$$y \geq 42x^{0.47}(1 - x/41) \quad (2)$$

<Fifth Invention>

An active hydrogen component is provided for production of a rigid polyurethane foam, the active hydrogen component comprising an active hydrogen compound (b) and a polyether polyol (a), wherein the active hydrogen compound (b) is obtained by adding an alkylene oxide having not less than 2 carbon atoms to an amine and that has a value of an active hydrogen containing group of not less than 200, and the polyether polyol (a) comprises a polyether polyol that is obtained by adding a 1,2-alkylene oxide having not less than three carbon atoms to a polyhydric alcohol so that not less than 1 mole of the 1,2-alkylene oxide is added per one mole of primary hydroxyl groups, and/or a polyether polyol that is obtained by further adding an ethylene oxide to said polyether polyol, wherein, in the polyether polyol (a), a hydroxyl value is not less than 200, a mean number x of moles of the added ethylene oxide per one active hydrogen atom is not more than 2, a primary hydroxyl content y is not less than 20%, and x and y satisfy a relationship expressed by a formula (2) shown below:

$$y \geq 42x^{0.47}(1-x/41) \tag{2}$$

<Sixth Invention>

An active hydrogen component is provided for production of a semi-rigid polyurethane foam, the active hydrogen component comprising a polyether polyol (c1) that is obtained by random and/or block addition of an alkylene oxide that includes a 1,2-alkylene oxide having not less than three carbon atoms as a principal constituent and also includes ethylene oxide, wherein, in the polyether polyol (c1), a mean number x of moles of the added ethylene oxide per one active hydrogen atom is not more than 20, a primary hydroxyl content y is not less than 40%, and x and y satisfy a relationship expressed by a formula (1) shown below when x is 10 to 20, and satisfy a relationship expressed by a formula (2) shown below when x is not more than 10:

$$y \geq 0.328x + 90.44 \tag{1}$$

$$y \geq 42x^{0.47}(1-x/41) \tag{2}$$

<Seventh Invention>

An active hydrogen component is provided for production of a semi-rigid polyurethane foam, the active hydrogen component comprising a polyether polyol (c) and an active hydrogen compound (d), wherein the active hydrogen compound (d) has a value of active hydrogen containing groups of not less than 250, and the polyether polyol (c) is obtained by addition of an alkylene oxide that includes a 1,2-alkylene oxide having not less than three carbon atoms as a principal constituent, wherein, in the polyether polyol (c), a hydroxyl value is 10 to 200, a mean number x of moles of an added ethylene oxide per one active hydrogen atom is not more than 20, a primary hydroxyl content y is not less than 40%, and x and y satisfy a relationship expressed by a formula (1) shown below when x is 10 to 20, and satisfy a relationship expressed by a formula (2) shown below when x is not more than 10:

$$y \geq 0.328x + 90.44 \tag{1}$$

$$y \geq 42x^{0.47}(1-x/41) \tag{2}$$

[Invention Relating to Resin-Forming Composition]
<Eighth Invention>

A resin-forming composition comprises a monohydroxy or polyhydroxy polyether (K), a compound (L) reactive with a hydroxyl group, and according to necessity, another component (M) reactive with (K) and/or (L), wherein the monohydroxy or polyhydroxy polyether (K) is obtained by adding an ethylene oxide to terminal hydroxyl groups of a polyoxyalkylene polyol or monool (j), and satisfies requirements (i) to (iii) shown below, wherein the polyoxyalkylene polyol or monool (j) is expressed by a formula (4) shown below, and not less than 40% (not less than 60% in the case of a monool) of —A—OH groups of the polyoxyalkylene polyol or monool (j), as hydroxyl-group-containing groups positioned at terminals, are primary-hydroxyl-group-containing groups expressed by a formula (5) shown below:

(i) a mean number x of moles of the added ethylene oxide per one hydroxyl group is not more than 20;

(ii) a primary hydroxyl content y of terminal hydroxyl groups is not less than 60% in the case of a monohydroxy polyether, and not less than 40% in the case of a polyhydroxy polyether;

$$\text{(iii)} \ x \leq 5.5 \times z - 6.5 \times Ln(z) - 6.46 \tag{3}$$

where z represents 1.03−y/100; Ln(z) represents a natural logarithm of z,

$$\begin{array}{c} \text{—CH—CH}_2\text{O—H} \\ | \\ \text{R}^2 \end{array} \tag{5}$$

where, in (4)

$R^1$ represents a m-valent group, which is obtained by removing active hydrogen from water, an alcohol compound, a phenol compound, an amine compound, a carboxylic acid compound, a thiol compound, or a phosphoric acid compound, Z represents an alkylene group or a cycloalkylene group having 2 to 12 carbon atoms, which may be substituted with a halogen atom or an aryl group, A represents an alkylene group having 3 to 12 carbon atoms, which may be substituted with a halogen atom or an aryl group, m represents a number of 1 or 2 to 100, p represents a number of 0 or not less than 1 q represents a number of not less than 1 in average, and p+q is 1 to 200 in average, and, in (5)

$R^2$ represents an alkyl group having 1 to 10 carbon atoms or an aryl group having 6 to 10 carbon atoms, which may be substituted with a halogen atom.

[Invention Relating to Production of Foam]
<Ninth Invention>

A method for producing a rigid polyurethane foam comprises the step of adding an active hydrogen compound (A), an organic polyisocyanate (B), a foaming agent (C), a urethanation catalyst (D), and, according to necessity, an additive (E), so as to be foamed and cured, wherein (A) comprises the active hydrogen component of the fourth invention.

<Tenth Invention>

A method for producing a rigid polyurethane foam comprises the step of adding an active hydrogen compound (A), an organic polyisocyanate (B), a foaming agent (C), a urethanation catalyst (D), and, according to necessity, an additive (E), so as to be foamed and cured, wherein (A) comprises the active hydrogen component of the fifth invention.

<Eleventh Invention>

A method for producing a semi-rigid polyurethane foam comprises the step of adding an active hydrogen compound (A), an organic polyisocyanate (B), a foaming agent (C), a urethanation catalyst (D), and, according to necessity, an additive (E), so as to be foamed and cured, wherein (A) comprises the active hydrogen component of the sixth invention.

<Twelfth Invention>

A method for producing a semi-rigid polyurethane foam comprises the step of adding an active hydrogen compound (A), an organic polyisocyanate (B), a foaming agent (C), a urethanation catalyst (D), and, according to necessity, an additive (E), so as to be foamed and cured, wherein (A) comprises the active hydrogen component of the seventh invention.

<Thirteenth Invention>

A method for producing a flexible polyurethane foam comprises the step of reacting an active hydrogen compound comprising a polyol (A1) with an organic polyisocyanate (B) in the presence of a foaming agent (C1) comprising water, a urethanation catalyst (D), and a foam stabilizer (E1), wherein a hydrophilic-lipophilic balance (HLB) of a polyether polyol contained in (A1) and a primary hydroxyl content (%) of terminal hydroxyl groups of the polyether polyol contained in (A1) satisfy a relationship expressed by a formula (6) shown below:

$$(HLB) \leq 0.1 \times (\text{primary hydroxyl content}) - 2 \quad (6)$$

<Fourteenth Invention>

A method for producing a flexible polyurethane foam comprises the step of reacting an active hydrogen compound comprising a polyol (A1) with an organic polyisocyanate (B) in the presence of a foaming agent (C1) comprising water, a urethanation catalyst (D), and a foam stabilizer (E1), wherein (A1) includes a polyether polyol (c) obtained by addition of an alkylene oxide that includes a 1,2-alkylene oxide having not less than three carbon atoms as a principal constituent, wherein, in the polyether polyol (c), a mean number x of moles of the added ethylene oxide per one active hydrogen atom is not more than 20, a primary hydroxyl content y is not less than 40%, and x and y satisfy a relationship expressed by a formula (1) shown below when x is 10 to 20, and satisfy a relationship expressed by a formula (2) shown below when x is not more than 10:

$$y \geq 0.328x + 90.44 \quad (1)$$

$$y \geq 42x^{0.47}(1 - x/41) \quad (2)$$

<Fifteenth Invention>

A method for producing a flexible polyurethane slab foam comprises the step of reacting an active hydrogen compound comprising a polyol (A1) with an organic polyisocyanate (B) in the presence of a foaming agent (C), a catalyst (D), a foam stabilizer (E1), and, according to necessity, another additive (E2), wherein (A1) is a polyether polyol in which not less than 40% of —AO—H groups, as hydroxyl-group-containing groups positioned at terminals, are primary-hydroxyl-group-containing groups expressed by a formula (5) shown below:

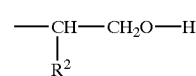

where

A represents an alkylene group having 3 to 12 carbon atoms, which may be substituted with a halogen atom or an aryl group, and $R^2$ represents an alkyl group having 1 to 10 carbon atoms or an aryl group having 6 to 10 carbon atoms, which may be substituted with a halogen atom.

[Invention of Foam and Use Thereof]

<Sixteenth Invention>

A heat insulation material or structural material for use in construction materials, household electric appliances, and transport vehicles comprises the rigid polyurethane foam obtained by the producing method of the ninth or tenth invention.

<Seventeenth Invention>

A shock absorbing material or cushioning material used for interiors of cars comprises the semi-rigid polyurethane foam obtained by the producing method of the eleventh or twelfth invention.

<Eighteenth Invention>

A flexible polyurethane foam is obtained by the producing method of the thirteenth or fourteenth invention, the polyurethane foam having a core density of 20 to 33 kg/m³, and a wet heat compression set of not more than 15%.

BRIEF DESCRIPTION OF DRAWINGS

FIG. 5 is a perspective view illustrating an instrument panel according to Examples 46 to 53 and Comparative Examples 45 to 48.

FIG. 6 is a cross-sectional view of the instrument panel shown in FIG. 5, taken along a broken line in the drawing.

DESCRIPTION OF THE INVENTION

<<Invention Relating to Polyethers>>

Figure 1:
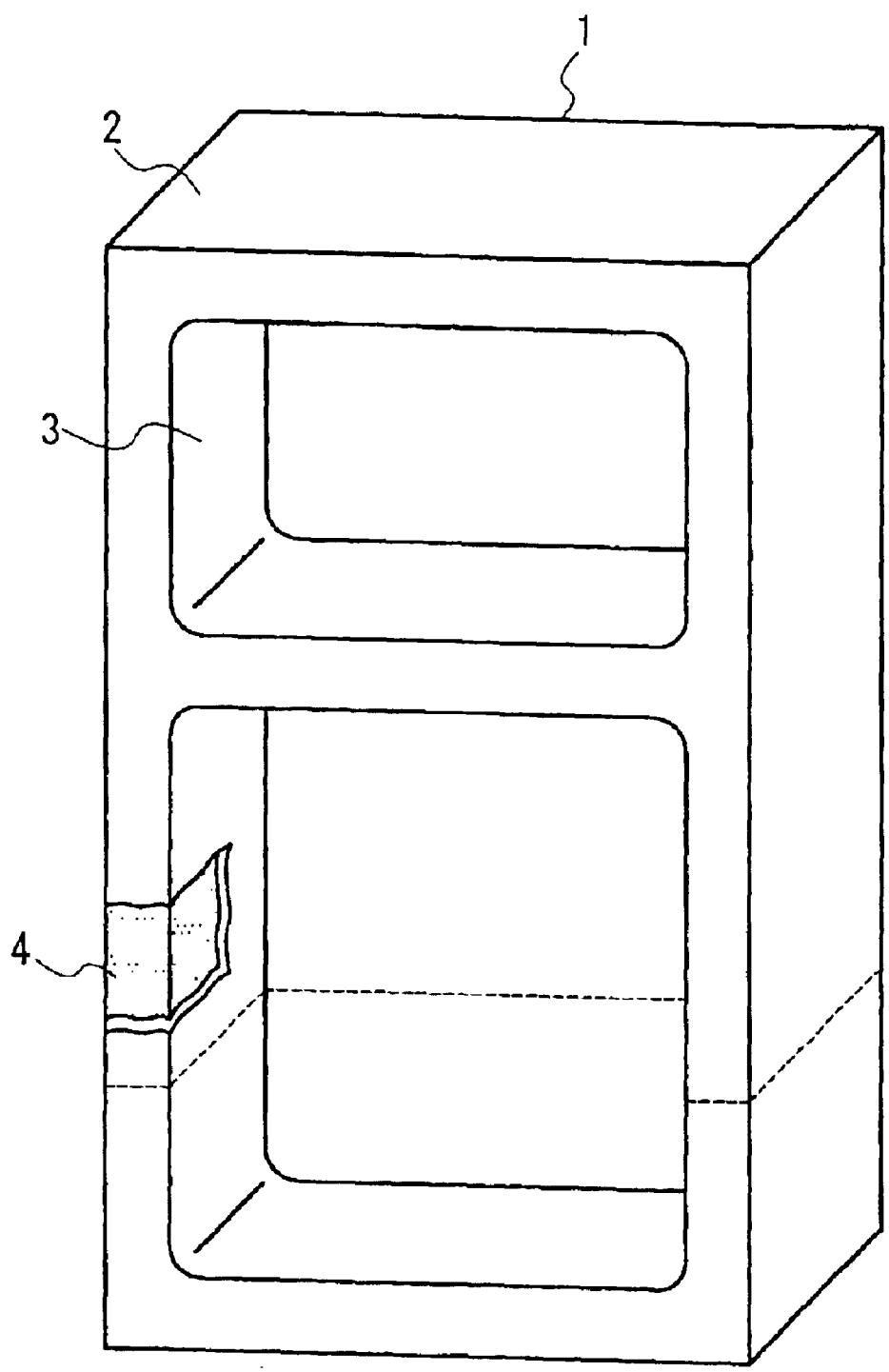
FIG. 1 is a perspective view illustrating a box-type heat insulation member for a refrigerator, obtained after injection of materials according to Examples 21 to 24 and Comparative Examples 21 to 25.

In the present invention, a primary hydroxyl content of terminal hydroxyl groups is calculated by the ¹H-NMR method applied to samples esterified beforehand. The details of the ¹H-NMR method are described below.

<Preparation of Samples>

Approximately 30 mg of a sample to be measured is placed in a ¹H-NMR test tube with a diameter of 5 mm, and approximately 0.5 ml of a deuteration solvent is added thereto so as to solve the sample. Thereafter, approximately 0.1 ml of trifluoroacetic anhydride is added thereto, and is left for about five minutes at 25° C., so that a trifluoroacetic ester of a polyol is obtained, which is to be used as a sample for analysis.

Here, the deuteration solvent is chloroform deuteride, toluene deuteride, dimethyl sulfoxide deuteride, dimethyl formamide deuteride, or the like, and a solvent that dissolves a sample is selected appropriately.

<NMR Measurement>

The $^1$H-NMR measurement is carried out under normal conditions.

<Calculation of Primary Hydroxyl Content of Terminal Hydroxyl Groups>

A signal derived from a methylene group bonded with a primary hydroxyl group is detected in the vicinity of 4.3 ppm, and a signal derived from a methine group bonded with a secondary hydroxyl group is detected in the vicinity of 5.2 ppm. Therefore, the primary hydroxyl content of terminal hydroxyl groups is calculated by an equation (7) shown below:

$$\text{Primary hydroxyl content } (\%) = [r/r + 2s)] \times 100 \qquad (7)$$

where r represents an integral of a signal derived from a methylene group bonded with a primary hydroxyl group, which is in the vicinity of 4.3 ppm, and s represents an integral of a signal derived from a methine group bonded with a secondary hydroxyl group, which is in the vicinity of 5.2 ppm.

Two or more polyether polyols of the first invention may be used in combination, and a hydroxyl value (average) is preferably not less than 10, more preferably 13 to 1300, particularly preferably 16 to 1000.

In the case where the hydroxyl value is in the foregoing range, it is desirable for use in a polyurethane foam.

Furthermore, the number x of moles of added EO per one active hydrogen atom in the foregoing polyol is not more than 20, the primary hydroxyl content y is not less than 40%, and x and y satisfy the relationship expressed by a formula (1) shown below when x is in a range of 10 to 20, and satisfy the relationship expressed by a formula (2) shown below when x is not more than 10:

$$y \geq 0.328x + 90.44 \qquad (1)$$

$$y \geq 42x^{0.47}(1 - x/41) \qquad (2)$$

The number x of added moles is preferably not more than 19, more preferably 0.1 to 18. The primary hydroxyl content y is preferably not less than 60%, more preferably not less than 70%.

Furthermore, when x is not more than 10, x and y preferably satisfy the relationship expressed by a formula (2') shown below, and more preferably satisfy the relationship expressed by a formula (2") shown below:

$$y \geq 43x^{0.47} \times (1 - x/41) \qquad (2')$$

(where x is not more than 10)

$$y \geq 45x^{0.47} \times (1 - x/41) \qquad (2'')$$

(where x is not more than 10)

In the case where x and y, and the relationship between x and y are in the foregoing ranges, respectively, the hydrophobicity and the reactivity both are excellent.

The polyol of the first invention is obtained by adding an alkylene oxide (hereinafter abbreviated as AO) containing a 1,2-AO having not less than three carbon atoms as a principal constituent and also containing an ethylene oxide (hereinafter abbreviated as EO) to an active hydrogen compound by a method that will be described later.

Specifically, the active hydrogen compounds typically include polyhydric alcohols, amines, polyhydric phenols, polycarboxylic acids, etc.

The polyhydric alcohols include: dihydric alcohols having 2 to 20 carbon atoms (aliphatic diols, for instance, alkylene glycols such as ethylene glycol, propylene glycol, 1,3- and 1,4-butanediols, 1,6-hexanediol, and neopentylglycol; and alicyclic diols, for instance, cycloalkylene glycols such as cyclohexanediol and cyclohexanedimethanol); trihydric alcohols having 3 to 20 carbon atoms (aliphatic triols, for instance, alkane triols such as glycerin, trimethylolpropane, trimethylolethane, and hexanetriol); polyhydric alcohols having 4 to 8 or more hydroxyl groups and 5 to 20 carbon atoms (aliphatic polyols, for instance, alkane polyols and intramolecular or intermolecular dehydration products of the same such as pentaerythritol, sorbitol, mannitol, sorbitan, diglycerol, and dipentaerythritol; and saccharides and derivatives of the same such as sucrose, glucose, mannose, fructose, and methylglucoside).

The amines include alkanolamines, polyamines, and monoamines.

The alkanolamines include alkanolamines having 2 to 20 carbon atoms (e.g. monoethanolamine, diethanolamine, triethanolamine, and isopropanolamine).

The polyamines include, as aliphatic amines, alkylenediamines having 2 to 6 carbon atoms (e.g. ethylenediamine, propylenediamine and hexamethylenediamine), and polyalkylene polyamines having 4 to 20 carbon atoms (from dialkylenetriamines to hexaalkyleneheptamines having 2 to 6 carbon atoms in the alkylene group, for example, diethylenetriamine and triethylenetetramine).

The polyamines further include: aromatic polyamines having 6 to 20 carbon atoms (e.g. phenylenediamine, tolylenediamine, xylylenediamine, diethyltoluenediamine, methylenedianiline, and diphenyl ether diamine); alicyclic polyamines having 4 to 20 carbon atoms (e.g. isophoronediamine, cyclohexylenediamine, and dicyclohexylmethanediamine); and heterocyclic polyamines having 4 to 20 carbon atoms (e.g. piperazine, and aminoethylpiperazine).

The monoamines include: ammonium; alkylamines having 1 to 20 carbon atoms (e.g. n-butylamine and octylamine), as aliphatic amines; aromatic monoamines having 6 to 20 carbon atoms (e.g. aniline and toluidine); alicyclic monoamines having 4 to 20 carbon atoms (e.g. cyclohexylamine); and heterocyclic monoamines having 4 to 20 carbon atoms (e.g., piperidine).

The polyhydric phenols include monocyclic polyhydric phenols such as pyrogallol, hydroquinone, and phloroglucinol; bisphenols such as bisphenol A, bisphenol F, and bisphenol sulfone; condensation products of phenols and formaldehyde (novolac); and polyphenols, for instance, those disclosed in the specification of U.S. Pat. No. 3,265,641.

The polycarboxylic acids include aliphatic polycarboxylic acids having 4 to 18 carbon atoms (e.g. succinic acid, adipic acid, sebacic acid, glutaric acid, and azelaic acid), aromatic polycarboxylic acids having 8 to 18 carbon atoms (e.g. terephthalic acid and isophthalic acid), and mixtures of two or more among the same.

Among these, polyhydric alcohols are preferred.

The 1,2-AO having not less than three carbon atoms, other than EO, to be added to the active-hydrogencontaining compound (two or more types of the compounds may be used in combination) normally has 3 to 20 carbon atoms, but those having 3 to 8 carbon atoms are preferred. Examples of the 1,2-AO include propylene oxide (hereinafter abbreviated as PO), 1,2-butylene oxide (hereinafter abbreviated as BO), 1,2-pentene oxide, styrene oxide (hereinafter abbreviated as SO), and combinations of two or more among the same (block addition and/or random addition). Preferably, PO is used.

The content of 1,2-AO having not less than 3 carbon atoms in AO is preferably not less than 50 mass %, more preferably not less than 70 mass %.

The polyol of the first invention is obtained by using EO as at least a part of AO and adding the AO and EO to the active-hydrogen-containing compound by random addition and/or block addition. Specific examples of the polyol are adducts of 1,2-AO having not less than 3 carbon atoms (hereinafter abbreviated as <u>AO</u> in (i) to (v) shown below) and EO to the active-hydrogen-containing compound in the following manners.

(i) block addition of <u>AO</u>-EO in this order (capped);

(ii) block addition of <u>AO</u>-EO-<u>AO</u>-EO in this order (balanced);

(iii) block addition of EO-<u>AO</u>-EO in this order;

(iv) block addition of <u>AO</u>-EO-<u>AO</u> in this order (active secondary);

(v) random addition of mixed <u>AO</u> and EO; and (vi) random addition or block addition according to the order described in JP 57(1982)-209920 A.

(vii) random addition or block addition according to the order described in JP 53(1978)-13700 A.

Among these, adducts capped with EO are preferred.

It should be noted that these may be used in combination.

The polyol of the first invention preferably has 2 to 8 hydroxyl groups in average, more preferably 2.5 to 8 hydroxyl groups in average, from the viewpoint of reactivity and viscosity.

As a method for obtaining this polyol, a method of adding 1,2-AO having not less than 3 carbon atoms to the active-hydrogen-containing compound and further adding EO thereto in the presence of a specific catalyst (α) may be used, for instance.

The foregoing (α) is disclosed in WO 00/02952, and more specifically, it is a compound expressed by any one of formulae (8), (9), and (10) shown below:

(8)

(9)

(10)

In the foregoing formulae (8) to (10), X represents a boron atom or an aluminum atom. A boron atom is preferred.

$R^3$ in the formulae (8) to (10) represents a phenyl group or a substituted phenyl group expressed by a formula (11) shown below and/or a tertiary alkyl group expressed by a formula (12) shown below, in which, in the case where a plurality of $R^3$ are present, the plural $R^3$ may be the same or different from each other:

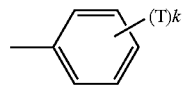

(11)

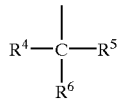

(12)

In the foregoing formula (11), T represents a hydrogen atom, an alkyl group having 1 to 4 carbon atoms, a halogen atom, a nitro group, or a cyano group, and Ts may be the same or different. Among these, T preferably represents a hydrogen atom, a halogen atom, or a cyano group, and more preferably, a halogen atom or a cyano group. k represents a numerical value of 0 to 5.

Specifically, examples of the phenyl group or a substituted phenyl group expressed by the formula (11) include a phenyl group, a pentafluorophenyl group, p-methylphenyl group, a p-cyanophenyl group, and a p-nitrophenyl group. Among these, a phenyl group, a pentafluorophenyl group, or a p-cyanophenyl group is preferred, and a phenyl group or a pentafluorophenyl group is more preferred.

$R^4$, $R^5$, and $R^6$ in the formula (12) above represent an alkyl group having 1 to 4 carbon atoms independently, and they may be the same or may differ from one another. More specifically, they represent a methyl group, an ethyl group, a propyl group, an isopropyl group, etc.

Typical tertiary alkyl groups expressed by the formula (12) include a t-butyl group, a t-pentyl group, etc.

As the catalyst (α), specifically, the following may be used: triphenylborane, diphenyl-t-butylborane, tri(t-butyl) borane, triphenylaluminum, diphenyl-t-butylaluminum, tri (t-butyl)aluminum, tris(pentafluorophenyl)borane, bis (pentafluorophenyl)-t-butylborane, tri s(pentafluorophenyl) aluminum, bis(pentafluorophenyl)-t-butylaluminum, bis (pentafluorophenyl)fluoroborane, di(t-butyl)fluoroborane, (pentafluorophenyl)difluoroborane, (t-butyl)difluoroborane, bis(pentafluorophenyl)fluoroaluminum, di(t-butyl) difluoroaluminum, (pentafluorophenyl)difluoroaluminum, (t-butyl)fluoroaluminum, etc. Among these, preferred are triphenylborane, triphenylaluminum, tris (pentafluorophenyl)borane, and tris(pentafluorophenyl) aluminum, and more preferred are tris(pentafluorophenyl) borane, and tris(pentafluorophenyl)aluminum.

Conditions for the addition of AO may be the same as those in the method disclosed by the foregoing publications. For instance, by using normally 0.0001 to 10 mass %, preferably 0.001 to 1 mass %, of (α), the reaction is carried out at a temperature of, normally 0° C. to 250° C., preferably 20° C. to 180° C.

The foregoing AO adducts include the catalyst (α), but the catalyst (α) may be decomposed and/or removed. As a method for decomposing the same, a method of adding water and/or an alcohol compound, and if necessary, a basic substance such as a caustic alkali or an amine compound is applicable. For the decomposition, the temperature is preferably at 10° C. to 180° C., more preferably 80° C. to 150° C. The decomposition may be carried out in a closed state, in a state of being connected with a vacuum source so as to be evacuated, or alternatively in a state in which water or an alcohol compound is added continuously. The added water or alcohol may be added in a liquid state, in a vaporized state, or in a solid state. The quantity of the used water or alcohol compound is normally 0.1 to 100 mass %, preferably 1 to 20 mass % with respect to the addition product. The quantity of the used caustic alkali or amine compound is normally 0 to 10 mass %, preferably 0 to 2 mass % with respect to the addition product.

Typical removing methods include: the absorption method employing an absorber such as a synthetic silicate (magnesium silicate, aluminum silicate, etc.), an activated clay, an activated carbon, etc., or an ion-exchange resin; the counter current extraction method or the static separation method employing water or a caustic alkali aqueous solution; the membrane separation method employing an ion-exchange membrane; and the low-temperature crystallization method.

Furthermore, a polyol having a high primary hydroxyl content is obtained by further adding EO to an obtained AO-added polyol. Since the polyol before the foregoing addition has a primary hydroxyl content of terminal hydroxyl groups of not less than 40%, which is extremely high, it is possible to increase the primary hydroxyl content of terminal hydroxyl groups by using a small quantity of EO, and the number of moles of added EO per one active hydrogen atom, denoted as x, and the primary hydroxyl content, denoted as y, satisfy the aforementioned relationship. It should be noted that the catalyst used in the foregoing EO addition may be the aforementioned boron or aluminum compound per se, or alternatively, another conventionally used catalyst.

The other catalysts typically include: basic catalysts such as sodium hydroxide, potassium hydroxide, cesium hydroxide, potassium carbonate, and triethylenediamine; acidic catalysts such as boron trifluoride, tin chloride, triethylaluminum, and heteropolyacid; zinc hexacyanocobaltate; and phosphazene compounds. Among these, the basic catalysts are preferred. Though the quantity of a used catalyst is not particularly limited, it is preferably 0.0001 to 10 mass %, more preferably 0.001 to 1 mass % with respect to a polymer to be produced.

It should be noted that a polyol obtained by a conventional polyol producing method in which a 1,2-AO having not less than three carbon atoms is reacted in the presence of an alkaline catalyst has an extremely low primary hydroxyl content of terminal hydroxyl groups (for instance, normally not more than 2% in the case where potassium hydroxide is used), and most of the terminal hydroxyl groups are secondary or tertiary hydroxyl groups. Therefore, the polyol has an insufficient reactivity with reactive groups such as isocyanate groups. Accordingly, the method of further adding EO to ensure a sufficient reactivity has been known.

However, the primary hydroxyl content of terminal hydroxyl groups is not increased unless a large quantity of EO is added. Therefore, the number of moles of added EO per one active hydrogen atom, denoted as x, and the primary hydroxyl content, denoted as y, do not satisfy the aforementioned relationship.

Furthermore, the number x of moles of added EO per one active hydrogen atom of the active-hydrogen-containing compound is not more than 20, the primary hydroxyl content y is not less than 40%, x and y satisfy the relationship expressed by a formula (1) show below when x is 10 to 20, and satisfy the relationship expressed by a formula (2) shown below when x is not more than 10:

$$y \geq 0.328x + 90.44 \tag{1}$$

$$y \geq 42x^{0.47}(1-x/41) \tag{2}$$

The number x of added moles is preferably not more than 19, more preferably 0.1 to 18. The primary hydroxyl content y is preferably not less than 60%, more preferably not less than 70%.

Furthermore, x and y preferably satisfy the relationship expressed by a formula (2') shown below when x is not more than 10, and more preferably satisfy the relationship (2") expressed by a formula shown below:

$$y \geq 43x^{0.47} \times (1-x/41) \tag{2'}$$

(where x is not more than 10)

$$y \geq 45x^{0.47}(1-x/41) \tag{2"}$$

(where x is not more than 10)

In the case where x and y, as well as the relationship between x and y are in the above-described ranges, respectively, the hydrophobicity and the reactivity both are excellent.

A polyoxyalkylene polyol or monool (j) of the second invention is expressed by a formula (4) shown below, and not less than 40% (not less than 60% in the case of a monool) of —A—OH groups having hydroxyl groups at terminals are expressed by the formula (5) shown below:

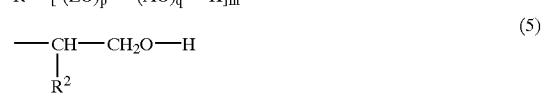

In the formula (4), $R^1$ represents an m-valent group, which is obtained by removing active hydrogen from water, an alcohol compound, a phenol compound, an amino-group-containing compound, a carboxyl-group-containing compound, a thiol-group-containing compound, or a phosphoric acid compound, and m represents a numerical value of 1 (in case of monool) or 2 to 100 (in case of polyol).

$R^1$ may be a group obtained by removing active hydrogen from a compound (k) having m active hydrogen atoms. Examples of the compound (k) include, for instance: a hydroxyl-group-containing compound, an amino-group-containing compound, a carboxyl-group-containing compound, a thiol-group-containing compound, and a phosphoric acid compound; compounds each having not less than two types of active-hydrogen-containing functional group in the molecule; and mixtures of two or more among the same.

Examples of the hydroxyl-group-containing compound include water, monohydric alcohols, polyhydric alcohols having 2 to 8 hydroxyl groups, monohydric phenols, and polyhydric phenols.

Concrete examples of the polyhydric alcohols and the polyhydric phenols include the same as those applied in the first invention.

The monohydric alcohols include alcohols having 1 to 20 carbon atoms, such as methanol, ethanol, butanol, and octanol. The monohydric phenols include phenols having 6 to 20 carbon atoms, such as phenol or cresol.

The hydroxyl-group-containing compounds further include: polybutadiene polyols; castor-oil-based polyols; and polyfunctional polyols (for instance, having 2 to 100 functional groups), such as (co)polymers of hydroxyalkyl (meth)acrylates, and polyvinyl alcohols The amino-group-containing compounds include monoamines, polyamines, and alkanolamines.

More specifically, in addition to those applied in the first invention, concrete examples thereof include: polyamide-polyamines obtained by condensation of dicarboxylic acids with excess polyamines; polyetherpolyamines; hydrazines (hydrazine, monoalkylhydrazine, etc.), dihydrazides (succinic acid dihydrazide, adipic acid dihydrazide, isophthalic acid dihydrazide, terephthalic acid dihydrazide, etc.), guanidines (butylguanidine, 1-cyanoguanidine, etc.); dicyandiamide; and mixtures of two or more among the same.

The carboxylic-group-containing compounds include: aliphatic monocarboxylic acids having 2 to 18 carbon atoms, such as acetic acid and propionic acid; aromatic monocarboxylic acids having 6 to 18 carbon atoms, such as benzoic acid; aliphatic polycarboxylic acids having 4 to 18 carbon atoms, such as succinic acid and adipic acid; aromatic polycarboxylic acids having 8 to 18 carbon atoms, such as phthalic acid, terephthalic acid, and trimellitic acid; and polycarboxylic acid polymers (having 2 to 100 functional groups), such as (co)polymers of acrylic acid.

Polythiol compounds of thiol-group-containing compounds include polyvalent thiols having 2 to 18 carbon atoms and having 2 to 8 mercapto groups. More specifically, typical examples of the same include ethylenedithiol, propylenedithiol, 1,3-butylenedithiol, 1,4-buthanedithiol, 1,6-hexyanedithiol, and 3-methylpentanedithiol.

The phosphoric acid compounds include phosphoric acid, phosphorous acid, and phosphonic acid.

Among these active-hydrogen-containing compounds (k), hydroxyl-group-containing compounds, amino-group-containing compounds, and water are preferred, and especially, water, alcohol, and amine are more preferred.

In the above formula (4), Z represents an alkylene group or cycloalkylene group having 2 to 12 carbon atoms, which may be substituted with a halogen atom.

More specifically, examples of the same include an ethylene group, a propylene group, a butylene group, a chloropropylene group, a bromopropylene group, a laurylene group, a phenylethylene group, a chlorophenylethylene group, and a 1,2-cyclohexylene group, which may be used alone or in combination of two or more. Among these, a propylene group, a butylene group, and an ethylene group are preferred, and a propylene group and a butylene group are particularly preferred.

In the above formula (4), A represents an alkylene group or cycloalkylene group having 3 to 12 carbon atoms, which may be substituted with a halogen atom.

More specifically, examples of the same include a propylene group, a butylene group, a chloropropylene group, a bromopropylene group, a laurylene group, a phenylethylene group, a chlorophenylethylene group, and a 1,2-cyclohexylene group, which may be used alone or in combinations of two or more. From the viewpoint of the hydrophobicity of an obtained polyoxyalkylene polyol or monool, an ethylene group, when used, is preferably used in combination with another alkylene group.

In the present invention, examples of the —A—OH group, which is a hydroxyl-group-containing group present at a terminal among the groups expressed as —(AO)$_q$—H in the aforementioned formula (4) expressing a polyoxyalkylene polyol or monool (j), include two types, that is, a primary-hydroxyl-group-containing group expressed by the formula (5) shown above, and a secondary-hydroxyl-group-containing group expressed by a formula (5') shown below. In (j) used in the second invention, the primary-hydroxyl-group-containing groups expressed by the formula (5) account for not less than 40% (not less than 60% in the case of a monool), preferably not less than 65%, more preferably not less than 70%, of all the terminal hydroxyl groups in (j).

In the foregoing formulae (5) and (5'), $R^2$ represents an alkyl group having 1 to 10 carbon atoms, or an aryl group having 6 to 10 carbon atoms, which may be substituted with a halogen atom.

More specifically, examples of the same include: straight-chain alkyl groups such as a methyl group, an ethyl group, and a propyl group; branched-chain alkyl groups such as an isopropyl group; a phenyl group, or substituted phenyl groups such as a p-methylphenyl group; substituted alkyl groups such as a chloromethyl group, a bromomethyl group, a chloroethyl group, and a bromoethyl group; substituted phenyl groups such as a p-chlorophenyl group, and a p-bromophenyl group; and mixtures of two or more among the same.

p represents the number of 0 or not less than 1, q represents the number of not less than 1, and p+q is normally 1 to 200, preferably 1 to 100. p is the number normally in a range of 0 to 199, preferably in a range of 0 to 100, while q represents the number normally in a range of 1 to 200, preferably in a range of 1 to 100.

The polyoxyalkylene polyol or monool (j) is obtained by ring-opening addition polymerization of a heterocyclic compound (β) to the foregoing active-hydrogen-containing compound (k) in the presence of the aforementioned specific catalyst (α).

The heterocyclic compound (β) is expressed by a formula (13) shown below:

In the formula (13), R represents an alkylene group having 2 to 5 carbon atoms, which may be substituted with a halogen atom or a hydrocarbon group. Q represents a divalent organic group selected from the group consisting of —O—, —S—, —NH—, —OCOO—, —SCOO—, —OCSO—, —OCOS—, —OCSS—, —SCSO—, —SCOS—, —SCSS—, —COO—, —CSO—, —COS—, —CSS—, and —CONH—.

Concrete examples of the heterocyclic compound (β) include: cyclic ethers such as EO, PO, BO, SO, oxetane, and tetrahydrofuran; cyclic thioethers such as ethylene sulphide; imines such as ethylene imine; cyclic carbonates such as ethylene carbonate; cyclic thiocarbonates such as ethylene thiocarbonate; cyclic dithiocarbonates such as ethylene dithiocarbonate; cyclic lactones such as ε-caprolactone; and cyclic caprolactams such as ε-caprolactam.

The number of moles of (β) to be added so that the foregoing (j) is obtained by adding the (β) to the active-hydrogen-containing compound (k) in the presence of (α) is normally 1 mole to 200 moles, preferably 1 mole to 100 moles, per one active hydrogen atom of (k), and it appropriately is selected according to the molecular weight of the hydroxyl-group-containing compound to be produced and the use of the same.

The type, method of use, reaction conditions, catalyst-removing conditions, etc. of (α) are the same as those applied in the first invention.

The number average molecular weight (hereinafter referred to as Mn, determined according to gel permeation chromatography; this also applies hereinafter) of the polyoxyalkylene polyol or monool (j) thus obtained is normally 400 to 100000, preferably 500 to 20000, and it is appropriately selected according to the use of the same, for instance, the required properties of a polyurethane resin to be produced therefrom.

Concrete examples of the polyoxyalkylene polyol or monool (j) include PO adducts of water, PO adducts of methanol, PO adducts of glycerin, PO adducts of ammonia, PO adducts of BO adducts of water, PO adducts of BO adducts of methanol, PO adducts of BO adducts of glycerin, and PO adducts of BO adducts of ammonia.

Monohydroxy or polyhydroxy polyether of the second invention is obtained by adding EO to a terminal hydroxyl group of the foregoing polyoxyalkylene polyol or monool (j). The number (x) of moles of added EO per one hydroxyl group is not more than 20, preferably not more than 15.

When the polyether of the second invention is obtained by ring-opening addition of EO to a terminal hydroxyl group of the foregoing (j), a catalyst may be used. As the catalyst, the same catalyst ($\alpha$) as that used in producing (j) from (k) may be used, or alternatively another catalyst may be used. Examples of the another catalyst include those applied in the first invention, and the quantity thereof to be used is the same also.

For the ring-opening addition of EO, the foregoing (j), EO, and catalyst may be reacted in batch, or in a manner such that EO is dropped into a mixture of (j) and the catalyst, or alternatively, in a manner such that EO and the catalyst are dropped into (j).

From the viewpoint of the control of reaction temperature, either the method of dropping EO into the mixture of (j) and the catalyst, or the method of dropping EO and the catalyst into (j), is preferred.

A reaction temperature in the case of the ring-opening addition of EO to (j) is normally 0° C. to 250° C., preferably 20° C. to 180° C.

The polyether of the second invention thus produced can be purified in the same manner as that for (j).

The number (x) of moles of EO to be added per one hydroxyl group of the polyether is not more than 20 (preferably, not more than 15) (requirement (i)), the primary hydroxyl content (y) of terminal hydroxyl groups is not less than 40% (not less than 60% in the case of monool) (requirement (ii)), preferably not less than 65%, more preferably not less than 85%. Furthermore, (x) and (y) satisfy the relationship expressed by a formula (3) shown below (requirement (iii)), more preferably, a formula (3') shown below.

$$x \leq 5.5xz - 6.5 \times Ln(z) - 6.46 \qquad (3)$$

$$x \leq 5.5xz - 6.5 \times Ln(z) - 7.85 \qquad (3')$$

where z represents 1.03−y/100; Ln(z) represents a natural logarithm of z.

In the case where (x) satisfies the requirement (iii), the hydrophilicity of polyether does not increase, thereby causing a resin obtained as a result of the reaction to have an excellent waterproofness, and an excellent reactivity.

The polyether of the second invention preferably has a Mn of 400 to 100000, more preferably, 500 to 20000. The Mn thereof is selected appropriately according to the use of the same; for instance, in the case where a polyurethane resin is produced, it is selected according to required properties of the polyurethane resin.

Furthermore, among monohydroxy polyethers and polyhydroxy polyethers, polyhydroxy polyethers are preferred, considering utilities of the same as raw materials.

Next, a polyether polyol of the third invention is obtained by random addition and/or block addition of an AO containing a 1,2-AO having not less than three carbon atoms as a principal component and also containing an EO to an active hydrogen compound, and has a hydrophilic-lipophilic balance (HLB) and a primary hydroxyl content (%) of terminal hydroxyl groups of the polyether polyol, which satisfy the relationship expressed by a formula (6) shown below:

$$(HLB) \leq 0.1 \times (\text{primary hydroxyl content}) - 2 \qquad (6)$$

In the third invention, examples of the active hydrogen compound include those applied in the first invention. As the active hydrogen compound, the dihydric alcohols and trihydric alcohols are preferred, and the trihydric alcohols are particularly preferred.

Furthermore, concrete examples of the 1,2-AO and preferable examples of the same are the same as those of the first invention.

As AO, a combination of PO and/or 1,2-BO and EO is preferred, and a combination of PO and EO is more preferred. As the form of addition in the case of a combination, block addition and random addition are applicable. The block addition is particularly preferred as the form of addition, and hence, a terminal-EO block adduct of a PO adduct is preferred.

The quantity of used EO is preferably not more than 30%, more preferably 0.1 to 20 mass %, particularly preferably 1 to 15 mass % with respect to the total mass of AO used.

In the case where the quantity of used EO is not more than 30 mass %, an excellent hydrophobicity can be obtained.

The mean number of hydroxyl groups per one molecule of the polyol of the third invention is preferably 2 to 4, more preferably 2.5 to 4.

In the third invention, a mass mean value of the (HLB) of a polyol and a mass mean value (%) of the primary hydroxyl content (%) of terminal hydroxyl groups thereof are in a relationship expressed by the aforementioned formula (6), and the mass mean value of HLB is preferably not more than 7, more preferably not more than 5.

The mass mean value of HLB is defined to be a value obtained by calculating "a product of HLB of each polyol and a mass ratio thereof (mass ratio is obtained by dividing a mass of each polyether polyol with a sum of masses of all the polyether polyols)" as to each of all the polyether polyols, and summing the same. More specifically, it is expressed by an equation (12) below:

$$(\text{mass mean value of } HLB) = \Sigma(HLB \times \text{mass ratio}) \qquad (12)$$

It should be noted that the HLB herein is calculated by a method devised by Oda of deriving the same from a ratio between a value of inorganic properties of a compound and a value of organic properties thereof (described in, for instance, Teijin Times, p. 22, vol. 9 (1952), and Oda and Teramura, "Synthesis and Applications of Surfactants", p. 501, published by Maki Shoten).

The mass mean value (%) of the primary hydroxyl content of terminal hydroxyl groups of the polyether polyol of the third invention is normally at least 40%, preferably at least 60%, more preferably at least 70%.

This polyol is obtained by the same manner as that for the polyol of the first invention.

According to this method, the primary hydroxyl content of terminal hydroxyl groups of a polyether polyol before the EO addition is not less than 40%, which is extremely high. Therefore, the primary hydroxyl content can be increased with a small quantity of EO, and the hydrophobicity of a polyether polyol obtained as a result is not decreased, thereby making it possible to satisfy the relationship expressed by the formula (6). Thus, by satisfying the formula (6), the obtained polyol is made to have excellent hydrophobicity and reactivity both.

It should be noted that a polyether polyol obtained by a method of reacting PO in the presence of an alkaline catalyst as in the conventional polyether polyol producing method has an extremely low primary hydroxyl content of terminal hydroxyl groups thereof (for instance, normally not more than 2% in the case where potassium hydroxide is used), and most of the terminal hydroxyl groups thereof are secondary hydroxyl groups. Therefore, this polyol has an insufficient reactivity, and to ensure a sufficient reactivity of the same, a method of further adding EO thereto is known.

However, since the terminal hydroxyl groups do not become primary hydroxyl groups unless a large quantity of EO is added thereto, the hydrophobicity of the polyether polyol is decreased due to EO, which has a high hydrophilicity. Therefore, the polyol obtained by the conventional method cannot satisfy the relationship expressed by the formula (6).

By employing a polyether satisfying at least any one of the requirements of the first through third inventions as a polyol component of a polyurethane resin, a polyester resin, an epoxy resin, an acrylic resin, etc., the resin is characterized in that the polyol component is hydrophobic and highly reactive with isocyanate, a carboxylic acid, and an epoxy. In other words, a resin obtained from a polyether of the present invention has characteristics of a high reactivity during the production and a small moisture dependency of resin properties (tensile strength, tear strength, bending strength, etc.). The resin can be applied variously, for foam, elastomers, coating materials, etc. As foam, it can be used for forming cushioning materials, sound insulation/absorption materials, wheels, etc. of cars. As elastomers, it can be used in cast-type potting compounds, etc. As coating materials, it can be used in adhesives and paints, etc. Furthermore, it is also useful as lubricants and washing agents for treating fiber, and raw materials for surfactant compositions such as antifoaming agents.

<<Invention Relating to Resin-Forming Compositions>>

The eighth invention relates to novel resin-forming compositions containing polyether compounds. More specifically, it relates to novel resin-forming compositions containing polyether compounds, which form ester resins, urethane resins, acrylic resins, etc. by reaction.

In the eighth invention, the polyol of the second invention is used as a polyether (K).

It should be noted that (K) that is also the polyol of the first invention is preferred as (K).

In the eighth invention, as a compound (L) reactive with a hydroxyl group of the polyether (K), any compound may be used as long as it provides a stable bond as a result of the reaction with (K). Examples of the same include polyisocyanates, polycarboxylic acids, acid halides of the same, anhydrides of the same, esters of the same (hereinafter referred to as polycarboxylic acids or ester-forming derivatives of the same), and epoxy-group-containing compounds. More specifically, the following are included:

(I) Polyisocyanates:

① Aromatic Polyisocyanates Having 6 to 20 Carbon Atoms (Excluding those Contained in NCO Groups)

1,3- and/or 1,4-phenylene diisocyanates, 2,4-, 2,6-tolylene diisocyanates (TDI), crude TDI, 2,4'-, 4,4'-diphenyl methane diisocyanate (MDI), crude MDI, 4,4'-diisocyanatebiphenyl, 3,3'-dimethyl-4-4'-diisocyanate biphenyl, 3,3'-dimethyl-4,4'diisocyanate diphenylmethane, naphthylene-1,5-diisocyanate, triphenylmethane-4,4', 4"-triisocyanate, m- and p-isocyanate phenylsulfonyl isocyanate, polyaryl polyisocyanate (PAPI), etc.;

② Aliphatic Polyisocyanates Having 2 to 18 Carbon Atoms ethylene diisocyanate, hexamethylene diisocyanate (HDI), tetramethylene diisocyanate, dodecamethylene diisocyanate, 1,6,11-undecan triisocyanate, 2,2,4-trimethylhexamethylene diisocyanate, lysine diisocyanate, 2,6-diisocyanate methyl caproate, bis(2-isocyanate ethyl) fumarate, bis(2-isocyanate ethyl)carbonate, 2-isocyanate ethyl-2,6-diisocyanate hexanoate, trimethylhexamethylene diisocyanate (TMDI), dimer acid diisocyanate (DDI), etc.;

③ Alicyclic Polyisocyanates Having 4 to 15 Carbon Atoms isophorone diisocyanate (IPDI), dicyclohexyl diisocyanate, dicyclohexylmethane diisocyanate (H-MDI), cyclohexylene diisocyanate, hydrogenated tolylenediisocyanate (HTDI), bis(2-isocyanate ethyl)-4-cyclohexene-1,2-dicarboxylate, 2,5- and/or 2,6 norbornane diisocyanate, etc.;

④ Araliphatic Polyisocyanates Having 8 to 15 Carbon Atoms m- and/or p-xylylene diisocyanate (XDI), α,α,α',α'-tetramethyl xylylene diisocyanate (TMXDI), etc.;

④ Modified Products of the Foregoing Polyisocyanates modified products containing a urethane group, a carbodiimide group, an allophanate group, an urea group, a biuret group, a uretdion group, a uretone-imine group, an isocyanurate group, an oxazolidone group, etc.; examples of the modified products include polyol (low-molecular-weight and/or high-molecular-weight polyols shown below) adducts of polyisocyanate [a molar ratio of NCO/OH is preferably 1.01 to 10/1, more preferably 1.1 to 5/1, for instance, an adduct of 1 mole of trimethylolpropane and 3 moles of the foregoing diisocyanate, an adduct of pentaerythritol and 4 moles of the foregoing diisocyanate, etc;

⑤ NCO-Terminal Urethane Prepolymers

NCO-terminal urethane prepolymers that have a weight average molecular weight (hereinafter abbreviated as Mw, determined according to gel permeation chromatography; this also applies hereinafter) of preferably 1000 to 200000, more preferably 2000 to 100000, and preferably having not less than 1.5, more preferably 1.5 to 5, NCO groups in average per one molecule, and are produced by urethanation reaction of the low-molecular-weight or high-molecular-weight polyol described below with the foregoing polyisocyanate under the same conditions as those;

⑥ Diisocyanate Polymers isocyanurates of the foregoing polyisocyanates (trimers, pentamers), biurets of the foregoing diisocyanates (trimers, pentamers), etc. Two or more among these may be used in combination. Among these, TDI, MDI, XDI, and TMXDI are preferred, and MDI and TDI are particularly preferred.

(II) Polycarboxylic Acids or Ester-Forming Derivatives of the Same:

(i) Examples of polycarboxylic acids include saturated carboxylic acids having 4 to 30 carbon atoms and 2 to 8 or more carboxyl groups, and concrete examples of the same include the following compounds:

① Saturated Carboxylic Acids aromatic polycarboxylic acids such as isophthalic acid, terephthalic acid, naphthalenedicarboxylic acid, and diphenyldicarboxylic acid; aliphatic polycarboxylic acids such as succinic acid, adipic acid, azelaic acid, and sebacic acid; and ②  Polycarboxylic Acids Having Polymerizable Unsaturated Groups polycarboxylic acids having polymerizable unsaturated groups, such as maleic acid, fumaric acid, itaconic acid, citraconic acid, and glutaconic acid.

Among these, aromatic polycarboxylic acids and polycarboxylic acids having polymerizable unsaturated groups are preferred.

(ii) Halides of polycarboxylic acids include acid chlorides, bromides, fluorides, and iodides of the foregoing polycarboxylic acids, for instance, maleic acid chlorides, itaconic acid chlorides, fumaric acid bromides, and citraconic acid chlorides.

(iii) Anhydrides of polycarboxylic acids include maleic anhydride, phthalic anhydride, tetrahydrophthalic anhydride, hexahydrophthalic anhydride, tetrabromophthalic anhydride, hexabromophthalic anhydride, himic anhydride, HET anhydride, and endomethylenetetrahydrophthalic anhydride.

(iv) Esters of polycarboxylic acids include lower alkyl (having 1 to 4 carbon atoms) esters (methyl ester, ethyl ester, propyl ester, butyl ester, etc.) of the foregoing polycarboxylic acids.

(III) Epoxy-Group-Containing Compounds

Epoxy-group-containing compounds are classified into monoepoxides (III-1) and polyepoxides (III-2) having not less than two epoxy groups in one molecule.

Though (III-1) is not particularly limited as long as it is a compound having one epoxy group in one molecule, it may be selected appropriately according to the use and purpose. Examples of the same include (III-1-1) to (III-1-2) shown below.

(III-1-1) hydrocarbon-based oxides having 2 to 24 carbon atoms (ethylene oxide, propylene oxide, 1-butene oxide, 2-butene oxide, vinylcyclohexene oxide, α-olefin oxide having 5 to 24 carbon atoms, styrene oxide, etc.);

(III-1-2) glycidyl ethers of hydrocarbons having 3 to 19 carbon atoms (n-butyl glycidyl ether, allyl glycidyl ether, 2-etyl-hexyl glycidyl ether, 2-methyloctyl glycidyl ether, phenyl glycidyl ether, cresyl glycidyl ether, p-sec-butyl phenyl glycidyl ether, p-tert-butyl phenyl glycidyl ether, etc.);

(III-1-3) oxides containing hydroxyl groups, such as glycidyl esters of monocarboxylic acids having 3 to 30 carbon atoms (glycidyl (meth)acrylate, etc.), epihalohydrins such as epichlorohydrin and epibromohydrin, and glycidols.

Though (III-2) is not particularly limited as long as it is a resin having two or more epoxy groups in one molecule, it may be selected appropriately according to the use and purpose. Examples of the same include (III-2-1) to (III-2-5) shown below.

(III-2-1) Glycidyl Ether Type (i) diglycidyl ethers of dihydric phenols; diglycidyl ethers of dihydric phenols having 6 to 30 carbon atoms, for instance, bisphenol F glycidyl ether, bisphenol A diglycidyl ether, bisphenol B diglycidyl ether, bisphenol AD diglycidyl ether, bisphenol S diglycidyl ether, halogenated bisphenol A diglycidyl ether, tetrachlorobisphenol A diglycidyl ether, catechin diglycidyl ether, resorcinol diglycidyl ether, hydroquinone diglycidyl ether, 1,5-dihydroxynaphthalene diglycidyl ether, dihydroxybiphenyl diglycidyl ether, octachloro-4,4'-dihydroxybiphenyl diglycidyl ether, tetramethylbiphenyl diglycidyl ether, 9,9'-bis(4-hydroxyphenyl) fluorene diglycidyl ether, diglycidyl ether obtained by reaction of 2 moles of bisphenol A with 3 moles of epichlorohydrin, etc.;

(ii) polyglycidyl ethers of polyhydric phenols having 3 to 6 or more hydroxyl groups;

polyglycidyl ethers of polyhydric phenols having 3 to 6 or more hydroxyl groups, having 6 to 50 or more carbon atoms and a Mn of 110 to 3000, for instance, pyrogallol triglycidyl ether, dihydroxynaphtylcresol triglycidyl ether, tris (hydroxyphenyl)methane triglycidyl ether, dinaphtyltriol triglycidyl ether, tetrakis(4-hydroxyphenyl)ethane tetraglycidyl ether, p-glycidylphenyldimethyltolyl bisphenol A glycidyl ether, trismethyl-tert-butyl-butylhydroxymethane triglycidyl ether, 4,4'-oxybis(1,4-phenylethyl)tetracresol glycidyl ether, 4,4'-oxybis(1,4-phenylethyl)phenyl glycidyl ether, bis(dihydroxynaphthalene)tetraglycidyl ether, glycidyl ethers of phenols or cresol novolac resins (Mn: 400 to 3000), glycidyl ethers of limonene phenol novolac resins (Mn: 400 to 3000), polyglycidyl ethers of polyphenols (Mn: 400 to 3000) obtained by condensation reaction of phenols with glyoxal, glutar aldehyde, or formaldehyde, polyglycidyl ethers of polyphenols having a Mn of 400 to 3000 obtained by condensation reaction of resorcin and acetone, etc.;

(iii) Diglycidyl Ethers of Aliphatic Dihydric Alcohols diglycidyl ethers of diols having 2 to 100 carbon atoms and a Mn of 62 to 3000, for instance, ethylene glycol diglycidyl ether, propylene glycol diglycidyl ether, tetramethylene glycol diglycidyl ether, 1,6-hexane diol diglycidyl ether, polyethylene glycol (Mn: 150 to 3000) diglycidyl ether, polypropylene glycol (Mn: 180 to 3000) diglycidyl ether, polytetramethylene ether glycol (Mn: 200 to 3000) diglycidyl ether, neopentyl glycol diglycidyl ether, diglycidyl ethers of AO [EO or PO (1 to 20 moles)] adducts of bisphenol A, etc.;

(iv) polyglycidyl ethers of trihydric to hexahydric aliphatic alcohols and those having more than 6 hydroxyl groups; glycidyl ethers of polyhydric alcohols having 3 to 50 or more carbon atoms, three to six or more hydroxyl groups, and a Mn of 76 to 3000, for instance, trimethylolpropane triglycidyl ether, glycerin triglycidyl ether, pentaerythritol tetraglycidyl ether, sorbitol hexaglycidyl ether, poly(n=2 to 5)glycerol polyglycidyl ether, etc.;

(III-2-2) glycidyl ester type; glycidyl esters of aromatic polycarboxylic acids having 6 to 20 or more carbon atoms and a valence of 2 to 6 or above, and glycidyl esters of aliphatic or alicyclic polycarboxylic acids having 6 to 20 or more carbon atoms and a valence of 2 to 6 or above, etc.;

(i) glycidyl esters of aromatic polycarboxylic acids, for instance, phthalic acids, including phthalic diglycidyl ester, isophthalic diglycidyl ester, terephthalic diglycidyl ester, trimellitic triglycidyl ester, etc.;

(ii) glycidyl esters of aliphatic or alicyclic polycarboxylic acids, for instance, aromatic nucleus hydrogenated products of the foregoing phenol-type glycidyl esters, dimeric diglycidyl esters, diglycidyl oxalate, diglycidyl malate, diglycidyl succinate, diglycidyl glutarate, diglycidyl adipate, diglycidyl pimelate, (co)polymers of glycidyl (meth)acrylate (having a polymerization degree of, for instance, 2 to 10), tricarballylic triglycidyl ester, etc.;

(III-2-3) glycidylamine type; glycidylamines of aromatic amines having 6 to 20 or more carbon atoms and 2 to 10 or more active hydrogen atoms, and glycidylamines of aliphatic, alicyclic, or heterocyclic amines;

(i) glycidylamines of aromatic amines, for instance, N,N-diglycidyl aniline, N,N-diglycidyl toluidine, N,N,N',N'-tetraglycidyldiaminodiphenylmethane, N,N,N',N'-tetraglycidyldiaminodiphenylsulfone, N,N,N',N'-tetraglycidyldiethyldiphenylmethane, N,N,O-triglycidylaminophenol, etc.;

(ii) glycidylamines of aliphatic amines, for instance, N,N,N',N'-tetraglycidylxylylenediamine, N,N,N',N'-tetraglycidylhexamethylenediamine, etc.

(iii) glycidylamines of alicyclic amines, for instance, hydrogenated compounds of N,N,N',N'-tetraglycidylxylylenediamine; glycidylamines of heterocyclic amines, for instance, trisglycidyl melamine, etc.;

(III-2-4) aliphatic epoxides; aliphatic epoxides having 6 to 50 or more carbon atoms and 2 to 6 or more epoxy groups, for instance, epoxidated butadiene having an epoxy equivalent of 130 to 1000 (Mn: 170 to 3000, epoxidated soybean oil (Mn: 170 to 3000)), etc.;

(III-2-5) alicyclic epoxides; alicyclic epoxides having 6 to 50 or more carbon atoms, a Mn of 98 to 3000, and 2 to 4 or more epoxy groups, for instance, vinylcyclohexene dioxide, limonene dioxide, dicyclopentadiene dioxide, bis(2,3-epoxy cyclopentyl) ether, ethylene glycol bis epoxy dicyclopentyl ether, bis(3,4-epoxy-6-methylcyclohexylmethyl)adipate, bis(3,4-epoxy-6-methylcyclohexylmethyl)butyl amine, etc.; and nucleus hydrogenated products of the epoxy compounds of the foregoing phenols, etc.

It should be noted that compounds other than (III-2-1) to (III-2-5) may be used as long as they are epoxy resins having glycidyl groups reactive with active hydrogen. Further, two or more among these polyepoxides and monoepoxides may be used in combination.

Among these, polyepoxides are preferred, and diglycidyl ethers of dihydric phenols (having 6 to 30 carbon atoms), and polyglycidyl ethers of polyhydric phenols having 3 to 6 or more hydroxyl groups (having 6 to 50 carbon atoms) are preferred. Particularly preferred are diglycidyl ethers of dihydric polyphenols (having 6 to 30 carbon atoms).

The resin-forming compositions of the present invention are compositions made of the polyether compounds (K) and the compounds (L) that form stable bonds when reacted with the above-mentioned hydroxyl groups, but other components (M) may be added thereto as required. Though the (M) is not particularly limited as long as it is reactive with a hydroxyl group of (K) or a functional group of (L), preferable examples of the same include low-molecular-weight polyols (N) and/or vinyl monomers (O).

Examples of (N) include the same as those of (K), for instance, diols having a Mn of less than 600. More specifically, the examples include: alkylene glycols, such as ethylene glycol, propylene glycol, butanediol, hexanediol, octanediol, neopentyl glycol, cyclohexane dimethanol; polyether diols, such as polyethylene glycol, polypropylene glycol, polytetramethylene glycol; polyester diols such as polyethylene adipate, polybutadiene adipate, polycaprolactone.

Examples of (O) include: vinyl aromatic compounds such as styrene, methyl styrene, vinyl toluene, trimethyl styrene, halogenated styrene, t-butyl styrene, styrene sulfonates, aminostyrene, p-benzyl styrene, and p-phenoxy styrene,; esters of an acrylic acid or a methacrylic acid with an aliphatic alcohol such as methanol, ethanol, propanol, octanol, hexanol, tetrahydrofurfuryl alcohol, ethylene glycol, and propylene glycol; esters of amino-group-containing acrylic acids or methacrylic acids such as 2-aminoethyl methacrylate, and N,N-diethylaminoacrylatek; acrylates such as hydroxyethyl acrylate, 2-hydroxypropyl acrylate, diethylene glycol monoacrylate, tripropylene glycol monoacrylate, and trimethylol propane diacrylate; compounds having 1 to 4 or more hydroxyl groups and 1 to 4 or more polymerizable unsaturated groups in one molecule such as hydroxyethyl methacrylate, 2-hydroxypropyl methacrylate, hydroxybutyl methacrylate, polyethylene glycol monomethacrylate, diethylene glycol monomethacrylate, polyethylene (polymerization degree=1 to 100) glycol monomethacrylate, and pentaerythritol trimethacrylate;

α,β-unsaturated dicarboxylic acids such as maleic acid, fumaric acid, crotonic acid, and itaconic acid, and anhydrides, esters, amides, and imides of the same; esters of fumaric acid such as diethyl fumarate, dioctyl fumarate, etc.; various kinds of vinyl monomers such as acrylonitrile, methacrylonitrile, vinyl acetate, vinyl chloride, vinylidene chloride, vinylene carbonate, vinyl-2-chloroethyl ether, alkyl vinyl ether, aliphatic vinyl esters, 2-vinylfuran, vinylphenol, vinylphenyldisiloxane, 2-vinyl pyridine, 4-vinyl pyridine, vinylpyrrole, vinylpyrrolidone, vinylsulfonic acid, vinyl urethane, and vinyl carbazole; conjugated diene compounds and derivatives thereof such as 1,3-butadiene, isoprene, piperylene, methyl pentadiene, chloroprene, 2-methoxybutadiene, and 1-cyanobutadiene; multifunctional vinyl monomers such as diallyl maleate, diallyl phthalate, divinyl benzene, divinyl ether, neopentyl glycol diacrylate, diallyl cyanurate, triallyl cyanurate, diallyl phenyl phosphate, and 2,3-divinylpyridine In the present invention, the above-described (K) and (L) are combined to form a resin-forming composition, and according to necessity, (M) is combined therewith. Though the combination is not limited, combinations [i] to [viii] described below are preferred.

[i]: combinations in which (K) is a high-molecular-weight polyol, (L) is a compound selected from aromatic polycarboxylic acids and derivatives thereof, and according to necessity a low-molecular-weight polyol may be added as (M) thereto;

[ii]: combinations in which (K) is a polyol, (L) is a compound selected from polycarboxylic acids having polymerizable unsaturated groups and derivatives thereof, and according to necessity a vinyl monomer may be added as (M) thereto;

[iii]: combinations in which (K) is a divalent to octavalent polyol, and (L) is a divalent to octavalent polyisocyanate;

[iv]: combinations in which (K) is a high-molecular-weight polyol, (L) is a polyisocyanate, and according to necessity a low-molecular-weight polyol may be added as (M) thereto;

[v]: combinations in which (K) is a polyol, (L) is a compound selected from monocarboxylic acids having polymerizable unsaturated groups and derivatives thereof, and according to necessity a monool is preferably added as (M) thereto;

[vi]: combinations in which (K) is a polyol, (L) is a compound selected from polycarboxylic acids and derivatives thereof, and (M) is a compound having 1 to 4 or more hydroxyl groups and 1 to 4 or more polymerizable unsaturated groups in one molecule;

[vii]: combinations in which (K) is a polyol, (L) is a polyisocyanate, and (M) is a compound having 1 to 4 or more hydroxyl groups and 1 to 4 or more polymerizable unsaturated groups in one molecule;

[viii]: combinations in which (K) is a polyol having 2 to 8 functional groups, and (L) is an epoxy-group-containing compound (III).

The combination [i] is a combination for providing a thermoplastic polyester resin forming composition that, as a result of reaction, forms an aromatic polyester. (K) is preferably a divalent high-molecular-weight diol having a Mn of 800 to 20000, more preferably, a polyoxyalkylene glycol having a Mn of 1000 to 5000. (L) is preferably a compound selected from aromatic dicarboxylic acids having 8 to 30 carbon atoms and derivatives thereof, more preferably a compound selected from terephthalic acid, isophthalic acid, naphthalenedicarboxylic acid, and derivatives thereof, particularly preferably terephthalic acid.

The quantity of (L) is preferably 50 to 90 mass %, more preferably 60 to 70 mass % with respect to the total mass of (K) and (L). (M) is preferably ethylene glycol, propylene glycol, hexanediol, neopentyl glycol, or 1,4-butanediol, particularly preferably either ethylene glycol or 1,4-butanediol.

The quantity of (M) is preferably 10 to 70 mass %, more preferably 20 to 60 mass % with respect to the total mass of (K) and (L).

In this case, a condensation catalyst, a monool, and an aliphatic saturated dicarboxylic acid may be further added if necessary, so as to obtain a thermoplastic polyester polycondensation product. Examples of the condensation catalyst include, for instance, titanium catalysts such as tetrabutyl titanate, tetramethyl titanate, and potassium titanium oxalate; antimony catalyst; germanium catalyst; tin compounds such as dibutyl tin oxide, and dibutyl tin dilaurylate; and lead compounds such as lead acetate. Examples of the monool include the same as those described above as such monools, for instance: monohydric alcohols having 1 to 28 carbon atoms, such as methanol, ethanol, n-butanol, t-butanol, lauryl alcohol, stearyl alcohol, and allyl alcohol; and AO adducts of the monohydric alcohols having a molecular weight of 76 to 600, such as PO adducts of methanol, and EO adducts of n-butanol. As the aliphatic saturated dicarboxylic acid, among the polycarboxylic acids listed in ① of (II), a dicarboxylic acid, such as adipic acid or sebacic acid, may be used.

The content of each component in the total mass of a thermoplastic polyester resin-forming composition is as follows: the condensation catalyst is preferably 0 to 1 mass %, more preferably 0.01 to 0.1 mass %; the monool is preferably 0 to 20 mass %, more preferably 1 to 10 mass %; and the aliphatic saturated dicarboxylic acid is preferably 0 to 50 mass %, more preferably 1 to 20 mass %.

As the thermoplastic polyester resin-forming composition of the combination [i], a thermoplastic polyester polycondensation product may be used as it is, but an additive as follows may be added further thereto: a fibrous reinforcer such as, glass fiber, carbon fiber, potassium titanate, boron fiber, gypsum fiber, etc.; an inorganic filler such as talc, mica, glass flake, wollastonite, clay, calcium carbonate, calcium silicate, silica, chalk, glass beads, quartz, barium sulfate, or titanium oxide; and an antioxidant, a UV absorber, a plasticizer, a lubricant, a flame retardant, an antistatic agent, a release agent, a colorant, a crystal nucleus, etc. As to the contents of the components with respect to the entirety of the thermoplastic polyester resin-forming composition, the content of the fibrous reinforcer and the inorganic filler together is preferably 0 to 70 parts by mass, more preferably 5 to 30 mass %; the content of a sum of the additives is preferably 0 to 30 mass %, more preferably 1 to 20 mass %.

Though the method for producing a thermoplastic polyester resin-forming composition of the combination [i] is not particularly limited, the composition is preferably obtained by a polycondensation reaction caused by adding the foregoing materials in a reactor and heating the same at a temperature of preferably 80 to 250° C., more preferably 100 to 230° C. More preferably, the pressure is decreased in a latter half of the reaction. The end point of the reaction is detected according to an acid value, a hydroxyl value, and a molecular weight, but varies according to the composition and the molecular weight of a reaction product. The other components to be mixed according to necessity may be added before the reaction or at the middle of the reaction. Alternatively, they may be added by kneading the same in an extruder or a kneader, or by preparing a pellet by kneading some certain components in an extruder or a kneader and then melt-blending the other components therein.

The thermoplastic polyester resin-forming composition thus obtained may be molded in a plate form, a sheet form, a film form, or a tube form under usual molding conditions. Besides, after the reaction product is cooled and formed in a pellet, it may be formed in a filament form by melt spinning.

The combination [ii] is a combination providing a resin forming composition that, as a result of reaction, forms an unsaturated polyester. A polyol as (K) is preferably a diol having a Mn of 700 to 5000, more preferably polyoxyalkylene glycol having a Mn of 1000 to 3000. A polycarboxylic acid having polymerizable unsaturated groups or a derivative of the same as (L) is preferably a dicarboxylic acid having a polymerizable unsaturated group or a derivative of the same, more preferably maleic acid, itaconic acid, citraconic acid, or a derivative of the same, particularly preferably an anhydride of maleic acid, itaconic acid, or citraconic acid. The quantity of (L) is preferably 10 to 90 mass %, more preferably 50 to 80 mass %, with respect to the total mass of (K) and (L).

In the case of the combination [ii], a condensation catalyst, a monool, or an aliphatic saturated polycarboxylic acid is added thereto according to necessity, so as to obtain an unsaturated polyester polycondensation product. As the condensation catalyst, the monool, and the aliphatic saturated polycarboxylic acid, those mentioned for the combination [i] may be used.

As to the content of each component with respect to the entirety of the unsaturated polyester polycondensation product, the condensation catalyst is preferably 0 to 1 mass %, more preferably 0.01 to 0.1 mass %; the monool is preferably 0 to 20 mass %, more preferably 1 to 10 mass %; the aliphatic saturated dicarboxylic acid is preferably 0 to 50 mass %, more preferably 1 to 20 mass %.

An unsaturated polyester resin-forming composition is obtained by further adding the vinyl monomer (O) and a polymerization initiator as required to the foregoing resin-forming composition of the combination [ii]. (O) is preferably styrene, vinyl toluene, α-methyl styrene, chlorostyrene, divinyl benzene, methyl methacrylate, methyl acrylate, diallyl phthalate, or triallyl cyanurate. The content of (O) is preferably 10 to 80 mass %, more preferably 20 to 70 mass % with respect to the total mass of the resin-forming composition.

As a polymerization initiator, ordinary radical polymerization initiators such as organic peroxides, organic hydroperoxides, azo compounds, etc. may be used. Concrete examples of the same include:

(1) Organic Peroxides alkyl peroxides such as dicumyl peroxide, di-t-butyl peroxide, and t-butyl cumyl peroxide.; diacyl peroxides such as dilauroyl peroxide, dibenzoyl peroxide, dicetyl peroxide, didecanoyl peroxide, and diisononanoyl peroxide; peracid esters such as t-butyl peroctoate, t-butyl peroxybenzoate, methylethylketone peroxide, and cyclohexanone peroxide;

(2) Organic Hydroperoxides t-butyl hydroperoxide, cumyl hydroperoxide, 2,5-dimetyl-2,5-dihydroperoxyhexane, p-methane hydroperoxide, and diisopropylbenzene hydroperoxide;

(3) Azo Compounds diazoaminobenzene, N,N'-dichloroazodicarbonamide, diethyl azodicarboxylate, 1-cyano-1-(t-butylazo) cyclohexanone, azobis(isobutylonitrile), etc.

Among these, organic peroxides are preferred, and t-butyl peroxybenzoate is more preferred. The content of the polymerization initiating catalyst is preferably 0.1 to 15 mass %, more preferably 0.5 to 5 mass % with respect to a mass of the entirety of the resin-forming composition.

Furthermore, the following additives may be added: aromatic or aliphatic saturated dicarboxylic acids, such as phthalic acid, isophthalic acid, terephthalic acid, tetrahydrophthalic acid, succinic acid, adipic acid, glutaric acid, sebacic acid, and pimelic acid; modifiers such as monobasic acids, polybasic acids having a valence of not less than 3, monohydric alcohols, and polyhydric alcohols having not less than 3 hydroxyl groups; shrinkage-reducing agents such as polystyrene, polyacrylate, polyvinyl acetate, and polycarbonate; thickeners such as magnesium hydroxide, calcium oxide, barium hydroxide, and zinc oxide; fibrous reinforcer such as glass, metal, silicates, asbestos, carbon, polyester, and polyamide; inorganic fillers; pigments such as titanium oxide, carbon black, and phthalocyanine; lubricants or release agents such as aluminum stearate, and calcium stearate; stabilizers such as barium soap, tin octanoate, and BHT; a silane coupling agent, and a flame retardant. As to the content of each component in the entirety of the resin-forming composition, the modifier is preferably 0 to 30 mass %, more preferably 0.5 to 10 mass %; the shrinkage reducing agent is preferably 0 to 70 mass %, more preferably 1 to 20 mass %; the thickener is preferably 0 to 10 mass %, more preferably 0.5 to 5 mass %; the fibrous reinforcer is preferably 0 to 60 mass %, more preferably 10 to 50 mass %; the inorganic filler is preferably 0 to 80 mass %, more preferably 10 to 50 mass %; the total mass of the lubricant or release agent, the stabilizer, the silane coupling agent, and the flame retardant is preferably 0 to 30 mass %, more preferably 1 to 20 mass %.

Though the method for producing the unsaturated polyester resin-forming composition of the composition [ii] is not particularly limited, one example of the method is as follows. Materials constituting the combination [ii] are heated at a temperature of preferably 80 to 250° C., more preferably 100 to 230° C., for 3 to 10 hours in a reactor while stirred, and a polycondensation product is obtained by dehydration. Herein, a modifier may coexist. The end point of the reaction is detected according to an acid value and a hydroxyl value. Subsequently, the additives are mixed into the foregoing polycondensation product. A preferable mixing method is such that a first mixture of the polycondensation product and a vinyl monomer and a second mixture of a shrinkage-reducing agent and a vinyl monomer are prepared, a curing agent, and if necessary, the foregoing additives, are mixed in one of the same or the both, and further, the first and second mixtures are mixed.

An unsaturated polyester resin-forming composition thus obtained is, after formed into an intermediate compound such as a sheet molding compound (SMC) or a bulk molding compound (BMC), molded by compression molding or injection molding, thereby becoming cured products. The cured product is used in automotive components, materials for transport vehicles such as boats, construction materials such as bath tubs and purified water tanks, chairs, and other industrial products.

The combination [iii] is a combination providing a cast urethane resin, in which a polyol (K) that is preferably divalent to tetravalent and a polyisocyanate (L) that is preferably divalent to tetravalent are combined. (L) is more preferably TDI, MDI, XDI, TMXDI, or the like, particularly preferably MDI or TDI. As to the ratio of (K) and (L), (L) is preferably 10 to 80 mass %, more preferably 20 to 70 mass %, with respect to the total mass of (K) and (L).

In the case of the combination [iii], if necessary, a high-molecular-weight diol other than polyethers, a monool, a low-molecular-weight polyol (urethane curing agent) having a molecular weight of 62 to 400, and a urethanation promoting catalyst are further added, so that a cast urethane resin-forming composition is obtained. Furthermore, a filler, a plasticizer, an antioxidant, and an ultraviolet absorber, etc. may be further added thereto as required.

Examples of high-molecular-weight polyols other than polyethers include polycondensation products of one or not less than two alkylene glycols selected from diols having a Mn of 600 to 4000, such as ethylene glycol, propylene glycol, butanediol, pentanediol, and hexanediol, and one or not less than two alkylenedicarboxylic acids such as adipic acid, suberic acid, and sebatic acid; lactone polyols obtained by ring-opening polymerization of lactones, such as polypropiolactone polyol, polycaprolactone polyol, and polyvalerolactone polyol; and polycarbonate. Examples of monools include the same as those described above as such monools.

Examples of the low-molecular-weight polyols having a molecular weight of 62 to 400 (urethane curing agent) include, among those mentioned as (N), dihydric alcohols such as 1,4-butanediol, ethylene glycol, propylene glycol, diethylene glycol, triethylene glycol, neopentyl glycol, 1,6-hexanediol, dipropylene glycol, and 3-methyl-1,5-pentanediol; alcohols having not less than three hydroxyl groups, such as trimethylolpropane, glycerin, 1,2,6-hexatriol, 1,2,4-butanetriol, trimethylolethane, diglycerol, and pentaerythritol; amine-containing polyhydric alcohols such as triethanolamine, tri-isopropanolamine, and di-isopropanolamine.

Examples of the urethanation promoting catalysts include: tin-based catalysts such as trimethyl tin laurate, trimethyl tin hydroxide, dimethyltin dilaurate, dibutyltin diacetate, dibutyltin dilaurate, stannous octoate, and dibutyltin dimaleate; lead-based catalysts such as lead oleate, lead 2-ethylhexanate, lead naphthenate, and lead octanoate; metal naphthenates such as cobalt naphthenate, and phenylmercury propionate; diazabicycloalkenes, such as triethylenediamine, tetramethylethylenediamine, and tetramethylhexylenediamine; amine-based catalysts such as dimethylaminoethylamine, dimetylaminopropylamine, diethylaminopropylamine, dibutylaminoethylamine, dimethylaminooctylamine, dipropylaminopropylamine, 2-(1-aziridinyl)ethylamine, 4-(1- piperidinyl)-2-hexylamine, N-methylmorpholine, N-ethylmorpholine, triethylamine, diethylethanolamine, and dimethylethanolamine, as well as organic salts of the same (formates, etc.); and two or more among the same used in combination. The content of the urethanation promoting catalyst used in the present invention is preferably 0 to 10 mass %, more preferably 0.01 to 5 mass %, with respect to an entirety of the cast urethane resin-forming composition.

Examples of the filler include clay, heavy calcium carbonate, calcium carbonate subjected to surface treatment with an aliphatic acid, barium sulfate, alumina, silica, carbon black, calcium oxide, titanium oxide, diatomaceous earth, glass fiber and crushed products of glass (cut glass, milled glass, glass flakes, etc.), Shirasu Balloon, carbon fiber, potassium titanate, boron fiber, gypsum fiber, talc, mica, wollastonite, calcium silicate, chalk, glass beads, and quartz. The content of the filler is preferably 5 to 50 mass %, more preferably 10 to 30 mass % with respect to an entirety of the cast urethane resin-forming composition.

Examples of the plasticizer include: ester-based plasticizers [dibutyl phthalate, dioctyl phthalate, dioctyl adipate, polyethylene glycol (Mn: 200) diadipate, etc.]; tar-based plasticizers (tar, asphalt, etc.); and petroleum resin-based plasticizers. The content of the plasticizer is preferably 5 to 70 mass %, more preferably 15 to 50 mass %.

Examples of antioxidants include hindered phenol-based antioxidants ["IRGANOX 1010" (manufactured by Chiba-Geigy Co., Ltd.), octadecyl-3-(3,5-di-t-butyl-4-hidroxyphenyl)propionate ("IRGANOX 1076" manufactured by Chiba-Geigy Co., Ltd.), etc.], and hindered amine-based antioxidants ["SANOL S770" (manufactured by Chiba-Geigy Co., Ltd.), 4-benzoyloxy-2,2,6,6,-tetramethylpiperidine ("SANOL LS-744" manufactured by Sankyo Co., Ltd.), etc.]. The content of the antioxidant is preferably 0.001 to 10 mass %, more preferably 0.01 to 5 mass %.

Examples of the ultraviolet absorber include triazole-based ultraviolet absorbers [2- (5-methyl-2-hydroxyphenyl) benzotriazol, "Tinuvin 320" (manufactured by Chibageigy Co., Ltd.), etc.], and benzophenone-based ultraviolet absorbers [2-hydroxy-4-methoxybenzophenone, "CYASORB UV9" (manufactured by American Cyanamid, etc.]. The content of the ultraviolet absorber is preferably 0.001 to 10 mass %, more preferably 0.01 to 5 mass %.

Though the method for producing the cast urethane resin is not particularly limited, the examples of the same include a method such that: (K) and excess polyisocyanate, and if necessary, a high-molecular-weight diol other than (K), are reacted at a temperature of preferably 50 to 120° C., more preferably 70 to 100° C. so that a prepolymer with terminal isocyanate is prepared, and then, the prepolymer is reacted with the low-molecular-weight diol, and if necessary, the aforementioned monool, additional diol, high-molecular-weight diol other than polyether, filler, plasticizer, antioxidant, ultraviolet absorber, etc. The reaction with polyisocyanate may be carried out by, for instance, a method in which each component is measured, mixed, and stirred, or a method in which each component is measured by means of a metering pump, mixed by stirring intensely, dropped on a vat, and further, reacted at a temperature of preferably 80 to 200° C., more preferably 120 to 160° C., and crushed. Alternatively, it may be carried out by, for instance, a method in which the foregoing materials are supplied to an extruder whose temperature is set to be preferably 80 to 260° C., more preferably 120 to 250° C., the materials are kneaded in the extruder and transported while being polymerized, then extruded from a die.

The combination [iv] is a combination providing a resin-forming composition for forming a thermoplastic urethane resin as a result of reaction. (K) is preferably a high-molecular-weight diol, more preferably a high-molecular-weight diol having a Mn of 800 to 20000, (L) is preferably diisocyanate, more preferably TDI, MDI, XDI, TMXDI, or the like, particularly preferably MDI or TDI. As to a ratio of (K) and (L), (L) is preferably 10 to 80 mass %, more preferably 20 to 70 mass %, with respect to the total mass of (K) and (L).

Furthermore, a low-molecular-weight polyol can be added as (M), as required. Furthermore, a high-molecular-weight diol other than (K), a monool, and a urethanation promoting catalyst may be added further as required, so that a thermoplastic urethane resin can be obtained. Additionally, a filler, an antioxidant, and an ultraviolet absorber may be further added thereto.

As materials other than (K), those applied in the combination [iii] can be used. The content of the urethanation promoting catalyst is preferably 0 to 10 mass %, more preferably 0.01 to 5 mass %, with respect to an entirety of the cast urethane resin-forming composition. The content of the filler is preferably 5 to 50 mass %, more preferably 10 to 30 mass %. The content of the antioxidant is preferably 0.001 to 10 mass %, more preferably 0.01 to 5 mass %. The content of the ultraviolet absorber is preferably 0.001 to 10 mass %, more preferably 0.01 to 5 mass %.

Though the method for producing a thermoplastic urethane resin is not particularly limited, the examples of the same include: the prepolymer method such that (K) and excess polyisocyanate, and if necessary, a high-molecular-weight diol other than (K), are reacted at a temperature of preferably 50 to 120° C., more preferably 70 to 100° C. so that a prepolymer with terminal isocyanate is prepared, and then, the prepolymer is reacted with a low-molecular-weight diol;, and the one shot method in which a polyol compound made of a mixture of (K) and a low-molecular-weight diol, and if necessary, a high-molecular-weight diol other than (K) is reacted with polyisocyanate. The reaction with polyisocyanate may be carried out by, for instance, a method of measuring and mixing each component and stirring the same, or a method of measuring each component by means of a metering pump, mixing the same by stirring intensely, dropping the same on a vat, and further, reacting the same at a temperature of preferably 80 to 200° C., more preferably 120 to 160° C., and crushing the same. Furthermore, it may be carried out by, for instance, a method in which the foregoing materials are supplied to an extruder whose temperature is set to be preferably 80 to 260° C., more preferably 120 to 250° C., the materials are kneaded in the extruder and transported while being polymerized, then extruded from a die.

The combination [v] is a combination providing a resin-forming composition that forms an acryl polyether resin as a result of reaction, in which (K) is a monool or a diol, while (L) is a compound selected from monocarboxylic acids having polymerizable unsaturated groups and derivatives of the same. A monool is preferably added as (M). Examples of the monocarboxylic acid having polymerizable unsaturated bonds include aliphatic monocarboxylic acids having 3 to 10 carbon atoms. More specifically, examples of the same include methacrylic acid, acrylic acid, α-acetoxyacrylic acid, β-ethoxyacrylic acid, among which methacrylic acid and acrylic acid are preferred. Examples of halides of the same include chlorides, bromides, and iodides of aliphatic monocarboxylic acids having 3 to 10 carbon atoms, among which chlorides of methacrylic acids and acrylic acids are preferred. Examples of anhydrides of the same include anhydrides of the aliphatic monocarboxylic acids having polymerizable unsaturated bonds and having 3 to 10 carbon atoms. Examples of esters of the same include alkyl esters having 1 to 4 carbon atoms of the aliphatic carboxylic acids having polymerizable unsaturated bonds and having 3 to 10 carbon atoms, for instance, methyl ester, ethyl ester, butyl ester, etc., among which methyl methacrylate and methyl acrylate are preferred.

The content of a monocarboxylic acid having polymerizable unsaturated bonds or a derivative of the same is preferably 10 to 30 mass %, more preferably 10 to 25 mass %, with respect to the total mass of (K) and (L).

In the case of the combination [v], an acryl polyether resin-forming composition is obtained. Furthermore, condensation catalysts, high-molecular-weight diols other than polyethers, monools, polyfunctional monomers, and reactive diluents can be used.

As the condensation catalysts, high-molecular-weight diols other than (K), and monools, those mentioned above can be used. The polyfunctional monomers having 2 to 8 or more functional groups typically include, in addition to the polyfunctional vinyl monomers mentioned as (O), ethylene glycol diacrylate, diethylene glycol dimethacrylate, propylene glycol diacrylate, trimethylene glycol dimethacrylate, neopentyl glycol diacrylate, butylene glycol di methacrylate, 1,10-decamethylene glycol diacrylate, glycerin dimethacrylate, trimethylol propane triacrylate, pentaerythritol tetramethacrylate, and pentaerythritol triacrylate. The reactive diluents include methyl acrylate, methyl methacrylate, ethyl methacrylate, propyl methacrylate, hexyl acrylate, 2-ethylhexyl acrylate, cyclohexyl methacrylate, and phenoxyethyl acrylate.

Though the method for producing the acryl polyether resin-forming composition is not particularly limited, the acryl polyether resin-forming composition may be obtained by the condensation reaction of (K) and a carboxylic acid having polymerizable unsaturated groups, and if necessary, a high-molecular-weight diol other than polyethers, and a monool, at a temperature of 70 to 110° C., preferably 80 to 100° C. under an atmospheric pressure or a reduced pressure. To smoothly promote the condensation reaction, a condensation catalyst preferably is added, and a latter half of the reaction preferably is carried out under a reduced pressure. Furthermore, in the case where a monool is added, the monool preferably is added at the last stage of the reaction. The end point of the reaction can be detected according to an acidic value and a hydroxyl value.

The acryl polyether resin forming composition thus obtained is normally in a soft material state or in a liquid state, to which additives such as a radical initiator, a polymerization inhibitor, a filler, a plasticizer, an antioxidant, and an ultraviolet absorber may be added further so as to give or adjust desired characteristics. Thereafter, the composition is cured in a desired shape by means of heat or radiation of ultraviolet rays, electron beams, etc.

As the radical initiator, an ordinary radical initiator may be used, or alternatively, an ultraviolet initiator may be used. Examples of the ordinary radical initiator include those described above as such radical initiators. Examples of the ultraviolet initiator include: benzoinalkylethers such as benzoinmethylether, and benzoinbutylether; acetophenones such as 2,2'-dimethoxy-2-phenylacetophenone, 2-hydroxy-2-methyl-1-phenylpropane-1-on, 1-hydroxycyclohexyl phenyl ketone, and 2-methyl-1-[4-(methylthio)phenyl]-2-morpholinopropane-1-on; and ketals such as acetophenone dimethylketal, and benzyldimethylketal. Examples of the polymerization inhibitor include hydroquinone, p-methoxyphenol, 2,6-di-t-butyl-p-cresol, pyrogallol, and β-naphthol.

The combination [vi] is a combination providing a resin-forming composition that forms, as a result of reaction, an acryl ester resin, and (K) and (L) are preferably a diol and a dicarboxylic acid, respectively. A compound having 1 to 4 or more hydroxyl groups and 1 to 4 or more polymerizable unsaturated groups in one molecule is preferably added as (M). It is more preferable that (M) is hydroxyethyl methacrylate, hydroxyethyl acrylate, 2-hydroxypropyl acrylate, or 2-hydroxypropyl methacrylate. Examples of the dicarboxylic acid include adipic acid, succinic acid, phthalic acid, isophthalic acid, terephthalic acid, sebacic acid, and cyclohexanedicarboxylic acid, among which adipic acid, isophthalic acid, terephthalic acid, and sebacic acid are preferred. Examples of the halides of the same include chlorides, bromides, and iodides of the dicarboxylic acids. Examples of the acid anhydrides of the same include anhydrides of the dicarboxylic acids, among which maleic anhydride and phthalic anhydride are preferred. Examples of the esterified products of the same include monomethyl esters, dimethyl esters, diethyl esters, and monobutyl esters of the dicarboxylic acids, among which dimethyl adipate, dimethyl isophthalate, dimethyl terephthalate, and dimethyl sebacate are preferred.

The content of a dicarboxylic acid and a derivative of the same is preferably 20 to 70 mass %, more preferably 30 to 50 mass %, with respect to the total mass of (K) and (L). The quantity of (M) is preferably 5 to 50 mass %, more preferably 10 to 30 mass %, with respect to the total mass of (K) and (L).

By the combination [vi], an acryl ester resin-forming composition can be obtained. Further, a condensation catalyst, a high-molecular-weight diol other than (A), a monool, a polyfunctional monomer, a reactive diluent, a filler, an antioxidant, an ultraviolet absorber, etc. may be used. As the condensation catalyst, the high-molecular-weight diol other than (K), the monool, the polyfunctional monomer, the reactive diluent, the filler, the antioxidant, and the ultraviolet absorber, those mentioned above can be used.

Though the method for producing an acryl ester resin forming composition is not particularly limited, one example of the same is as follows. A polyether ester is obtained by polycondensation reaction caused by adding a diol (K), a dicarboxylic acid and a derivative thereof (L), and if necessary, a condensation catalyst, a high-molecular-weight diol other than (K), and a monool in a reactor and heating the same at a temperature of 80 to 250° C., preferably 100 to 230° C. Preferably, the pressure is decreased in a latter half of the reaction. The polyether ester thus obtained, and a carboxylic acid having polymerizable unsaturated groups, and if necessary, a high-molecular-weight diol other than the polyether, and a monool are subjected to a temperature of 70 to 110° C., preferably 80 to 100° C. under an atmospheric pressure or a reduced pressure, so as to cause a condensation reaction. To smoothly promote the condensation reaction, the addition of a condensation catalyst preferably is added, and the pressure preferably is reduced in a latter half of the reaction. Furthermore, in the case where a monool is added, the monool preferably is added at the last stage of the reaction. The end point of the reaction can be detected according to an acidic value and a hydroxyl value.

The acryl ester resin-forming composition thus obtained is normally in a soft material state or in a liquid state, to which additives such as a radical initiator, a polymerization inhibitor, a filler, a plasticizer, an antioxidant, and an ultraviolet absorber further may be added so as to give or adjust desired characteristics. Thereafter, the composition is cured in a desired shape by means of heat or radiation of ultraviolet rays, electron beams, etc. As the radical initiator, an ordinary radical initiator may be used, or alternatively, an ultraviolet initiator may be used. Examples of the ordinary radical initiator and the ultraviolet absorber include those described above.

The combination [vii] is a combination providing a resin-forming composition that forms, as a result of reaction, an acryl urethane resin, and (K) and (L) are preferably a diol and a diisocyanate, respectively. A compound having 1 to 4 or more hydroxyl groups and 1 to 4 or more polymerizable unsaturated groups in one molecule preferably is added as (M). It is more preferable that (M) is hydroxyethyl methacrylate, hydroxyethyl acrylate, 2-hydroxypropyl acrylate, or 2-hydroxypropyl methacrylate. The content of (L) is preferably 20 to 70 mass %, more preferably 30 to 50 mass %, with respect to the total mass of (K) and (L). The quantity of (M) is preferably 5 to 50 mass %, more preferably 10 to 30 mass %, with respect to the total mass of (K) and (L).

Further, a condensation catalyst, a high-molecular-weight diol other than (K), a monool, a polyfunctional monomer, a reactive diluent, a urethanation promoting catalyst, a filler, an antioxidant, an ultraviolet absorber, etc. may be used. As the condensation catalyst, the high-molecular-weight diol other than polyether, the monool, the polyfunctional monomer, the reactive diluent, the urethanation promoting catalyst, the filler, the antioxidant, and the ultraviolet absorber, those mentioned above can be used.

Though the method for producing an acryl urethane resin is not particularly limited, the acryl urethane resin may be obtained by the prepolymer method, or the one shot method. In the prepolymer method, first of all, a prepolymer with terminal isocyanate is prepared by reacting (K), excess polyisocyanate, and if necessary, a high-molecular-weight diol other than (K) at a temperature of 50 to 120° C., preferably 70 to 100° C. Thereafter, the prepolymer is reacted with a compound (O) having 1 to 4 or more hydroxyl groups and 1 to 4 or more polymerizable unsaturated groups in one molecule, and if necessary, a monool, and a polyfunctional monomer. In the one shot method, a polyol compound obtained by mixing (K), (O), and if necessary, a high-molecular-weight diol other than (K) is reacted with polyisocyanate. The reaction with polyisocyanate is carried out, for instance, by measuring and mixing each component and reacting the same at a temperature of preferably 80 to 200° C., more preferably 120 to 160° C. The end point of the reaction is detected by a NCO content.

The acryl urethane resin-forming composition thus obtained is normally in a soft material state or in a liquid state, to which additives such as a radical initiator, a polymerization inhibitor, a filler, a plasticizer, an antioxidant, and an ultraviolet absorber further may be added so as to give or adjust desired characteristics.

As the radical initiator, the polymerization inhibitor, the filler, the plasticizer, the antioxidant, and the ultraviolet absorber, those described above can be used. The content of the radical initiator is 0 to 10 mass %, preferably 0.01 to 5 mass %, with respect to the entirety of the resin-forming composition. The content of the polymerization inhibitor is 0 to 10 mass %, preferably 0.01 to 5 mass %, with respect to the entirety of the resin-forming composition. The content of the filler is preferably 5 to 50 mass %, more preferably 10 to 30 mass %. The content of the antioxidant is preferably 0.001 to 10 mass %, more preferably 0.01 to 5 mass %, with respect to the entirety. The content of the ultraviolet absorber is preferably 0.001 to 10 mass %, more preferably 0.01 to 5 mass %, with respect to the entirety.

The combination [viii] is a combination providing a resin-forming composition that forms, as a result of reaction, an epoxy resin. (K) is preferably a divalent to tetravalent polyol. (L) is the aforementioned epoxy-group-containing compound, preferably an epoxy compound having 1 to 10 functional groups and an epoxy equivalent of 100 to 300, more preferably an epoxy resin of a bisphenol A diglycidyl ether type.

The content of the epoxy-group-containing compound is preferably 50 to 95 mass %, more preferably 70 to 95 mass %, with respect to the total of (K) and (L).

By using the combination [viii] and an epoxy resin curing agent, an epoxy resin-forming composition can be obtained. Further, a polyester polyol, an epoxy reaction catalyst, an inorganic filler, a solvent, a plasticizer, and a curing accelerator may be used.

Examples of the epoxy resin curing agent include: aliphatic amines such as ethylene diamine, diethylene triamine, triethylene tetramine, and xylylene diamine; alicyclic amines such as 4,4'-diaminobiscyclohexylmethane, isophoronediamine, and hydrogenated xylylenediamine; aromatic amines such as aniline, dimethyl aniline, diaminodiphenyl methane, and phenylene diamine; carboxylic acids and anhydrides of the same, such as phthalic anhydride, hexahydrophthalic acid, and tetrahydrophthalic acid; $BF_3$ complex; dicyandiamide; and imidazoles.

The polyester polyols include polyesters having a Mn of 600 to 5000, preferably 1000 to 3000, obtained by polycondensation of a diol component with a dicarboxylic acid or an anhydride thereof, in which the diol component is ethylene glycol, propylene glycol, butylene glycol, neopentyl glycol, cyclohexane dimethanol, etc., and the dicarboxylic acid is phthalic acid, isophthalic acid, terephthalic acid, tetrahydrophthalic acid, adipic acid, azelaic acid, sebacic acid, maleic acid, glutaric acid, chlorendic acid, tetrachlorophthalic acid, etc. The polyester may contain lactone such as caprolactone. The content of polyester polyol is preferably 0 to 60 mass %, more preferably 5 to 40 mass % with respect to the entirety of the resin-forming composition. Examples of the epoxy reaction catalyst include benzyldimethylamine, dimethylcyclohexylamine, dimethylethanolamine, triethylamine, tributylamine, trimethylamine, $BF_3$-monomethylamine complex, $BF_3$-benzylamine complex, $BF_3$-piperazine complex, $BF_3$-aniline complex, and aluminum isopropoxide. The quantity of the used epoxy reaction catalyst is preferably 0 to 1 mass %, more preferably 0.1 to 0.5 mass % with respect to the entirety of the resin-forming composition.

Examples of the inorganic filler include carbon, talc, mica, glass flake, wollastonite, clay, calcium carbonate, calcium silicate, silica, chalk, glass beads, quartz, barium sulfate, and titanium oxide. As the solvent, toluene, xylene, alcohols, etc. may be used. Examples of the plasticizer include: ester-based plasticizers [dibutyl phthalate, dioctyl phthalate, dioctyl adipate, polyethylene glycol (Mn: 200) diadipate, etc.]; tar-based plasticizers (tar, asphalt, etc.); and petroleum resin-based plasticizers. The content of the plasticizer is preferably 5 to 70 mass %, more preferably 15 to 50 mass %. Examples of the curing accelerator include phenol, cresol, nonyl phenol, styrenated phenol, resorcinol, xylenol, salicylic acid, tertiary amines, and trisdimethylaminomethyl phenol.

Though the method for producing an epoxy resin-forming composition is not particularly limited, a cured resin-forming composition is obtained by the following method. (K), (L), and if necessary, polyester polyol, and an epoxy reaction catalyst are sealed in a reactor, so as to be reacted at a temperature of 100 to 200° C., preferably 120 to 180° C., for several hours while being stirred. To a non-cured resin-forming composition obtained as a result, an epoxy resin curing agent, and according to necessity, an inorganic filler, a solvent, a plasticizer, and a curing accelerator are added, and sufficiently mixed. The mixture is left to stand for several hours to 10 days, whereby a cured resin-forming composition is obtained.

Though the use of the epoxy resin-forming composition is not particularly limited, it can be used in painting, adhesion, casting, lining, lamination, impregnation, etc.

<<Invention Relating to Rigid Polyurethane Foams>>

The following will describe the fourth, fifth, ninth, tenth and sixteenth inventions relating to rigid polyurethane foams.

The hydroxyl value in the present invention is equivalent to a weight (mg) of KOH necessary for neutralizing 1 g of a sample, that is, "56100/(a molecular weight per one hydroxyl group)".

Furthermore, the active hydrogen value means "56100/(a molecular weight per one active-hydrogen-containing group)". Concerning (b) of the foregoing inventions, it means a sum of a hydroxyl value and primary and secondary amine values.

The active hydrogen compounds (b) used in the fourth, fifth, ninth, and tenth inventions are active hydrogen compounds that have a structure in which AO is added to amines.

Examples of the amines include those applied in the first invention.

Two or more of the amines may be used in combination, and aliphatic amines and aromatic amines are preferred.

As AO to be added to the amines, those having 2 to 8 carbon atoms are preferred, for instance, EO, PO, 1,2-, 1,3-, 1,4-, and 2,3-BO, SO, and two of the same in combination (by block and/or random addition). PO, and a combination of PO and EO are preferred.

Two or more among the same may be used in combination as the active hydrogen compound (b), so as to have an active hydrogen value (in average) of normally not less than 200, preferably 250 to 1300, more preferably 300 to 1000. In the case where the active hydrogen value is less than 200, the hardenability is impaired, thereby causing a product to swell when released from a mold. Particularly, in the case where the active hydrogen value is 300 to 1000, a foam obtained has an excellent hardenability, a minimum degree of swelling when released from a mold, and an increased foam strength.

The polyether polyol (a) used in the fourth, fifth, ninth, and tenth inventions is composed of at least one of polyether polyols obtained by adding 1,2-AO having not less than three carbon atoms to a polyhydric alcohol so that not less than one mole of the 1,2-AO is added per one mole of primary hydroxyl groups, and/or polyether polyols obtained by further adding EO to the foregoing polyols. The polyether polyol (a) has a hydroxyl value (in average) of normally not less than 200, preferably 250 to 1300, more preferably 300 to 1000. In the case where the hydroxyl value is less than 200, a foam will have the considerable swelling when released from a mold, and has a small foam strength.

Furthermore, the mean number x of moles of the added EO per one active hydrogen atom of (a) is normally not more than 2, a primary hydroxyl content y is normally not less than 20%, and x and y satisfy the relationship expressed by a formula (2) shown below:

$$y \geq 42x^{0.47}(1-x/41) \quad (2)$$

Here, x is preferably 0.01 to 1.9, more preferably 0.1 to 1.8. y is preferably not less than 25%, more preferably not less than 30%, particularly preferably not less than 40%. Besides, x and y preferably satisfy the relationship expressed by a formula (2') shown below, and more preferably satisfy the relationship expressed by a formula (2") shown below:

$$y \geq 43x^{0.47}(1-x/41) \quad (2')$$

$$y \geq 45x^{0.47}(1-x/41) \quad (2'')$$

In the case where x and y are in the foregoing ranges, respectively, an excellent hardenability is obtained, while the swelling of a foam when released from a mold and the decrease of the foam strength can be avoided. In the case where x, y, and the relationship between x and y are in the foregoing preferable ranges, an excellent hardenability, a minimum degree of swelling when released from a mold, and an increased foam strength can be obtained particularly.

Furthermore, it is preferable that the relationship expressed by the formula (3) mentioned concerning the requirement (iii) of the second invention is satisfied also.

Examples of the polyhydric alcohols used for obtaining (a) include those applied in the first invention.

Examples of the 1,2-AO having not less than three carbon atoms, to be added to the polyhydric alcohol so that not less than one mole of the 1,2-AO is added per one mole of primary hydroxyl groups, include those applied in the first invention, among which PO is preferred.

Concrete examples of (a) include adduct types described concerning the first invention, any of which may be used in combination.

(a) has normally 2 to 8 hydroxyl groups in average, preferably 2.5 to 8 hydroxyl groups in average, from the viewpoint of the curing rate and the viscosity.

(a1) used in the fourth and ninth inventions is a polyether polyol (a) in the case where it is composed of a polyether polyol obtained by further adding EO to a polyether polyol that is obtained by adding an AO having not less than three carbon atoms to a polyhydric alcohol so that not less than one mole of the AO is added per one mole of primary hydroxyl groups.

In the fifth and tenth inventions, to ensure the hardenability, an active hydrogen compound (b) having an active hydrogen value of not less than 200, which is obtained by adding AO having not less than two carbon atoms to an amine, is used in combination with (a), but (b) is not necessarily indispensable in the fourth and ninth inventions. This is because, since (a1) contains EO units, an excellent compatibility with an organic polyisocyanate (B) is obtained, thereby allowing an excellent hardenability to be obtained without using (b).

Some of the polyether polyols obtained by adding only EO to polyhydric alcohols have the mean number x of moles of added EO per one active hydrogen atom and the primary hydroxyl content y, which fall in the foregoing ranges. In this case, though an excellent hardenability can be obtained, defects such as the swelling when released from a mold, a decreased foam strength, etc., occur.

An example of the method for obtaining (a) and (a1) is as follows: a 1,2-AO having not less than three carbon atoms is added to a polyhydric alcohol by the foregoing method in the presence of the specific catalyst (α) described concerning the first invention, and further EO is added thereto according to necessity. In the case where EO is added, (a1) is obtained, in which a polyol obtained by the same manner as that for obtaining a polyether polyol of the first invention is used.

As the active-hydrogen-containing compound (A) employed in the methods of the ninth and tenth inventions, (a) and (b), or (a1) is used, and another polyol or monool (e) may be employed in combination with the same.

Examples of (e) include polyether polyols, polyester polyols, modified polyols or monools, polyhydric alcohols, amines, and mixtures of the same, except for (a) and (b).

The preferable number of hydroxyl groups and the preferable hydroxyl value of (e) are the same as those of (a).

Examples of the polyether polyols include those which are AO adducts of active hydrogen compounds (polyhydric alcohol, amines, polyhydric phenols, polycarboxylic acids, etc.) and which are neither (a) nor (b).

Examples of the polyhydric alcohols, amines, polyhydric phenols, and polycarboxylic acids include those described above concerning the first invention.

Examples of AO to be added to the foregoing active hydrogen-containing compounds include those listed as AO to be added to the amines.

Examples of the polyester polyols include: condensation reaction products of the above described polyols (e.g. dihydric alcohols such as ethylene glycol, diethylene glycol, propylene glycol, 1,3- or 1,4-butanediol, 1,6-hexanediol and neopentylglycol; the aforementioned polyether polyols; mixtures of those mentioned above with polyhydric alcohols having three or more hydroxyl groups, such as glycerin and trimethylolpropane), with above described polycarboxylic acids, with ester-forming derivatives of the polycarboxylic acids such as anhydrides of the polycarboxylic acids or lower alkyl (the number of carbon atoms in the alkyl group: 1 to 4) esters of the polycarboxylic acids (e.g. adipic acid, sebacic acid, maleic anhydride, phthalic anhydride, dimethyl terephthalate, etc.), or with the above-described carboxylic anhydride and AO; alkylene oxide (EO, PO, etc.) adducts of the condensation reaction products; polylactone polyol, for instance, products obtained by ring-opening polymerization of lactones ($\epsilon$-caprolactone, etc.) by using the above-described polyol, as an initiator; polycarbonate polyols, for instance, reaction products of the above-described polyols and carbonate diesters of lower alcohols (methanol, etc.); and the like.

The modified polyols or monools include those obtained by polymerizing vinyl monomers such as acrylonitrile, styrene, etc. and stably dispersing the same in at least one of polymer polyols, that is, the foregoing polyols, in the presence of a radical polymerization initiator; polydiene polyols such as polybutadiene polyol, and hydrogenated products of the same; hydroxyl-group-containing vinyl polymers such as acrylic polyols; polyols based on a natural oil, such as castor oil; modification products of natural oil-based polyols; and active hydrogen compounds containing terminal radical-polymerizable-functional groups disclosed in EP 1 006 133 (to be described in detail in the section of flexible polyurethane).

Examples of polyhydric alcohols and amines include those mentioned above.

In the fifth and tenth inventions, the content of (b) with respect to the sum of (a) and (b) in the active hydrogen compound (A) is preferably 5 to 80 mass %, more preferably 10 to 75 mass %, particularly preferably 20 to 70 mass %. With (b) in the foregoing range, an excellent hardenability and releasing property are obtained.

Furthermore, the ratio of (e) in 100 parts by mass of (A) is normally not more than 70 parts by mass, preferably not more than 40 parts by mass, more preferably not more than 30 parts by mass.

As an organic polyisocyanate (B) used in the ninth and tenth inventions, those conventionally used in polyurethane foams can be used, for instance those applied in the eighth invention relating to resin compositions.

Preferable as (B) is at least one organic polyisocyanate selected from TDI, MDI, crude TDI, crude MDI, sucrose modified TDI, urethane modified MDI, and carbodiimide modified MDI.

The isocyanate index [equivalent ratio of (NCO groups/active-hydrogen-atom-containing groups)×100] in the production of a polyurethane foam is normally 70 to 800, preferably 90 to 600, more preferably 95 to 300. In the case where an isocyanurate foam is not formed, it is particularly preferably 95 to 115.

As the foaming agent (C), water preferably is used. In the case where water is used alone as (C), the quantity of used water with respect to 100 parts by mass of (A) is normally 0.1 to 30 parts by mass, preferably 0.2 to 20 parts by mass. The quantity of water, when used in combination with another foaming agent, is preferably 0.1 to 10 parts by mass.

Besides these, hydrogen-atom-containing halogenated hydrocarbons, hydrocarbons having low boiling points, and liquid carbon dioxide gases, etc. may be used as required.

More specifically, examples of the hydrogen-atom-containing halogenated hydrocarbon-based foaming agents include those of the HCFC (hydrochlorofluorocarbon) type (e.g., HCFC-123, HCFC-141b, HCFC-22, and HCFC-142b), and those of the HFC (hydrofluorocarbon) type (e.g., HFC-134a, HFC-152a, HFC-356mff, HFC-236ea, HFC-245ca, HFC-245fa, and HFC-365mfc).

Among these, HCFC-141b, HFC-134a, HFC-356mff, HFC-236ea, HFC-245ca, HFC-245fa, HFC-365mfc, and mixtures of two or more among these are preferred.

In the case where a hydrogen-atom-containing halogenated hydrocarbon is used, the quantity of the same used with respect to 100 parts by mass of (A) is preferably not more than 50 parts by mass, more preferably 5 to 45 parts by mass.

The hydrocarbons having low boiling points are hydrocarbons generally having a boiling point of –5 to 50° C., and concrete examples of the same include butane, pentane, cyclopentane, and mixtures of the same.

In the case where a hydrocarbon having a low boiling point is used, the quantity of the same used with respect to 100 parts by mass of (A) is preferably not more than 40 parts by mass, more preferably 5 to 30 parts by mass.

Furthermore, in the case where a liquid carbon dioxide gas is used, the quantity of the same used with respect to 100 parts by mass of (A) is preferably not more than 30 parts by mass, more preferably not more than 25 parts by mass.

As the urethanation catalyst (D) used in the ninth and tenth inventions, catalysts conventionally used in the polyurethane reaction can be used. Examples of such catalysts include: amine-type catalysts [triethylenediamine, N-ethylmorpholine, diethylethanolamine, N,N,N',N'-tetramethylhexamethylenediamine, 1-isobutyl-2-methylimidazole, 1,8-di azabicyclo-[5,4,0]-undecene-7, bis (dimethylaminoethyl)ether(carboxylates)], and/or metal catalysts (stannous octylate, stannic dibutyl dilaurate, lead octylate, etc.). Furthermore, the catalysts applied in the eighth invention and catalysts to be applied in the flexible polyurethane foam mentioned hereinafter may be used. The quantity of the catalyst used with respect to 100 parts by mass of (A) is preferably 0.001 to 6 parts by mass.

In the producing methods of the ninth and tenth inventions, additives (E) conventionally used may be used as required.

Examples of (E) include foam stabilizers (silicone foam stabilizers such as dimethylsiloxane-based foam stabilizers, and polyether modified dimethylsiloxane-based foam stabilizers); aging retardants such as antioxidants (hindered phenol types, hindered amine types, etc.) and ultraviolet absorbers (triazole types, benzophenone types, etc.); fillers such as inorganic salts (calcium carbonate, silica, barium sulfate, etc.), inorganic fibers (glass fibers, carbon fibers, ceramic fibers, etc.), whiskers (potassium titanate whisker, etc.); flame retardants (phosphoric acid esters, halogenated phosphoric acid esters, etc.); plasticizers (phthalic acid esters, etc.); adhesives (modified polycaprolactone polyol, etc.), colorants (dyes, pigments); antimicrobial agents; antifungal agents; polymerization inhibitors; radical polymerization initiators (azo compounds, hydroperoxides, etc., applied in the fourth invention); and chain transfer agents (alkylmercaptans, etc.).

Concrete examples of the foam stabilizers (E1) include dimethylsiloxane-type foam stabilizers, which are, as trade names, "SZ-1142", "L-520", "L-540", "SZ-1105", "L-5740M", and "L-5740S" (manufactured by Nippon Unicar Co., Ltd.), "SH-190", "SH-193", "SF-2936F", and "SRX-294A" (manufactured by Toray Dow Corning Silicone Co., Ltd.).

As to the quantity of such additives used with respect to 100 parts by mass of (A), the quantity of the foam stabilizer is preferably not more than 10 parts by mass, more preferably 0.2 to 5 parts by mass. The quantity of the aging retardant is preferably not more than 1 part by mass, more preferably 0.01 to 0.5 part by mass. The quantity of the filler is preferably not more than 50 parts by mass, more preferably not more than 30 parts by mass. The quantity of the flame retardant is preferably not more than 20 parts by mass, more preferably 1 to 15 parts by mass. The quantity of the plasticizer is preferably not more than 10 parts by mass, more preferably not more than 5 parts by mass. Additives other than these are preferably no more than 1 part by mass.

One example of the method for forming a rigid polyurethane foam according to the ninth and tenth inventions is as follows. First of all, prescribed quantities of (A), (C), and (D), and if necessary, additives (E) such as a foam stabilizer (E1) are mixed. Then, using a polyurethane low-pressure or high-pressure dispensing machine or agitator, the foregoing mixture and an organic polyisocyanate (B) are mixed rapidly. The obtained mixture liquid (foamable raw liquid) is injected in a closed or opened mold (made of a metal or resin), so that a urethanation reaction occurs. It is left for a prescribed period of time so as to be cured, then released from a mold, so that a rigid polyurethane foam is obtained. Alternatively, the spray foaming or the continuous foaming may be carried out, whereby a polyurethane foam can be obtained.

The rigid polyurethane foams produced by the method according to the ninth and tenth inventions have an excellent hardenability, a minimum degree of swelling when released from a mold, and an increased foam strength. Therefore, they can be applied widely for heat insulation materials and structural materials for use in civil engineering (construction materials), transport vehicles, household electric appliances, and the like.

<<Invention Relating to Semi-Rigid Polyurethane Foams>>

The following will describe the sixth, seventh, eleventh, twelfth, and seventeenth inventions relating to semi-rigid polyurethane foams.

The active hydrogen compound (d) used in the seventh and twelfth inventions is an active hydrogen compound (A) having an active hydrogen value of not less than 250. In the case where the active hydrogen value of (d) is less than 250, the hardenability deteriorates.

The active hydrogen value of (d) is normally not less than 250, preferably 300 to 1870, more preferably 350 to 1830. In the case where the active hydrogen value of (d) is 350 to 1830, an excellent hardenability is particularly obtained, while the swelling or compression when released from a mold is minimized.

Examples of (d) include polyhydric alcohols, amines (alkanolamines, polyamines), polyols having a structure in which AO is added to an active-hydrogen-containing compound, and mixtures of these. Examples of the polyhydric alcohols and the amines include those applied in the first invention.

Examples of the active-hydrogen-containing compound to which AO is added include monoamines, polyhydric phenols, and polycarboxylic acids, in addition to the foregoing polyhydric alcohols and amines (alkanolamines and polyamines). Examples of these compounds also include those applied in the first invention.

Examples of the AO to be added to the foregoing active-hydrogen-containing compound (two of the same may be used in combination) include those mentioned in the section of the rigid polyurethane foams.

Among these as (d), the polyhydric alcohols and alkanolamines are preferred.

As the polyether polyol (c) used in the present invention, not less than two kinds may be used in combination, so as to have a hydroxyl value (in average) of 10 to 200. The hydroxyl value is preferably 13 to 180, more preferably 16 to 150.

In the case where the hydroxyl value of (c) is less than 10, the hardenability deteriorates. In the case where the hydroxyl value exceeds 200, the feeling of the semi-rigid polyurethane foam is impaired.

Furthermore, in (c), the number x of moles of added EO per one active hydrogen atom is not more than 20, a primary hydroxyl content y is not less than 40%, and x and y satisfy a relationship expressed by a formula (1) shown below when x is 10 to 20, and satisfy a relationship expressed by a formula (2) shown below when x is not more than 10:

$$y \geq 0.328x + 90.44 \qquad (1)$$

$$y \geq 42x^{0.47}(1-x/41) \qquad (2)$$

The number x of moles of the added EO is preferably not more than 19, more preferably 0.1 to 18. The primary hydroxyl content y is preferably not less than 60%, more preferably not less than 70%.

Furthermore, x and y preferably satisfy the relationship expressed by a formula (2') shown below when x is not more than 10, more preferably satisfy the relationship expressed by a formula (2") shown below.

$$y \geq 43x^{0.47}(1-x/41) \qquad (2')$$

$$y \geq 45x^{0.47}(1-x/41) \qquad (2")$$

In the case where x and y are out of the foregoing ranges, the hardenability is impaired, or even if an excellent hardenability is obtained, the swelling occurs when released from a mold, or in contrast, excessive shrinkage occurs. When x and y and the relationship therebetween are in the foregoing preferable ranges, respectively, an excellent hardenability and a minimum degree of swelling or shrinkage are obtained.

Furthermore, it is more preferable that the relationship expressed by the formula (3) of the requirement (iii) of the second invention is satisfied.

(c) can be obtained by adding AO containing 1,2-AO having not less than three carbon atoms as its principal component to an active hydrogen compound by the aforementioned method of the first invention.

Examples of the active hydrogen compound include polyhydric alcohols, polyhydric phenols, amines (alkanolamines, polyamines, and monoamines), and polycarboxylic acids, which are described in the above section concerning (d). Polyhydric alcohols are preferred.

Examples of AO include those mentioned in the above section concerning (d). As 1,2-AO having not less than three carbon atoms, PO, 1,2-BO, 1,2-pentene oxide, and SO are used, among those mentioned in the above section concerning (d). PO is preferred.

The content of 1,2-AO having not less than three carbon atoms inAO is preferably not less than 50 mass %, more preferably not less than 70 mass %.

Examples of (c) include those in the forms of addition applied in the first invention. These may be used in combination.

(c) has normally 2 to 8 hydroxyl groups in average, preferably 2.5 to 8 hydroxyl groups in average, from the viewpoint of the curing rate and the viscosity.

(c1) used in the sixth and eleventh inventions is, among (c), a polyether polyol in which EO is used as at least a part of the AO and they are added by random and/or block addition.

In the seventh and twelfth inventions, to secure the hardenability, an active hydrogen compound (d) having an active hydrogen value of not less than 250 is used in combination with (c). However, in the sixth and eleventh inventions, (d) is not necessarily indispensable. This is because, since (c1) contains EO units, an excellent compatibility with an organic polyisocyanate (B) is obtained, thereby allowing an excellent hardenability to be obtained without using (d).

An example of the method for obtaining (c) or (c1) is as follows. In the presence of the catalyst ($\alpha$), the 1,2-AO having not less than three carbon atoms is added to the active-hydrogen-containing compound, and further, EO is added thereto according to necessity. In the case where EO is added thereto, (c1) is obtained, which is a polyol obtained by the same method as that for the polyether polyol of the first invention.

Furthermore, in the present invention relating to semi-rigid polyurethane foams, in the case where a foam that is particularly resistant to degradation at a high temperature, a polyol having a total unsaturation degree of not more than 0.05 meq/g (preferably, not more than 0.04 meq/g) may be used as (c) or (c1).

(c) or (c1) having a total unsaturation degree of not more than 0.05 meq/g is obtained by, for instance, the following method. In the presence of a catalyst such as cesium hydroxide (e.g., U.S. Pat. No. 3,393,243), 1,2-AO (particularly PO) having not less than three carbon atoms is added to the foregoing active hydrogen compound, and after removing the catalyst, 1,2-AO having not less than three carbon atoms is added thereto in the presence of the aforementioned catalyst comprising a boron or aluminum compound, and further, EO is added thereto according to necessity. Here, the total unsaturation degree is a value measured by the method specified in JIS K-1557.

As the active hydrogen compound (A) used in the method according to the eleventh and twelfth inventions, (c) and (d), or (c1) is used, and another polyol (e) may be employed in combination with the same, as required.

Examples of (e) include those mentioned in the section concerning rigid polyurethane foams.

In the seventh and twelfth inventions, the content of (d) with respect to a sum of (c) and (d) in the active hydrogen compound (A) is preferably 0.1 to 30 mass %, more preferably 0.2 to 20 mass %, particularly preferably 0.3 to 15 mass %. When the content of (d) is 0.1 to 30 mass % in particular, an excellent hardenability is obtained, and the semi-rigid polyurethane foam obtained has an excellent feeling.

Furthermore, the content of (e) in 100 parts by mass of (A) is normally not more than 70 parts by mass, preferably not more than 60 parts by mass, further more preferably not more than 50 parts by mass, particularly preferably not more than 30 parts by mass.

Examples of the organic polyisocyanate (B) used in the present invention relating to semi-rigid polyurethane foams include those mentioned above.

The isocyanate index [equivalent ratio of (NCO groups/active-hydrogen-atom-containing groups)×100] in the production of a polyurethane foam is normally 60 to 200, preferably 80 to 120, more preferably 90 to 115.

As the foaming agent (C), water is preferably used. In the case where water is used alone as (C), the quantity of water used with respect to 100 parts by mass of (A) is normally 0.1 to 30 parts by mass, preferably 0.2 to 20 parts by mass. The quantity of water, when used in combination with another foaming agent, is preferably 0.1 to 10 parts by mass.

Besides these, hydrogen-atom-containing halogenated hydrocarbons, hydrocarbons having low boiling points, and liquid carbon dioxide gases, etc. may be used as required. Examples thereof and the quantities of the same used are the same as those mentioned above concerning the rigid polyurethane foams.

As to the urethanation catalyst (D) and the additives (E), the same as those of the rigid polyurethane foams are applied, and the quantities of the same used are also the same.

One example of the method for producing semi-rigid polyurethane foams according to the eleventh and twelfth inventions is the same as that in the case of the rigid polyurethane foams.

The semi-rigid polyurethane foams produced by the method of the present invention have an excellent hardenability and have a minimum degree of swelling or shrinkage when released from molds. Therefore, they can be widely applied as shock absorbing materials and cushioning materials provided inside interiors of cars (wheels, instrument panels, sun visors, door trims, sheets, pillars, etc.).

<<Invention Relating to Flexible Polyurethane Foams>>

The following will describe the thirteenth, fourteenth, and eighteenth inventions relating to flexible polyurethane foams.

In the thirteenth and fourteenth inventions, the polyol (A1) is composed of a polyether polyol (f1) and/or a polymer polyol. The polymer polyol is defined as a polymer polyol obtained by polymerizing a vinyl monomer in a polyether polyol (f2). In the case where (f1) and the polymer polyol are used in combination, (f1) and (f2) may be the same or may be different.

As (f1) and (f2), compounds obtained by adding AO to active hydrogen compounds may be used.

As the active hydrogen compounds, the aforementioned polyhydric alcohols and amines may be used.

Though active hydrogen compounds having a valence of not less than 2 are preferred, monohydric alcohols and monovalent amines may be used in combination with the active hydrogen compounds, as a part of the same. Examples of the monohydric alcohols include monohydric alcohols having 1 to 20 carbon atoms, for instance, methanol, ethanol, butanol, 2-ethylhexyl alcohol, and decyl alcohol. Examples of the monovalent amines include monovalent amines having 2 to 20 carbon atoms, such as dimethylamine, diethylamine, methylethylamine, methylpropylamine, and dipropylamine.

As the active hydrogen compounds, polyhydric alcohols are preferred, among which dihydric and trihydric alcohols are more preferred, and trihydric alcohols are particularly preferred.

PO, 1,2- or 2,3-BO, SO, and $\alpha$-olefin oxides having 5 to 20 carbon atoms are applicable as AO, which may be used alone or in combination. Further, EO may be used in combination with the same. Among these, PO, 1,2-BO, and combinations of the same with EO are preferred, among which PO and combinations of PO with EO are more preferred, and combinations of PO and EO are particularly preferred. As the form of addition in the case of a combination, block addition and random addition are applicable. The block addition is particularly preferred as the form of addition, and hence, a modified PO adduct having a terminal-EO block adduct is preferred. In the case where EO is used in combination, it is equivalent to a polyether polyol of the third or first invention.

The quantity of used EO is preferably not more than 30%, more preferably 0.1 to 20 mass %, particularly preferably 1 to 15 mass % with respect to the total mass of AO used. At least one of (f1) and (f2) is preferably a terminal EO adduct.

In the case where the quantity of used EO is not more than 30 mass %, cells do not tend to become closed cells during the foaming of a polyurethane foam, and therefore, an excellent foam is likely obtained. (f1) preferably has a hydroxyl value of 15 to 40 mgKOH/g, more preferably 20 to 38 mgKOH/g. In the case where the hydroxyl value is not less than 15 mgKOH/g, the viscosity does not increase, thereby providing excellent handling properties. In the case where the hydroxyl value is not more than 40 mgKOH/g, the ball rebound property of the obtained polyurethane foam is improved.

(f1) has preferably 2 to 4, more preferably 2.5 to 4, hydroxyl groups in average per one molecule. In the case where the number of hydroxyl groups is not less than 2, the compression set and wet heat compression set properties tend to decrease while the ball rebound property tends to increase. On the other hand, in the case where the foregoing number is not more than 4, the extension tends to increase.

The polymer polyol is a polymer obtained by polymerizing a vinyl monomer in the polyether polyol (f2).

The hydroxyl value of (f2) and the mean number of hydroxyl groups in one molecule of (f2) are preferably in the same ranges as those of (f1), respectively.

As the polymer polyol, those obtained by polymerizing vinyl monomers in (f2) in the presence of a radical polymerization initiator and stably dispersing the same may be used. Examples of the vinyl monomer include acrylonitrile, styrene, alkyl (having 1 to 24 carbon atoms) (meth)acrylate, and vinylidene chloride (among these, acrylonitrile and/or styrene are preferred).

The content of the vinyl polymer in the polymer polyol is preferably 15 to 60 mass %, more preferably 20 to 50 mass %.

The polymer polyols are produced readily by known methods, for instance, by a method disclosed in U.S. Pat. No. 3,383,351.

Though the content of the polymer polyol in the polyol (A1) is not particularly limited, the content thereof is preferably not more than 50 mass %, more preferably 0.1 to 40 mass %, particularly preferably 1 o 30 mass %, with respect to the mass of the polyol (A1).

Furthermore, the content of the vinyl polymer in (A1) is preferably not more than 40 mass %, more preferably 0.1 to 30 mass %.

In the thirteenth invention, a mass mean value of the hydrophilic-lipophilic balance (HLB) of (f1) and/or (f2) and a mass mean value of the primary hydroxyl content (%) of terminal hydroxyl groups of (f1) and/or (f2) satisfy the relationship expressed by a formula (6) shown below:

$$\text{(mass mean of } HLB) \leq 0.1 \times \text{(mass mean of primary hydroxyl content)} - 2 \quad (6)$$

The mass mean value of HLB of (f1) and/or (f2) is preferably not more than 7, more preferably not more than 6.

The mass mean value of HLB is defined to be a value obtained by calculating "a product of HLB of each of (f1) and/or (f2) and a mass ratio thereof (mass ratio is obtained by dividing a mass of each polyether polyol with a sum of masses of all the polyether polyols)" as to each of all the polyether polyols, and summing the same. More specifically, it is expressed by an equation (14) below:

$$\text{(mass mean value of } HLB) = \Sigma(HLB \times \text{mass ratio}) \quad (14)$$

It should be noted that the HLB herein is calculated by the aforementioned method devised by Oda of deriving the same from a ratio between a value of inorganic constituents of a component and a value of organic constituents thereof.

The mass mean value of the primary hydroxyl content (%) of terminal hydroxyl groups of (f1) and/or (f2) is at least 40%, preferably at least 60%, more preferably at least 70% from the viewpoint of the reactivity with isocyanate when a flexible polyurethane foam is produced.

The mass mean value of the primary hydroxyl content of terminal hydroxyl groups is defined to be a value obtained by calculating "a product of a primary hydroxyl content of terminal hydroxyl groups of each of (f1) and/or (f2) and a mass ratio thereof (mass ratio is obtained by dividing a mass of each polyether polyol with a sum of masses of all the polyether polyols)" as to each of all the polyether polyols, and summing the same. More specifically, it is expressed by an equation (15) below:

$$\text{(mass mean value of primary hydroxyl content of terminal hydroxyl groups)} = \Sigma(\text{primary hydroxyl content} \times \text{mass ratio}) \quad (15)$$

In the fourteenth invention, (f1) and (f2) are polyether polyols (c), which are described in the section concerning the semi-rigid polyurethane foams. The polyether polyols (c) are obtained by adding an alkylene oxide that includes a 1,2-alkylene oxide having not less than three carbon atoms as a principal constituent, having a mean number x of moles of an added ethylene oxide per one active hydrogen atom of not more than 20, and a primary hydroxyl content y of not less than 40%, x and y satisfying the relationship expressed by a formula (1) shown below when x is 10 to 20, and satisfying the relationship expressed by a formula (2) shown below when x is not more than 10 (however, the hydroxyl value is preferably in the foregoing range):

$$y \geq 0.328x + 90.44 \quad (1)$$

$$y \geq 42x^{0.47}(1 - x/41) \quad (2)$$

As (c), (c1) is preferred, which is obtained by random and/or block addition of an alkylene oxide that includes a 1,2-alkylene oxide having not less than three carbon atoms as a principal constituent and also includes ethylene oxide.

By using any one of the foregoing polyols as (A1), a foam having a uniform density without the deterioration of moisture-resistant properties can be obtained.

In both cases of the thirteenth and fourteenth inventions, (f1) and (f2) can be produced readily by the method of the first invention, which employs the specific catalyst ($\alpha$) disclosed in WO 00/02952.

To produce a flexible polyurethane foam resistant to thermal degradation, it is preferable that the total unsaturation degree of polyether polyols contained in the polyol (A) should be not more than 0.05 meq/g (particularly, not more than 0.04 meq/g).

(f1) and/or (f2) having a low unsaturation degree can be obtained by the following method. In the presence of a catalyst such as cesium hydroxide (e.g., U.S. Pat. No. 3,393,243), AO (particularly PO) is added to an active-hydrogen-containing compound (G), and after removing the catalyst, AO is added in the presence of a catalyst such as trispentafluorophenylborane, and further, EO is added thereto according to necessity. Here, the total unsaturation degree is a value measured by the method specified in JIS K-1557.

In the thirteenth and fourteenth inventions, as the active hydrogen compound (A) composed of (A1), the polymer polyol composed of (f1) and (f2) is used, and also another polyol or monool (e) may be used in combination with the same, as required.

Examples of (e) include polyether polyols (only in the fourteenth invention), polyester polyols, modified polyols or monools, polyhydric alcohols, amines, and mixtures of the same, except for (f1) and (f2). Examples of (e) include the same as those described above as (e).

The content of (e) in 100 parts by mass of the active hydrogen compound is normally not more than 70 parts by mass, preferably not more than 60 parts by mass, more preferably not more than 50 parts by mass, particularly preferably not more than 30 parts by mass. Furthermore, the content of (f1) and/or (f2) is normally not less than 30 parts by mass, preferably not less than 40 parts by mass, more preferably not less than 50 parts by mass, particularly preferably not less than 70 parts by mass.

By employing, among (e), an active hydrogen compound containing a terminal radical-polymerizable-functional group (e1) disclosed in EP 1 006 133, it is possible to obtain a flexible polyurethane foam having an excellent foam hardness and an excellent wet heat compression set.

In the producing method of the present invention, a terminal radical-polymerizable functional group (t) of (e1) is a radical-polymerizable functional group of a terminal olefin type, preferably a radical-polymerizable functional group of a terminal olefin type expressed by a formula (16) shown below:

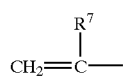

(16)

where $R^7$ represents a hydrogen atom, an alkyl group having 1 to 15 carbon atoms, or an aryl group having 6 to 21 carbon atoms.

Concrete examples of the groups having a group expressed by the foregoing formula (16) include terminal-unsaturated-bond-containing groups, such as an acryloyl group, a methacryloyl group, a vinyl group, a vinylbenzyl group, a vinylphenyl group, and allyl ether group.

Among these groups, an acryloyl group, a methacryloyl group, and allyl ether group are particularly preferred.

The number of (t) in (e1) is normally 1 to 10, preferably 1 to 5.

Though an active-hydrogen-containing group (w) of (e1) is not particularly limited, it may be, for instance, one or more active-hydrogen-containing groups selected from a hydroxyl group, a mercapto group, a carboxyl group, a primary amino group, and a secondary amino group.

Preferable active-hydrogen-containing groups are a hydroxyl group and a mercapto group, among which a hydroxyl group is particularly preferred.

The number of active-hydrogen-containing groups in (e1) is normally 1 to 8, preferably 1 to 5.

As (e1), those expressed by a formula (17) shown below are more preferable.

(17)

where
$R^7$ represents a hydrogen atom, an alkyl group having 1 to 15 carbon atoms, or an aryl group having 6 to 21 carbon atoms,
G represents O, S, or NH,
u and v represent positive integers,
L represents an active-hydrogen-containing group, and
J represents a residue obtained by removing u+v active-hydrogen-containing groups from an active hydrogen compound.

$R_7$ preferably represents a hydrogen atom or an alkyl group, more preferably a hydrogen atom or a methyl group, and G preferably represents O. The value of u is preferably 1 to 7, more preferably 1 to 5, while the value of v is preferably 1 to 7, more preferably 1 to 4, particularly preferably 2 to 4. The value of u+v is preferably 2 to 8, more preferably 3 to 8. L preferably represents a hydroxyl group.

Concrete examples of the foregoing (e1) include (e11) to (e14) shown below, and two or more among the same may be used in combination:

(e11): partial esters of polyols [polyhydric alcohols; polyhydric phenols; polyols obtained by adding alkylene oxides (AO) to the polyhydric alcohols or polyhydric phenols; polyols obtained by adding (AO) to amines; polyester polyols derived from polyhydric alcohols and polycarboxylic acids; etc.] with unsaturated carboxylic acids;

(e12): partial amidated unsaturated carboxylic acids with amines;

(e13): partial thioesters of unsaturated carboxylic acids with polythiols; and (e14): vinyl monomers having hydroxyl groups other than those described above.

Those described concerning the rigid polyurethane foams are applicable as the polyhydric alcohols, polyhydric phenols, amines, and AO to be added, among the polyols used for producing (e11).

Preferable as AO to be added are those containing PO and/or EO as principal components and containing not more than 20 mass % of another AO. The number of moles of added AO is preferably 1 to 70, more preferably 2 to 50.

Among the polyols used for producing (e11), as to the polyester polyols, those applied in the rigid polyurethane foams are applicable.

As the polyols used for producing (e11), those having 2 to 8 (particularly 2 to 6) hydroxyl groups and having a hydroxyl equivalent of 30 to 1200 (particularly 31 to 250) are preferred. (e11) is obtained by partially esterifying the above-mentioned polyols with unsaturated carboxylic acids at an equivalent ratio such that at least one hydroxyl group remains non-reacted per one molecule.

Examples of unsaturated carboxylic acids include: (meth)acrylic acid, crotonic acid, maleic acid, fumaric acid, itaconic acid, citraconic acid, mesaconic acid, aconitic acid, cinnamic acid, vinylbenzoic acid, combinations of two or more among the same [here, (meth)acrylic acid means acrylic acids and/or methacrylic acids, and this manner of description is applied hereinafter as well]; ester-forming derivatives of these unsaturated carboxylic acids, for instance, halides [(meth)acrylic chlorides], and acidic anhydrides [maleic anhydrides, itaconic anhydrides, citraconic anhydrides, etc.]; and combinations of two or more among the same.

Concrete examples of compounds of (e11) include 2-hydroxyethyl (meth)acrylate, 2-hydroxypropyl (meth) acrylate, 4-hydroxybutyl (meth)acrylate, 3-phenoxy-2-hydroxypropyl (meth)acrylate, glycerin mono(meth) acrylate, glycerin di(meth)acrylate, diethylene glycol mono (meth)acrylate, pentaerythritol triacrylate, sorbitol di(meth) acrylate, and combinations of two or more among the same.

(e12) is obtained by reacting, among the aforementioned amines, polyamines or alkanolamines, with the aforementioned unsaturated carboxylic acids at an equivalent ratio such that at least one amino group or hydroxyl group (in the case of alkanolamines) remains non-reacted per one molecule.

Concrete examples of compounds of (e12) include (meth) acrylamide ethylamine, (meth)acrylamide hexylamine, and the like, and combinations of two or more among the same.

As polythiols used for producing (e13), those having 2 to 4 thiol groups and 2 to 18 carbon atoms are preferred. Examples of the same include ethanedithiol, 1,2-propanedithiol, 1,3-propanedithiol, 1,4-propanedithiol, 1,4-benzenedithiol, 1, 2-benzenedithiol, bis(4-mercaptophenyl) sulfide, 4-t-butyl-1,2-benzenedithiol, ethylene glycol dithioglycolate, trimethylolpropane tris(thioglycolate) thiocyanulate, di(2-mercaptoethyl)sulfide, di(2-mercaptoethyl)ether, and combinations of two or more among the same.

(e13) is obtained by reacting the polythiols with the unsaturated carboxylic acids at an equivalent ratio such that at least one thiol group remains non-reacted per one molecule.

Concrete examples of compounds of (e13) include acryloyl thioethyl mercaptan, acryloyl thiobutyl mercaptan, and the like, and combinations of two or more among the same.

Examples of (e14) include p-hydroxyl styrene, (meth) allyl alcohol, cinnamyl alcohol, crotonyl alcohol, and partial allyl ether compounds of the foregoing polyhydric alcohols (those having at least one hydroxyl group in one molecule, such as pentaerythritol allyl ether), adducts of these compounds with the aforementioned alkylene oxide (AO) (preferably 2 to 20-mole adducts), and combinations of two or more among these.

(e14) preferably has 1 to 5 radical-polymerizable functional groups, 1 to 5 active-hydrogen-containing groups, and a Mn of not more than 1000.

Among these, the aforementioned partial esters of polyols with unsaturated carboxylic acids (e11) and vinyl monomers having hydroxyl groups (e14) (particularly, allyl ethers of polyhydric alcohols) are preferred, since they have low viscosities, thereby causing polyurethane-forming compositions derived therefrom to have low viscosities as well. Particularly preferred are partial esters of polyhydric alcohols or alkylene oxide adducts of polyhydric alcohols with unsaturated carboxylic acids.

The molecular weight of (e1) per one active-hydrogen-containing group is preferably 40 to 2500, more preferably 40 to 500, particularly preferably 45 to 400, considering the viscosity when a polyurethane-forming composition is formed.

The quantity of used (e1) is preferably not more than 20 parts by mass, more preferably 0.1 to 10 parts by mass, with respect to 100 parts by mass of (A).

In the method of the present invention, a chain extender and/or a crosslinking agent (e2) may be used as required.

As (e2), those conventionally used in polyurethanes can be used, for instance, among the aforementioned (e), polyhydric alcohols having 2 to 6 carbon atoms and alkanolamines, such as ethylene glycol, diethanolamine, triethanolamine, glycerin, trimethylolpropane, and D-sorbitol.

The quantity of used (e2) is preferably not more than 10 parts by mass, more preferably 0.01 to 5 parts by mass, with respect to 100 parts by mass of (A).

As an organic polyisocyanate (B), known organic polyisocyanates conventionally used in polyurethanes can be used, for instance, those mentioned in the section for the rigid polyurethane foams.

Among those mentioned as examples of (B), aromatic polyisocyanates are preferred, among which TDI used alone and a mixture of TDI and modified MDI and/or crude MDI are more preferred.

As a foaming agent, a foaming agent composed of water (C1) is preferred.

Besides these, hydrogen-atom-containing halogenated hydrocarbons, hydrocarbons having low boiling points, and liquid carbon dioxide gases, etc. may be used as required.

As a catalyst (D), known catalysts conventionally used in polyurethanes may be used, for instance, metal carboxylates, alkoxides of alkali metals or alkali earth metals, phenoxides of alkali metals or alkali earth metals, tertiary amines, quaternary ammonium salts, imidazole, and organic metal compounds containing metals such as tin, antimony, etc.

Metal carboxylates include sodium acetate, lead octanoate, zinc octanoate, tin octanoate, and cobalt naphthenate.

Alkoxides of alkali metals or alkali earth metals include sodium methoxide and potassium methoxide.

Phenoxides of alkali metals or alkali earth metals include sodium phenoxide and potassium phenoxide.

Tertiary amines include triethylamine, triethylenediamine, N-methylmorpholine, dimethylaminomethyl phenol, trimethylaminoethyl piperazine, tetramethylhexamethylene diamine, trisdimethylaminopropyl-s-triazine, and pyridine.

Tertiary ammonium salts include tetraethylhydroxyl ammonium.

Imidazoles include imidazole, and 2-ethyl-4-methylimidazole.

Organic metal compounds include tetraphenyltin, and tributylantimony oxide. Among these, the tertiary amines are preferred.

As the foam stabilizer (E1), those mentioned above are applicable. The foregoing additives (E2), other than (E1), may be used. Concrete examples and the quantity of used (E) are the same as those described in the section of the rigid polyurethane foams.

The respective quantities of used (B), (C1), (D), and (E1) in the present invention are as follows, based on the quantity of the used active hydrogen compound (A) composed of (A1).

The quantity of used (B) is preferably such as to cause the isocyanate index to be 80 to 120, more preferably 90 to 110, particularly preferably 95 to 105. In the case where the isocyanate index is not less than 80, the air permeability of the foam tends to increase, the ball rebound property also tends to increase, and the expansion ratio also tends to increase. On the other hand, in the case where the isocyanate index is not more than 120, the curing characteristics are improved.

As to water (C1) used as a foaming agent, preferably at least 2.8 parts by mass, more preferably 3 to 8 parts by mass, of the same is used with respect to 100 parts by mass of (A), so as to obtain a flexible foam with an overall density of not more than 55 kg/m$^3$.

The quantity of (D) is preferably 0.01 to 5 parts by mass, more preferably 0.05 to 3 parts by mass, with respect to 100 parts of (A).

The quantity of (E1) is preferably not more than 10 parts by mass, more preferably 0.1 to 5 parts by mass, with respect to 100 parts by mass of (A).

By mixing (B) with a mixture of the components (A), (C1), (D), and (E1) by stirring and foaming the same by a conventional method, a flexible polyurethane foam is obtained.

The method of the present invention is applicable to any conventional known method for producing flexible polyurethane foam, such as the slabbing method, the hot cure method, and the cold cure method. Among these, the cold cure method is preferred.

By the producing method according to the thirteenth or fourteenth invention, it is possible for the first time to obtain a flexible polyurethane foam having a core density of 20 to 33 kg/m$^3$, and a wet heat compression set of not more than 15% (particularly not more than 13%).

The flexible polyurethane foams produced by the producing methods according to the thirteenth and fourteenth inventions are suitably applied as cushions for furniture, cushions for bedding, cushions for automobiles, cushioning materials, packing materials, and heat insulation materials. Among these, they are particularly suitable for cushions for furniture, cushions for bedding, and cushions for automobiles.

<<Invention Relating to Flexible Polyurethane Slab Foams>>

In the fifteenth invention, the primary hydroxyl content of terminal hydroxyl groups expressed by a formula (5) shown below among terminal hydroxyl-group-containing groups expressed as —AO—H in the polyol (A1) (primary hydroxyl content of terminal hydroxyl groups) is at least 40%, preferably at least 60%, more preferably at least 70%, from the viewpoint of the stability of cells during the foaming of a polyurethane slab foam:

(5)

where

A represents an alkylene group having 3 to 12 carbon atoms, which may be substituted with a halogen atom or an aryl group, and R$^2$ represents an alkyl group having 1 to 10 carbon atoms or an aryl group having 6 to 10 carbon atoms, which may be substituted with a halogen atom.

As the polyol (A1), compounds obtained by adding AO to active hydrogen compounds can be used. As the active hydrogen compounds and AO, those mentioned as raw materials for (f1) and (f2) in the flexible polyurethane foams can be applicable.

Among AO, preferred are PO, 1,2-BO, and combinations of the same with EO, among which PO and combinations of PO with EO are more preferred. As the form of addition in the case where a combination is used, block addition or random addition is applicable.

The quantity of used EO is preferably not more than 20 mass %, more preferably not more than 10 mass %, with respect to the entire mass of used AO.

In the case where the quantity of used EO is not more than 20 mass %, cells do not tend to become closed cells during the foaming of a polyurethane slab foam, and therefore, an excellent foam likely is obtained.

The mean number of hydroxyl groups of (A1) (the number of hydroxyl groups per one molecule, calculated as a mean value as to the entirety of (A)) is preferably 2 to 4, more preferably 2.5 to 3.5, from the viewpoint of stability of cells during the foaming, and the like.

The hydroxyl value of (A1) is preferably 30 to 110 mgKOH/g, more preferably 40 to 80 mgKOH/g, from the viewpoint of the stability of cells during the foaming, and the like.

As (A1), those with the mean number of hydroxyl groups of 2 to 4 and a hydroxyl value of 30 to 110 mgKOH/g are particularly preferred, and those with the mean number of hydroxyl groups of 2.5 to 3.5 and a hydroxyl value of 40 to 80 mgKOH/g are most preferred.

The Mw of (A1) is preferably 1000 to 7500, more preferably 1500 to 5000, particularly preferably 2000 to 4000.

The polyether polyol (A1) can be produced readily by the method of the first invention, which employs the specific catalyst (α) disclosed in WO 00/02952.

In the fifteenth invention, in the active hydrogen compound (A) composed of (A1), polyols or monools (e) other than (A1) may be used in combination with the same as required.

As (e), those applied in the thirteenth and fourteenth inventions are applicable, and preferable quantities thereof are the same also.

As the organic polyisocyanate (B), those which are known and conventionally used in polyurethanes are applicable, for instance, those mentioned in the section of the rigid polyurethane foams.

Among these, aromatic polyisocyanates are preferred, among which TDI used alone, as well as mixture of TDI and modified MDI and/or crude MDI in which the content of TDI is not less than 80 mass % based on the mass of (B) are more preferred. TDI used along is particularly preferred.

As the foaming agent (C), those which are known and conventionally used in polyurethanes are applicable. For instance, water, methylene chloride, etc., are used, and mixtures containing one or not less than two of the same are also applicable.

Besides these, the aforementioned hydrogen-atom-containing halogenated hydrocarbons, hydrocarbons having low boiling points, and liquid carbon dioxide gases, etc. may be used as required. Among these, water used alone, or a combination of water and methylene chloride, are preferred.

As the catalyst (D), those which are known and conventionally used in polyurethanes are applicable. Examples of the same include those applied in the thirteenth and fourteenth inventions.

Preferred as (D) are tertiary amines and quaternary ammonium salts, among which tertiary amines are more preferred. Considering the effects on the environments, it is not preferable to use organic heavy-metal catalysts, which are conventionally used as (D). In other words, (D) is preferably selected from catalysts conventionally used in polyurethanes, except for organic heavy-metal catalysts. More preferably, (D) is at least one selected from metal carboxylates, alkoxides of alkali metals and alkali earth metals, phenoxides of alkali metals and alkali earth metals, tertiary amines, and quaternary ammonium salts.

It should be noted that examples of the conventionally used organic heavy-metal catalysts include carboxylates of heavy metals (lead octanoate, zinc octanoate, tin octanoate, cobalt tin naphthenate, and organic metal compounds containing metals such as antimony (tetraphenyltin, tributylantimony oxide, dibutyltin dilaurate, etc.).

As the foam stabilizer (E1), those which are known and conventionally used in polyurethanes, as described above, are used.

The another additives (E2) used according to necessity are, for instance, pigments, flame retardants, and fillers. Concrete examples and preferable quantities of used (E2) are the same as those in the cases of the rigid polyurethane foams described above, and they are added as required according to the properties and characteristics of products to be produced, as in the cases of known flexible polyurethane slab foams.

The quantities used of (B), (C), (D), and (E1) in the present invention are as follows, based on the quantity of the active hydrogen compound (A) used.

The quantity used of (B) is preferably such as to cause the isocyanate index to be not less than 80, more preferably not less than 90, considering physical properties such as the curing rate and the compression set.

To avoid harmful effects such as scorching, the quantity is preferably such as to cause the isocyanate index to be not more than 120, more preferably not more than 110.

As to the quantity of (C), either 3 to 8 parts by mass of water, or 3 to 8 parts by mass of water in combination of 1 to 30 parts by mass of methylene chloride, with respect to 100 parts by mass of (A), is preferred. Among these, 3 to 8 parts by mass of water is more preferred.

The quantity of (D) is preferably 0.05 to 5 parts by mass, more preferably 0.1 to 1 parts by mass, with respect to 100 parts by mass of (A).

The quantity of (E1) is preferably 0.1 to 10 parts by mass, more preferably 0.5 to 3 parts by mass, with respect to 100 parts by mass of (A).

A flexible polyurethane slab foam is obtained by mixing (B) with a mixture of the components (A), (C), (D), and (E1) by stirring, and foaming the same by an ordinary method.

The flexible polyurethane slab foams produced by the producing method of the present invention suitably are applied as cushions for furniture, cushions for bedding, cushions for automobiles, cushioning materials, packing materials, and heat insulation materials. Among these, they are particularly suitable for cushions for furniture, cushions for bedding, and cushions for automobiles.

The present invention is described further in detail with reference to the following examples. However, the present invention is not limited to these examples in any way. In the following, the values of "parts", "%", and "ppm" indicate respective values by mass.

EXAMPLES RELATING TO POLYETHERS

Example 1

In an autoclave of 200 ml volume, made of stainless steel and equipped with an agitator and a thermoregulator, 57.0 g of "SANNIX GP-1000" (manufactured by Sanyo Chemical Industries, Ltd.; PO adduct of glycerin with a Mn of 1000), 0.009 g of tris(pentafluorophenyl)borane was put, and 86.4 g of PO was dropped continuously over 10 hours so that a reaction temperature was kept in a range of 65 to 75° C., followed by aging at 70° C. over 5 hours. After atmospheric distillation was carried out at 105 to 110° C. over 4 hours with water added thereto, vacuum distillation was carried out over 5 hours with water vapor passed therethrough continuously, while keeping the temperature and the pressure at 90 to 100° C. and at 30 to 50 torr, respectively. After stopping the passage of water vapor, 0.1 g of potassium hydroxide was added thereto. Then, dehydration was carried out over 3 hours by raising the temperature to 130° C. and keeping the pressure at 50 torr or below. The obtained product had a primary hydroxyl content of 71%. Subsequently, 29.6 g of EO was dropped over 3 hours while a reaction temperature was controlled to remain in a range of 125 to 135° C., followed by aging at 130° C. for 2 hours. 4.0 g of "KYOWAAD 600" (manufactured by Kyowa Chemical Industry Co., Ltd.; synthetic silicate) and 2.0 g of water were added thereto, and treated over 1 hour at 90° C. After being taken out of the autoclave, the obtained product was filtered with filter paper, and dehydrated under a reduced pressure. As a result, 152.2 g of a PO-EO adduct of glycerin in a liquid state (Mn: 3000) was obtained. The yield was 88%, the hydroxyl value was 56.5, the content of EO was 16.7 mass %, and the primary hydroxyl content of terminal hydroxyl groups was 90%. Consequently, by substituting these in the relationship formula (3) of the requirement (iii) of the second invention, it was found that the left part had a value of 3.7, while the right part had a value of 7.5. Therefore, the requirement (iii) was satisfied. Besides, substituting these in the formula (2) of the first invention, it was found that the right part had a value of 70.7. Thus, the relationship of the formula (2) was satisfied.

Comparative Example 1

In place of tris(pentafluorophenyl)borane, 0.63 g of potassium hydroxide was used, and in a reactor identical to that of Example 1, 86.0 g of PO was dropped continuously over 12 hours while a reaction temperature was controlled in a range of 90 to 110° C., followed by aging over 6 hours. The primary hydroxyl content of terminal hydroxyl groups of the obtained product was 2%. Subsequently, 29.6 g of EO was dropped continuously over 3 hours so that a reaction temperature was controlled in a range of 120 to 140° C., followed by aging over 2 hours. Then, 3.0 g of a synthetic silicate ("KYOWAAD 600", manufactured by Kyowa Chemical Industry Co., Ltd) and 2 g of water were added thereto, and treated over 3 hours at 60° C. After being taken out of the autoclave, the obtained product was filtered with 1-micron filter, and dehydrated. As a result, 161.3 g of a PO-EO adduct of glycerin in a liquid state (Mn: 3000) was obtained. The yield was 97%, the hydroxyl value was 56.4, the content of EO was 16.5 mass %, and the primary hydroxyl content of terminal hydroxyl groups was 69%. Consequently, by substituting these in the relationship formula (3) of the requirement (iii), it was found that the left part had a value of 3.7, while the right part had a value of 2.4. Therefore, the requirement (iii) was not satisfied. Besides, substituting these in the formula (2), it was found that the right part had a value of 70.7. Thus, the relationship of the formula (2) was not satisfied.

Example 2

In an autoclave of 200 ml volume, made of stainless steel and equipped with an agitator and a thermoregulator, 87.8 g of "SANNIX PP-1000" (manufactured by Sanyo Chemical Industries, Ltd.; polypropylene glycol with a Mn of 1000), 0.02 g of tris(pentafluorophenyl)borane was put, and 65.9 g of PO was dropped continuously over 12 hours while a reaction temperature was controlled in a range of 60 to 70° C., followed by aging at 65° C. over 3 hours. The primary hydroxyl content of terminal hydroxyl groups of the obtained product was 69%. Subsequently, 22.0 g of EO was dropped continuously over 4 hours while a reaction temperature was controlled in a range of 50 to 60° C., followed by aging at 60° C. over 4 hours. After the obtained product was neutralized with an aqueous solution of sodium hydroxide, 3.0 g of "KYOWAAD 600" (manufactured by Kyowa Chemical Industry Co., Ltd.; synthetic silicate) and 1.0 g of water were added thereto, and treated over 1 hour at 70° C. After being taken out of the autoclave, the obtained product was filtered with 1-micron filter, and dehydrated. As a result, 156.8 g of an EO adduct of polypropylene glycol in a liquid state (Mn: 2000) was obtained. The yield was 90%, the hydroxyl value was 55.9, the content of EO was 12.5 mass %, and the primary hydroxyl content of terminal hydroxyl groups was 86%. Consequently, by substituting these in the relationship formula (3) of the requirement (iii), it was found that the left part had a value of 2.85, while the right part had a value of 5.99. Therefore, the requirement (iii) was satisfied. Besides, substituting these in the formula (2), it was found that the right part had a value of 63.9. Thus, the relationship of the formula (2) was satisfied.

Comparative Example 2

In place of tris(pentafluorophenyl)borane, 0.63 g of potassium hydroxide was used, and in a reactor identical to that of Example 1, 65.0 g of PO was dropped continuously over 30 hours at a reaction temperature of 50 to 60° C., followed by aging over 20 hours. The primary hydroxyl content of terminal hydroxyl groups of the obtained product was 1%. Subsequently, 22.0 g of EO was dropped continuously over 15 hours while a reaction temperature was controlled in a range of 50 to 60° C., followed by aging over 10 hours. Then, 3.0 g of a synthetic silicate ("KYOWAAD 600", manufactured by Kyowa Chemical Industry Co., Ltd) and 2 g of water were added thereto, and treated over 3 hours at 60° C. After being taken out of the autoclave, the obtained product was filtered with 1-micron filter, and dehydrated. As a result, 160.3 g of an EO adduct of polypropylene glycol in a liquid state (Mn: 3000) was obtained. The yield was 96%, the hydroxyl value was 55.7, the content of EO was 12.4 mass %, and the primary hydroxyl content of terminal hydroxyl groups was 62%. Consequently, by substituting these in the relationship formula (3) of the requirement (iii), it was found that the left part had a value of 2.83, while the right part had a value of 1.59. Therefore, the requirement (iii) was not satisfied. Besides, substituting these in the formula (2), it was found that the right part had a value of 63.8. Thus, the relationship of the formula (2) was not satisfied.

Example 1'

434.9 g of the PO-EO adduct of glycerin obtained in Example 1 (Mn: 3000), 219.2 g of tolylenediisocyanate, 18.7 g of water, 0.57 g of stannous octoate, 5.26 g of dioctyl phthalate, 5.3 g of polyoxypropylene glycol (Mn: 2000), 0.33 g of triethylenediamine, 2.2 g of N-methylmorpholine, and 6.6 g of a foam stabilizer ("L-520", manufactured by Nippon Unicar Co., Ltd.) were mixed homogeneously. The mixture liquid thus obtained was poured into a 30-cm-square container uniformly and foamed, whereby a urethane foam was produced.

As to the foaming behavior, the 100% rise time was 50 seconds. Further, a viscosity upon the foaming was determined by means of a vibration-type viscosimeter, and it was found that the viscosity of the foamed resin reached 100000 cps when 30 seconds passed after the mixing.

Comparative Example 1'

A urethane foam was produced in the same manner as that of Example 1' except that in place of the PO-EO adduct of glycerin obtained in Example 1 (Mn: 3000), 434.9 g of the PO-EO adduct of glycerin obtained by Comparative Example 1 (Mn: 3000) was used.

As to the foaming behavior, the 100% rise time was 2 minutes. Further, a viscosity upon the foaming was determined by means of a vibration-type viscosimeter, and it was found that the viscosity of the foamed resin reached 100000 cps when 50 seconds passed after the mixing.

Example 2'

Into a four-neck flask of 500 ml volume equipped with an agitator and a thermoregulator, 115.2 g of 4,4'-diphenylmethane diisocyanate, 264.4 g of EO adduct of polypropylene glycol obtained in Example 2 (Mn: 2000), and 20.4 g of ethylene glycol was put, so as to be reacted at 68° C. over 5 hours, whereby a polyurethane elastomer was obtained. A reaction ratio (consumption ratio) of isocyanate groups during the reaction was 78% when 1 hour passed, 95% when 1.5 hours passed, and 100% when 2 hours passed.

Table 1 below shows the Mn (by gel permeation chromatography), tensile strength, elongation, and ratio of swelling by water absorption of the obtained polyurethane elastomer. The measurement of the tensile strength and elongation was according to JIS K-7311. The water-absorption swelling ratio was determined by immersing a sample in water at 25° C. and measuring a mass increase ratio after 24 hours.

Comparative Example 2'

A polyurethane elastomer was obtained in the same manner as that of Example 2' except that in place of 264.4 g of the EO adduct of polypropylene glycol obtained in Example 2 (Mn: 2000), the EO adduct of polypropylene glycol obtained by Comparative Example 2 (Mn: 2000) was used.

A reaction ratio (consumption ratio) of isocyanate groups during the reaction was 55% when 1 hour passed, 81% when 2 hours passed, 95% when 3 hours passed, and 100% when 4 hours passed.

The Mn, tensile strength, elongation, and water-absorption swelling ratio of the obtained polyurethane elastomer are shown in Table 1.

TABLE 1

| | Example 2' | Comparative Example 2' |
| --- | --- | --- |
| Number Average Molecular Weight | 102,000 | 85,000 |
| Tensile Strength (kg/cm$^2$) | 458 | 356 |
| Elongation (%) | 755 | 753 |
| Water Absorption Swelling Ratio (%) | <0.2 | 2.0 |

As is clear from the comparison between Examples 1', 2', and Comparative Example 1', 2', the polyether compound of the present invention had a higher reactivity with isocyanate groups, as compared with the conventional polyether compound.

Further, as shown in Table 1, the polyurethane elastomer employing the polyether compound of the present invention had a larger molecular weight, and an improved tensile strength in spite of an equal degree of elongation, thereby having excellent resin properties, as compared with the conventional example.

Examples Relating to Resin-Forming Compositions

Example 11

156.8 g of an EO adduct of polypropylene glycol in a liquid state (Mn: 3000) was obtained under the same conditions as those of Example 2. The yield, properties and characteristics thereof were also identical to the same.

Example 12

In an autoclave of 200 ml volume, made of stainless steel and equipped with an agitator and a thermoregulator, 114.0 g of "SANNIX PP-2000" (manufactured by Sanyo Chemical Industries, Ltd.; polypropylene glycol with a Mn of 2000), 0.009 g of tris(pentafluorophenyl)borane was put, and 29.4 g of PO was dropped continuously over 10 hours while a reaction temperature was controlled in a range of 65 to 75° C., followed by aging at 70° C. over 5 hours. After atmospheric distillation was carried out with water added thereto at 105 to 110° C. over 4 hours, vacuum distillation was carried out over 5 hours with water vapor passed therethrough continuously, by keeping the temperature and the pressure at 90 to 100° C. and at 30 to 50 torr, respectively. After stopping the passage of water vapor, 0.1 g of potassium hydroxide was added thereto. Then, dehydration was carried out over 3 hours by raising the temperature to 130° C. and keeping the pressure at 50 torr or below. The primary hydroxyl content of terminal hydroxyl groups of the obtained product was 71%. Subsequently, 29.6 g of EO was dropped over 3 hours while a reaction temperature was controlled in a range of 125 to 135° C., followed by aging at 130° C. for 2 hours. 4.0 g of "KYOWAAD 600" (manufactured by Kyowa Chemical Industry Co., Ltd.; synthetic silicate) and 2.0 g of water were added thereto, and treated over 1 hour at 90° C. After being taken out of the autoclave, the obtained product was filtered with filter paper, and dehydrated under a reduced pressure. As a result, 152.2 g of an EO adduct of polypropylene glycol in a liquid state (Mn: 3000) was obtained. The yield was 88%, the hydroxyl value was 37.5, the content of EO was 16.7 mass %, and the primary hydroxyl content of terminal hydroxyl groups was 91%. The left part of the relationship formula (3) of the requirement (iii) had a value of 5.68, while the right part thereof had a value of 7.98. Therefore, the requirement (iii) was satisfied.

Example 13

In an autoclave of 200 ml volume, made of stainless steel and equipped with an agitator and a thermoregulator, 114.0 g of "SANNIX PP-3000" (manufactured by Sanyo Chemical Industries, Ltd.; polypropylene glycol with a Mn of 3000), 0.01 g of tris(pentafluorophenyl)borane was put, and 38.0 g of PO was dropped continuously over 15 hours while a reaction temperature was controlled in a range of 55 to 65° C., followed by aging at 60° C. over 4 hours. The primary hydroxyl content of terminal hydroxyl groups of the obtained product was 70%. 28.0 g of EO was continuously dropped over 5 hours by controlling the reaction temperature in a range of 55 to 65° C., followed by aging over 5 hours at 60° C. After water was added thereto and it was treated at 70 to 80° C. over 3 hours, vacuum distillation was carried out over 5 hours with water vapor passed therethrough continuously, by keeping the temperature and the pressure at 90 to 100° C. and at 30 to 50 torr, respectively. After stopping the passage of water vapor, dehydration was carried out over 3 hours by raising the temperature to 130° C. and keeping the pressure at 50 torr or below. As a result, 153.0 g of an EO adduct of polypropylene glycol (Mn: 4600) in a liquid state was obtained. The yield was 85%, the hydroxyl value was 24.4, the content of EO was 15 mass %, and the primary hydroxyl content of terminal hydroxyl groups was 95%. The left part of the relationship formula (3) of the requirement (iii) had a value of 7.84, while the right part thereof had a value of 10.40. Therefore, the requirement (iii) was satisfied.

Example 11'

Into an autoclave of a volume of 5 L, 310.2 g of dimethyl terephthalate, 239.3 g of 1,4-butanediol, 440.0 g of the EO adduct of polypropylene glycol of Example 11, 1.60 g of "IRGANOX-1330" (manufactured by Japan Chiba-Geigy Co., Ltd.), and 0.80 g of tetrabutyl titanate were put, and heated from room temperature to 220° C. over 3 hours so that transesterification occurred. Subsequently, over 45 minutes, the internal pressure was gradually decreased to 1 torr or below, while the temperature was raised to 250° C., so that an initial condensation reaction was carried out. The same temperature and pressure were kept over 2 hours so that polymerization was carried out. Then, a resultant product was taken out in a pellet state, whereby a polyester resin was obtained.

Comparative Example 11'

A polyester resin was obtained in the same manner as that of Example 11' except that in place of polypropylene glycol of Example 11, a conventional polypropylene glycol that has a Mn of 2000, does not contain EO, and has a primary hydroxyl content of terminal hydroxyl groups of not more than 5% was employed.

Table 2 below shows the results of measurement of the tensile strength and elongation of the polyester resins of Example 11' and Comparative Example 11' according to JIS K-7311.

The resin obtained from the resin-forming composition of the present invention had an improved tensile strength, as compared with the resin employing the conventional polypropylene glycol.

TABLE 2

|  | Example 11' | Comparative Example 11' |
|---|---|---|
| Tensile Strength (MPa) | 13.0 | 10.2 |
| Elongation (%) | 1100 | 1050 |

Example 12'

933.6 g of the EO adduct of polypropylene glycol of Example 12 and 66.4 g of ethylene glycol were mixed, and 638 g of diphenylmethane-4,4'diisocyanate, which was equivalent to the theoretical amount, was added thereto. The mixture was reacted over 10 minutes at 160° C., and a reaction product in a lump state was taken out, kneaded at 210° C., and pelletized, whereby a thermoplastic urethane resin was obtained.

Comparative Example 12'-1

A thermoplastic urethane resin was obtained in the same manner as that of Example 12' except that in place of the EO adduct of polypropylene glycol of Example 12, a conventional polypropylene glycol having a Mn of 2000, not containing EO, and having a primary hydroxyl content of terminal hydroxyl groups of 5% or less, was used.

Comparative Example 12'-2

A thermoplastic urethane resin was obtained in the same manner as that of Example 12' except that in place of the EO adduct of polypropylene glycol of Example 12, a conventional EO adduct of polypropylene glycol having a Mn of 2000, containing EO at 26%, and having a primary hydroxyl content of terminal hydroxyl groups of 86%, was used.

Table 3 below shows the results of measurement of the tensile strength and elongation of the thermoplastic urethane resins of Example 12' and Comparative Examples 12'-1 and 12'-2 in the same manner as described above, and the mass increase ratio (water-absorption swelling ratio) of the same after immersion in water over 24 hours.

The resin obtained from the resin-forming composition of the present invention exhibited an excellent waterproofness, as compared with the case where a conventional EO adduct of polypropylene glycol (having a high primary hydroxyl content, but containing much EO) was employed. On the other hand, it also had a greater tensile strength, as compared with a conventional polypropylene glycol (containing no EO and having an extremely low primary hydroxyl content).

TABLE 3

|  | Example 12' | Comparative Example 12'-1 | Comparative Example 12'-2 |
| --- | --- | --- | --- |
| Tensile Strength (MPa) | 44.1 | 45.0 | 28.0 |
| Elongation (%) | 760 | 740 | 750 |
| Water-Absorption Swelling Ratio (%) | <0.2 | 2.1 | <0.2 |

Example 13'

In a reactor, 163 g of 2-hydroxyethyl methacrylate, and 0.2 g of monomethyl hydroquinone were put, and 218.3 g of 2,6-toluene diisocyanate was dropped at room temperature over 1 hour so as to be reacted, while the internal temperature was kept at 50 to 55° C. After the dropping was completed, the reaction was continued at 50 to 55° C. until the content of NCO groups became 14 to 15 mass %. Subsequently 0.5 g of dibutyltin dilaurate was added thereto, and while the temperature was kept at 50 to 55° C., 600 g of the EO adduct of polypropylene glycol of Example 12 and 50 g of ethylene glycol was dropped over 1 hour. After the dropping was completed, it was heated to 75 to 80° C., so as to be reacted until the absorption of NCO groups at 2270 cm$^{-1}$ in the infrared absorption spectrum disappeared. As a result, a urethane acrylate compound was obtained. The obtained compound was adjusted with styrene so as to have a non-volatile portion of 74 mass %, and 0.01 part by mass of 6% cobalt naphthenate and 0.1 part by mass of methylethylketone peroxide with respect to 100 parts of the foregoing resin were mixed therein as a curing accelerator. The mixture was cured over 1 hour at 120 to 130° C., whereby an acryl urethane resin was obtained.

Comparative Example 13'

An acryl urethane resin was obtained in the same manner as that of Example 13' except that in place of the EO adduct of polypropylene glycol of Example 12, a conventional polypropylene glycol having a Mn of 3000 and having a primary hydroxyl content of terminal hydroxyl groups of not more than 5% was used.

Table 4 below shows the results of measurement of the tensile strength and elongation of the acryl urethane resins of Example 13' and Comparative Example 13' in the same manner as described above.

TABLE 4

|  | Example 13' | Comparative Example 13' |
| --- | --- | --- |
| Tensile Strength (MPa) | 30.5 | 24.2 |
| Elongation (%) | 12 | 13 |

Example 14'

30 g of the EO adduct of polypropylene glycol of Example 13 and 500 g of bisphenol A diglycidyl ether (epoxy equivalent: 189) were mixed homogeneously, and 1.2 g of benzyl amine was added as a catalyst thereto. The mixture was reacted over 5 hours at 140° C. in a nitrogen gas flow, whereby an epoxy resin having an epoxy equivalent of 203 was obtained. To this reaction product, 5 g of triethylenetetramine was added as a curing agent, and it was left over 7 days so as to be cured. Thus, a cured product was obtained.

Comparative Example 14'

500 g of bisphenol A diglycidyl ether (epoxy equivalent: 189) was mixed homogeneously, and 1.2 g of benzyl amine was added thereto. After agitating the mixture over 5 hours at 140° C. in a nitrogen gas flow, 5 g of triethylenetetramine was added thereto as a curing agent, and was left over 7 days so as to be cured. Thus a cured product was obtained.

Table 5 below shows the results of measurement of the tensile strength, elongation, and water-absorption swelling ratio of the epoxy resin cured products of Example 14' and Comparative Example 14' in the same manner as described above.

The cured product obtained from the resin-forming composition of the present invention had excellent flexibility and softness, as compared with the conventional cured product.

TABLE 5

|  | Example 14' | Comparative Example 14' |
| --- | --- | --- |
| Tensile Strength (MPa) | 22.1 | 24.0 |
| Elongation (%) | 20 | 5 |

EXAMPLES RELATING TO RIGID POLYURETHANE FOAMS

Examples 21 to 24 and Comparative Examples 21 to 25

Production of Box-Type Heat Insulation Member for Refrigerator

Prescribed amounts of materials other than (B) prepared according to the foam recipe shown in Tables 6 and 7 were put in a tank for polyol components of a high-pressure pouring machine, while (B) was put in an isocyanate tank of the same. The temperatures of the both were adjusted to be 20° C., and collision mixing was carried out at 15 MPa. The mixture was injected into a space between an outer wall and an inner wall of a mold, which was prepared beforehand by providing zinc steel plates for exterior and thermoplastic resin plates for interior. The temperature of the space was adjusted 40° C. Thus, box-type heat insulation members for a refrigerator made of urethane foams with a density of 35 kg/m$^3$ were obtained.

Figure 2:
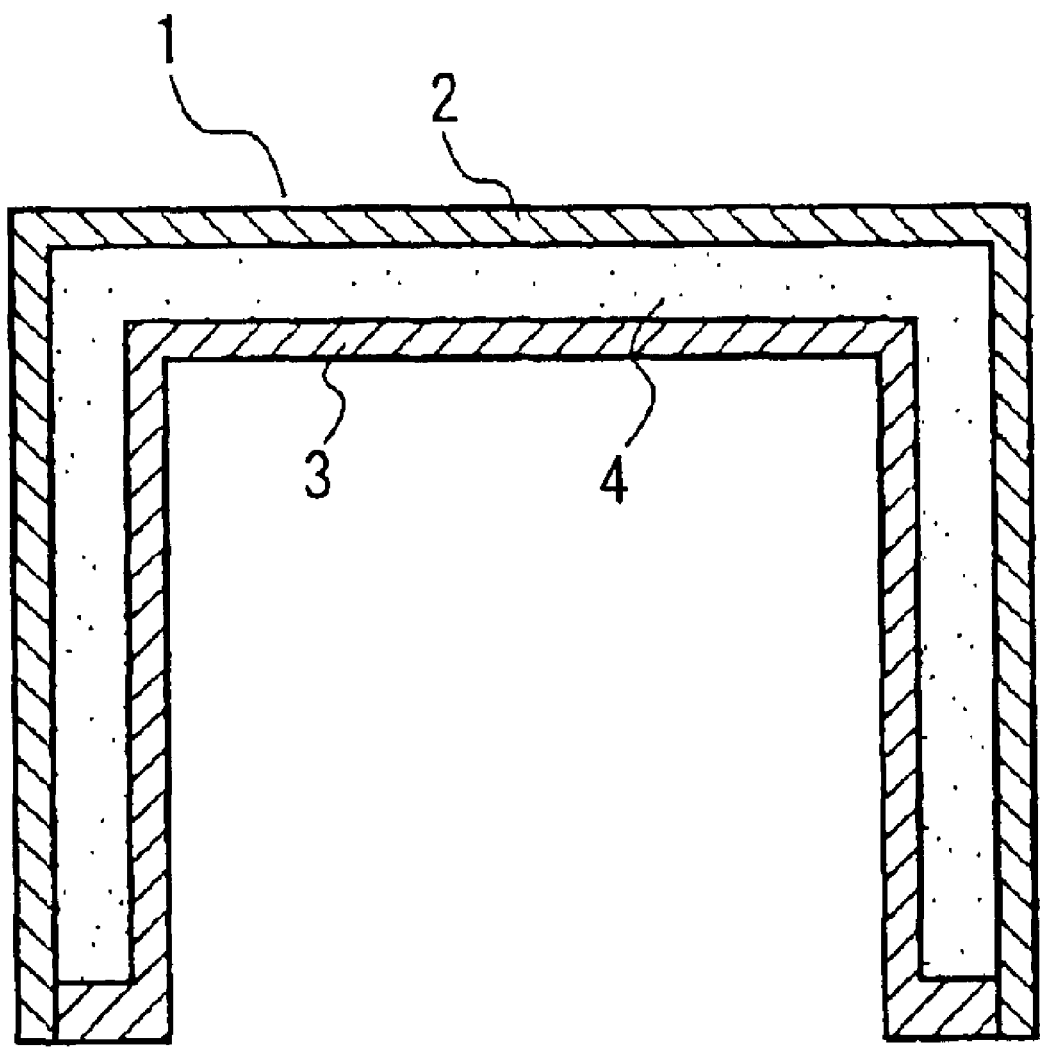
FIG. 2 is a cross-sectional view taken along a broken line in FIG. 1, illustrating a box-type heat insulation member for a refrigerator, obtained after injection of materials according to Examples 21 to 24 and Comparative Examples 21 to 25.

FIG. 1 is an overall view of the box-type heat insulation member. In FIG. 1, 1 denotes the box-type heat insulation member for a refrigerator, 2 denotes the outer wall (made of zinc steel plates), 3 denotes the inner wall (made of a thermoplastic resin), and 4 denotes a rigid polyurethane foam between the inner wall and the outer wall. In FIG. 2, 1 is a cross section of the box-type heat insulation member for refrigerator, 2 denotes the outer wall (made of zinc steel plates), 3 denotes the inner wall (made of a thermoplastic resin), and 4 denotes a rigid polyurethane foam between the inner wall and the outer wall.

Examples 25 to 27 and Comparative Examples 26 to 30

Production of Heat Insulation Panel

Prescribed amounts of materials other than (B) prepared according to the foam recipe shown in Tables 8 and 9 were put in a tank for polyol components of a high-pressure pouring machine, while (B) was put in an isocyanate tank of the same. The temperatures of the both were adjusted to be 20° C., and collision mixing was carried out at 15 MPa. The mixture was injected into a mold whose temperature was adjusted to be 40° C. The mold, prepared beforehand, was made of aluminum in a size of 3000 mm (length)×500 mm (width)×100 mm (height), with zinc steel plates, each in a size of 3000 mm (length)×500 mm (width)×0.3 mm (thickness), being attached to a cope and a drag of the mold. As a result, heat insulation panels made of urethane foams with a density of 34 kg/m³ were obtained.

Examples 28 and 29 and Comparative Examples 31 to 34

Production of Synthetic Wood

Prescribed amounts of materials other than (B) prepared according to the foam recipe shown in Tables 10 and 11 were put in a tank for polyol components of a high-pressure pouring machine, while (B) was put in an isocyanate tank of the same. The temperatures of the both were adjusted to be 20° C., and collision mixing was carried out at 15 MPa. The mixture was injected into a mold whose temperature was adjusted to be 60° C. The mold was made of aluminum in a size of 200 mm (length)×200 mm (width)×100 mm (height). As a result, synthetic woods made of urethane foams with a density of 0.35 kg/m³ were obtained.

<Codes Identifying Materials Used>

(a-1): obtained, in the same manner as that of Example 1, by adding 9 moles of PO to 1 mole of sorbitol employing tris(pentafluorophenyl)boron as a catalyst [quantity of catalyst: 50 ppm (based on a reaction product), reaction temperature: 75° C.], and further adding 1 mole of EO, then, removing the catalyst component.

Mn was 748, the hydroxyl value was 450, the mean number x of moles of added EO per one active hydrogen atom was 0.167, and the primary hydroxyl content y was 46% [the lower limit of y satisfying the formula (2) was 18.0, but the lower limit of y of (a) was 20].

(a-2): obtained, in the same manner as that of Example 1, by adding 4.9 moles of PO to 1 mole of glycerin employing tris(pentafluorophenyl)boron as a catalyst, and thereafter removing the catalyst component.

Mn was 376, the hydroxyl value was 447, the mean number x of moles of added EO per one active hydrogen atom was 0, and the primary hydroxyl content y was 50% [the lower limit of y satisfying the formula (2) was 0, but the lower limit of y of (a) was 20].

(a-3): obtained, in the same manner as that of Example 1, by adding 3.3 moles of PO to 1 mole of glycerin employing tris(pentafluorophenyl)boron as a catalyst, and further adding 2 moles of EO, then, removing the catalyst component.

Mn was 371, the hydroxyl value was 453, the mean number x of moles of added EO per one active hydrogen atom was 0.667, and the primary hydroxyl content y was 62% [the lower limit of y satisfying the formula (2) was 34.0].

(a-4): obtained, in the same manner as that of Example 1, by adding 5.9 moles of PO to 1 mole of pentaerythritol employing tris(pentafluorophenyl)boron as a catalyst, and further adding 0.5 mole of EO, then, removing the catalyst component.

Mn was 500, the hydroxyl value was 449, the mean number x of moles of added EO per one active hydrogen atom was 0.125, and the primary hydroxyl content y was 75% [the lower limit of y satisfying the formula (2) was 15.8, but the lower limit of y of (a) was 20].

(a-5): obtained, in the same manner as that of Example 1, by adding 4.8 moles of PO to 1 mole of pentaerythritol employing tris(pentafluorophenyl)boron as a catalyst, and further adding 2 moles of EO, then, removing the catalyst component.

Mn was 502, the hydroxyl value was 447, the mean number x of moles of added EO per one active hydrogen atom was 0.5, and the primary hydroxyl content y was 85% [the lower limit of y satisfying the formula (2) was 29.9].

(b-1): obtained by adding 2 moles of EO to 1 mole of tolylenediamine without a catalyst, further adding 5 moles of PO employing potassium hydroxide as a catalyst, and neutralizing the catalyst with glacial acetic acid.

Mn was 500, and the active hydrogen value was 449.

(b-2): obtained by adding 2 moles of PO to 1 mole of monoethanolamine without a catalyst, further adding 5.4 moles of PO employing potassium hydroxide as a catalyst, and neutralizing the catalyst with glacial acetic acid.

Mn was 374, and the active hydrogen value was 450.

(r-21): obtained by adding 9 moles of PO to 1 mole of sorbitol employing potassium hydroxide as a catalyst, further adding 1 mole of EO, and neutralizing the catalyst with glacial acetic acid.

Mn was 749, the hydroxyl value was 449, the mean number x of moles of added EO per one active hydrogen atom was 0.167, and the primary hydroxyl content y was 18% [the lower limit of y satisfying the formula (2) was 18.0, but the lower limit of y of (a) was 20].

(r-22): obtained by adding 2.5 moles of PO to 1 mole of sorbitol employing potassium hydroxide as a catalyst, further adding 9.6 moles of EO, and neutralizing the catalyst with glacial acetic acid.

Mn was 749, the hydroxyl value was 449, the mean number x of moles of added EO per one active hydrogen atom was 1.6, and the primary hydroxyl content y was 47% [the lower limit of y satisfying the formula (2) was 50.3].

(r-23): obtained by adding 4.9 moles of PO to 1 mole of glycerin employing potassium hydroxide as a catalyst, and neutralizing the catalyst with glacial acetic acid.

Mn was 376, the hydroxyl value was 447, the mean number x of moles of added EO per one active hydrogen atom was 0, and the primary hydroxyl content y was 2% [the lower limit of y satisfying the formula (2) was 0, but the lower limit of y of (a) was 20].

(r-24): obtained by adding 1 mole of PO to 1 mole of glycerin employing potassium hydroxide as a catalyst, further adding 5.1 moles of EO, and neutralizing the catalyst with glacial acetic acid.

Mn was 374, the hydroxyl value was 450, the mean number x of moles of added EO per one active hydrogen atom was 1.7, and the primary hydroxyl content y was 61% [the lower limit of y satisfying the formula (2) was 51.6].

This product was not regarded as (a), since the number of moles of AO having not less than three carbon atoms added per one 1 mole of primary hydroxyl groups of glycerin was 0.5.

(r-25): obtained by adding 2.2 moles of PO to 1 mole of glycerin employing potassium hydroxide as a catalyst, further adding 3.5 moles of EO, and neutralizing the catalyst with glacial acetic acid.

Mn was 374, the hydroxyl value was 450, the mean number x of moles of added EO per one active hydrogen atom was 1.167, and the primary hydroxyl content y was 41% [the lower limit of y satisfying the formula (2) was 43.8].

(r-26): obtained by adding 5.9 moles of PO to 1 mole of pentaerythritol employing potassium hydroxide as a catalyst, further adding 0.5 mole of EO, and neutralizing the catalyst with glacial acetic acid.

Mn was 502, the hydroxyl value was 447, the mean number x of moles of added EO per one active hydrogen atom was 0.125, and the primary hydroxyl content y was 12% [the lower limit of y satisfying the formula (2) was 15.8, but the lower limit of y of (a) was 20].

(r-27): obtained by adding 2.5 moles of PO to 1 mole of pentaerythritol employing potassium hydroxide as a catalyst, further adding 5 moles of EO, and neutralizing the catalyst with glacial acetic acid.

Mn was 506, the hydroxyl value was 444, the mean number x of moles of added EO per one active hydrogen atom was 1.25, and the primary hydroxyl content y was 77% [the lower limit of y satisfying the formula (2) was 45.2].

This product was not regarded as (a), since the number of moles of AO having not less than three carbon atoms added per one 1 mole of primary hydroxyl groups of pentaerythritol was 0.625.

(r-28): obtained by adding 4.8 moles of PO to 1 mole of pentaerythritol employing potassium hydroxide as a catalyst, further adding 2 moles of EO, and neutralizing the catalyst with glacial acetic acid.

Mn was 502, the hydroxyl value was 447, the mean number x of moles of added EO per one active hydrogen atom was 0.5, and the primary hydroxyl content y was 27% [the lower limit of y satisfying the formula (2) was 29.9].

(r-29): obtained by adding 2 moles of PO to 1 mole of pentaerythritol employing potassium hydroxide as a catalyst, further adding 5.6 moles of EO, and neutralizing the catalyst with glacial acetic acid.

Mn was 498, the hydroxyl value was 451, the mean number x of moles of added EO per one active hydrogen atom was 1.4, and the primary hydroxyl content y was 83% [the lower limit of y satisfying the formula (2) was 47.5].

This product was not regarded as (a), since the number of moles of AO having not less than three carbon atoms added per one 1 mole of primary hydroxyl groups of pentaerythritol was 0.5.

(B-21): crude MDI, as an organic polyisocyanate having a content of NCO of 31%.

(C-21): water (C-22): cyclopentane (C-23): HCFC-141b (D-21): "U-CAT 1000" manufactured by San Apro, Ltd. (tetramethylhexamethylene diamine)

(D-22): "TOYOCAT-ET" manufactured by Tosoh Corporation [mixture of bis(dimethylaminoethyl)ether and dipropylene glycol]

(D-23): "MINICO L-1020" manufactured by Nippon Nyukazai Co., Ltd. (mixture of triethylenediamine and dipropylene glycol)

(D-24): "NEOSTANN U-100" manufactured by Nitto Kasei Co., Ltd. (dibutyltin dilaurate)

(E-21): "B-8462" manufactured by Goldschmidt AG (dimethyl silicon-based foam stabilizer)

(E-22): "SF-2936F" manufactured by Toray Dow Corning Silicone Co., Ltd. (dimethyl silicon-based foam stabilizer)

(E-23): "SH-193" manufactured by Toray Dow Corning Silicone Co., Ltd. (dimethyl silicon-based foam stabilizer)

Test Examples

Tests of Box-Tylpe Heat Insulation Members for Refrigerator

①: thickness (mm) of a molded product when released from a mold 4 minutes after the injection ②: thickness (mm) of a molded product when released from a mold 7 minutes after the injection ③: compression strength (kgf/cm$^2$) of a foam of a molded product that had been released 7 minutes after the injection; the compression strength was measured one day after the release by the method according to JIS-A9511.

Note that the inside dimension of the mold corresponding to the measured dimensions of the products of ①, ② and ③ was 50 mm.

Tests of Heat Insulation Panels

④: thickness (mm) of a molded product when released from a mold 8 minutes after the injection ⑤: thickness (mm) of a molded product when released from a mold 12 minutes after the injection ⑥: compression strength (kgf/cm$^2$) of a foam of a molded product that had been released 12 minutes after the injection; the compression strength was measured one day after the release by the method according to JIS-A9511.

Note that the inside dimension of the mold corresponding to the measured dimensions of the products of ④, ⑤ and ⑥ was 100 mm.

Tests of Synthetic Woods

⑦: thickness (mm) of a molded product when released from a mold 10 minutes after the injection ⑧: thickness (mm) of a molded product when released from a mold 13 minutes after the injection ⑨: compression strength (kgf/cm$^2$) of the foam of the product that had been released 13 minutes after the injection; the compression strength was measured one day after the release by the method according to JIS-A9511.

Note that the inside dimension of the mold corresponding to the measured dimensions of the products of ⑦, ⑧, and ⑨ was 100 mm.

TABLE 6

|        | Example 21 | Example 22 | Example 23 | Example 24 |
|--------|------------|------------|------------|------------|
| (a-1)  | 50         | 50         | 50         | 40         |
| (a-2)  | 10         | —          | —          | 10         |
| (a-3)  | —          | 10         | —          | —          |
| (b-1)  | 40         | 40         | 40         | 40         |
| (b-2)  | —          | —          | 10         | 10         |
| (C-21) | 1          | 1          | 1          | 1          |
| (C-22) | 16         | 16         | 16         | 16         |
| (D-21) | 1.5        | 1.5        | 1.5        | 1.5        |
| (D-22) | 0.4        | 0.4        | 0.4        | 0.4        |
| (E-21) | 2          | 2          | 2          | 2          |
| (B-21) | 136        | 136        | 136        | 136        |
| ①     | 50.5       | 50.3       | 50.5       | 50.2       |
| ②     | 50.2       | 50.1       | 50.2       | 50.1       |
| ③     | 2.1        | 2.0        | 2.0        | 2.1        |

TABLE 7

|  | Comparative Example 21 | Comparative Example 22 | Comparative Example 23 | Comparative Example 24 | Comparative Example 25 |
|---|---|---|---|---|---|
| (b-1) | 40 | 40 | 40 | 40 | 40 |
| (b-2) | — | — | — | 10 | 10 |
| (r-21) | 50 | — | — | 50 | — |
| (r-22) | — | 50 | 50 | — | 50 |
| (r-23) | 10 | — | — | — | — |
| (r-24) | — | 10 | — | — | — |
| (r-25) | — | — | 10 | — | — |
| (C-21) | 1 | 1 | 1 | 1 | 1 |
| (C-22) | 16 | 16 | 16 | 16 | 16 |
| (D-21) | 1.5 | 1.5 | 1.5 | 1.5 | 1.5 |
| (D-22) | 0.4 | 0.4 | 0.4 | 0.4 | 0.4 |
| (E-21) | 2 | 2 | 2 | 2 | 2 |
| (B-21) | 136 | 136 | 136 | 136 | 136 |
| ① | x | 50.5 | 50.6 | x | 50.7 |
| ② | 50.5 | 50.4 | 50.5 | 50.5 | 50.5 |
| ③ | 1.9 | 1.4 | 1.5 | 1.8 | 1.3 | x in the table indicates that it was unmeasureable because the deformation of a foam when relesed from a mold was excessive.

TABLE 8

|  | Example 25 | Example 26 | Example 27 |
|---|---|---|---|
| (a-1) | 30 | 30 | 30 |
| (a-2) | 40 | 40 | — |
| (a-3) | — | — | 40 |
| (b-1) | 30 | — | — |
| (b-2) | — | 30 | 30 |
| (C-21) | 2 | 2 | 2 |
| (C-23) | 27 | 27 | 27 |
| (D-21) | 1.5 | 1.5 | 1.5 |
| (D-23) | 0.3 | 0.3 | 0.3 |
| (E-22) | 1.5 | 1.5 | 1.5 |
| (B-21) | 153 | 153 | 153 |
| ④ | 102.5 | 102.8 | 102.0 |
| ⑤ | 101.2 | 101.4 | 100.9 |
| ⑥ | 1.8 | 1.7 | 1.7 |

TABLE 9

|  | Comparative Example 26 | Comparative Example 27 | Comparative Example 28 | Comparative Example 29 | Comparative Example 30 |
|---|---|---|---|---|---|
| (b-1) | 30 | 30 | — | — | — |
| (b-2) | — | — | 30 | 30 | 30 |
| (r-21) | 30 | — | 30 | — | — |
| (r-22) | — | 30 | — | 30 | 30 |
| (r-23) | 40 | — | 40 | — | — |
| (r-24) | — | 40 | — | 40 | — |
| (r-25) | — | — | — | — | 40 |
| (C-21) | 2 | 2 | 2 | 2 | 2 |
| (C-23) | 27 | 27 | 27 | 27 | 27 |
| (D-21) | 1.5 | 1.5 | 1.5 | 1.5 | 1.5 |
| (D-23) | 0.3 | 0.3 | 0.3 | 0.3 | 0.3 |
| (E-22) | 1.5 | 1.5 | 1.5 | 1.5 | 1.5 |
| (B-21) | 153 | 153 | 153 | 153 | 153 |
| ④ | x | 104.5 | x | 104.8 | 104.7 |
| ⑤ | 102.5 | 103.5 | 103.5 | 103.8 | 104.0 |
| ⑥ | 1.7 | 1.2 | 1.6 | 1.1 | 1.2 | x in the table indicated that it was unmeasurable because the deformation of a foam when released from a mold was excessive.

TABLE 10

|  | Example 28 | Example 29 |
|---|---|---|
| (a-1) | 100 | — |
| (a-2) | — | 100 |
| (C-21) | 0.7 | 0.7 |
| (D-24) | 0.2 | 0.2 |
| (E-23) | 1 | 1 |
| (B-21) | 131 | 131 |
| ⑦ | 104.5 | 103.7 |
| ⑧ | 101.2 | 101.0 |
| ⑨ | 105 | 98 |

TABLE 11

|  | Comparative Example 31 | Comparative Example 32 | Comparative Example 33 | Comparative Example 34 |
|---|---|---|---|---|
| (r-26) | 100 | — | — | — |
| (r-27) | — | 100 | — | — |
| (r-28) | — | — | 100 | — |
| (r-29) | — | — | — | 100 |
| (C-21) | 0.7 | 0.7 | 0.7 | 0.7 |
| (D-24) | 0.2 | 0.2 | 0.2 | 0.2 |
| (E-23) | 1 | 1 | 1 | 1 |
| (B-21) | 131 | 131 | 131 | 131 |
| ⑦ | x | 105.2 | x | 104.8 |
| ⑧ | 104.9 | 102.0 | 104.6 | 102.0 |
| ⑨ | 100 | 68 | 95 | 66 | x in the table indicates that it was unmeasurable because the deformation of a foam when released from a mold was excessive.

EXAMPLES RELATING TO SEMI-RIGID POLYURETHANE FOAMS

Example 41 to 45 and Comparative Examples 41 to 44

Production and Evaluation of Wheels

Prescribed amounts of materials other than (B) prepared according to the foam recipe shown in Tables 12 and 13 were put in a tank for polyol components of a high-pressure pouring machine, while (B) was put in an isocyanate tank of the same. The temperatures of the both were adjusted to be 40° C., and collision mixing was carried out at 15 MPa. The mixture was injected into a mold made of aluminum, in which an iron core was provided therein beforehand, and whose temperature was adjusted to be 60° C. Thus, wheels with urethane foams having a density of 0.5 kg/cm³ were obtained.

Figure 3:
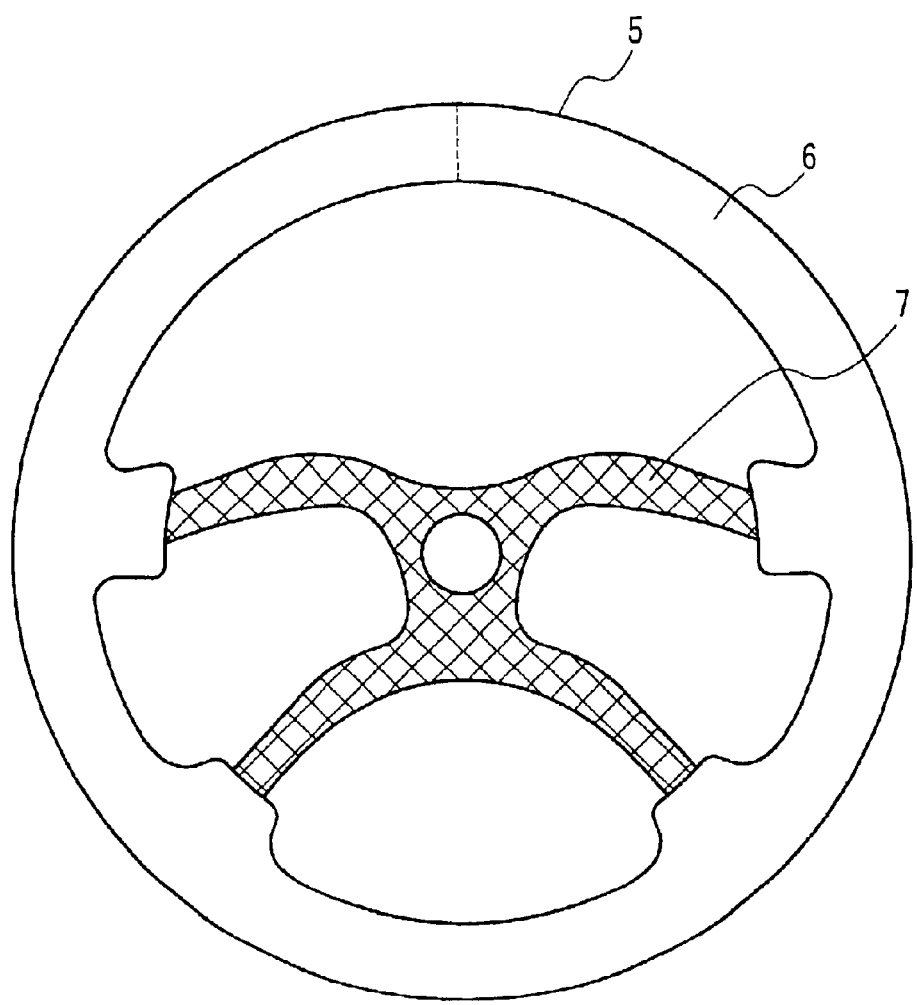
FIG. 3 is a front view illustrating a wheel according to Examples 41 to 45 and Comparative Examples 41 to 44.
Figure 4:
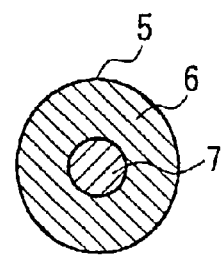
FIG. 4 is a cross-sectional view of the wheel shown in FIG. 3, taken along a broken line in the drawing.

FIG. 3 is an overall view of the wheel. FIG. 4 is a cross-sectional view of the same taken along a broken line in FIG. 3. In FIGS. 3 and 4, 5 denotes the wheel, 6 denotes the urethane foam, and 7 denotes the iron core.

The results of performance tests are shown in Tables 12 and 13.

Example 46 to 53 and Comparative Examples 45 to 48

Production and Evaluation of Instrument Panels

Prescribed amounts of materials other than (B) prepared according to the foam recipe shown in Tables 14 to 16 were put in a tank for polyol components of a high-pressure pouring machine, while (B) was put in an isocyanate tank of the same. The temperatures of the both were adjusted to be 40° C., and collision mixing was carried out at 15 MPa. The mixture was injected into a mold made of aluminum, in which a skin material and a core material were provided beforehand, and whose temperature was adjusted to be 45° C. Thus, instrument panels with urethane foams having a density of 0.16 kg/cm³ were obtained.

Figure 8:
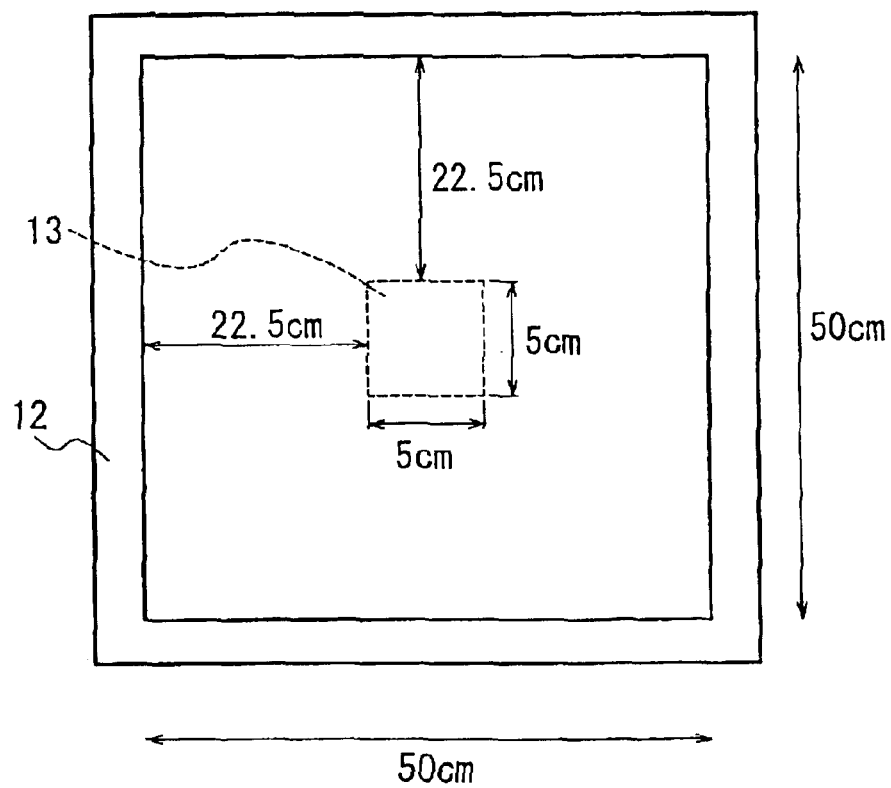
FIG. 8 is a plan view illustrating a position at which a sample for density measurement is taken out from a central portion.

FIG. 5 is an overall view of the instrument panel. FIG. 6 is a cross-sectional view of the same taken along a broken line in FIG. 5. In FIGS. 5 and 6, 8 denotes the instrument panel, 9 denotes the skin material (made of a polyurethane formed by slush molding), 10 denotes the urethane foam, and 11 denotes the core material (made of ABS resin).

The results of performance tests are shown in Tables 14 to 16.

<Codes Expressing Used Materials>

(c-1): polyether polyol obtained, in the same manner as that of Example 1, by adding 84.6 moles of PO to 1 mole of glycerin employing tris(pentafluorophenyl)borane as a catalyst [quantity of catalyst: 50 ppm (based on a reaction product), reaction temperature: 75° C.], and then, removing the catalyst component.

Mn was 5000, the hydroxyl value was 33.7, the mean number x of moles of added EO per one active hydrogen atom was 0, the primary hydroxyl content y was 70% [the lower limit of y satisfying the formula (2) was 0, but the lower limit of y of (c) was 40], and the total unsaturation degree was 0.07 meq/g.

(c-2): polyether polyol obtained, in the same manner as that of Example 1, by adding 76.7 moles of PO to 1 mole of glycerin employing tris(pentafluorophenyl)borane as a catalyst, then adding 10.5 moles of EO, and thereafter removing the catalyst component.

Mn was 5000, the hydroxyl value was 33.7, x was 3.5, y was 90% [the lower limit of y satisfying the formula (2) was 69.2], and the total unsaturation degree was 0.07 meq/g.

(c-3): polyether polyol obtained, in the same manner as that of Example 1, by adding 73.2 moles of PO to 1 mole of glycerin employing tris(pentafluorophenyl)borane as a catalyst, then adding 15 moles of EO, and thereafter removing the catalyst component.

Mn was 5000, the hydroxyl value was 33.7, x was 5, y was 83% [the lower limit of y satisfying the formula (2) was 78.5], and the total unsaturation degree was 0.07 meq/g.

(c-4): polyether polyol obtained, in the same manner as that of Example 1, by adding 57.3 moles of PO to 1 mole of glycerin employing tris(pentafluorophenyl)borane as a catalyst, then adding 36 moles of EO, and thereafter removing the catalyst component.

Mn was 5000, the hydroxyl value was 33.7, x was 12, y was 95% [the lower limit of y satisfying the formula (1) was 94.4], and the total unsaturation degree was 0.06 meq/g.

(c-5): polyether polyol obtained by adding 67.4 moles of PO to 1 mole of glycerin stepwise employing cesium hydroxide as a catalyst [content of catalyst used: 0.6% (based on a reaction product), reaction temperature: 95 to 105° C.] until the Mn became 4000, removing cesium hydroxide by a usual method, then, in the same manner as that of Example 1, adding 17.2 moles of PO employing tris(pentafluorophenyl)borane as a catalyst [quantity of catalyst: 50 ppm (based on a reaction product), reaction temperature: 75° C.], and thereafter removing the catalyst component.

Mn was 5000, the hydroxyl value was 33.7, x was 0, y was 70% [the lower limit of y satisfying the formula (2) was 0, but the lower limit of y of (a) was 40], and the total unsaturation degree was 0.04 meq/g.

(c-6): polyether polyol obtained by adding 50.1 moles of PO to 1 mole of glycerin stepwise employing cesium hydroxide as a catalyst [content of catalyst used: 0.6% (based on a reaction product), reaction temperature: 95 to 105° C.] until the Mn became 3000, removing cesium hydroxide by a usual method, then, in the same manner as that of Example 1, adding 23.1 moles of PO employing tris(pentafluorophenyl)borane as a catalyst [quantity of catalyst: 50 ppm (based on a reaction product), reaction temperature: 75° C.], then, adding 15 moles of EO, and thereafter removing the catalyst component.

Mn was 5000, the hydroxyl value was 33.7, x was 5, y was 83% [the lower limit of y satisfying the formula (2) was 78.6], and the total unsaturation degree was 0.04 meq/g.

(d-1): triethanolamine (active hydrogen value: 1130)
(d-2): ethylene glycol (active hydrogen value: 1810)

(r-41): polyether polyol obtained by adding 84.6 moles of PO to 1 mole of glycerin employing potassium hydroxide as a catalyst, and thereafter removing the catalyst component by a usual method.

Mn was 5000, the hydroxyl value was 33.7, x was 0, y was 2% [the lower limit of y satisfying the formula (2) was 0, but the lower limit of y of (c) was 40], and the total unsaturation degree was 0.07 meq/g.

(r-42): polyether polyol obtained by adding 73.2 moles of PO to 1 mole of glycerin employing potassium hydroxide as a catalyst, then adding 15 moles of EO, and thereafter removing the catalyst component by a usual method.

Mn was 5000, the hydroxyl value was 33.7, x was 5, y was 75% [the lower limit of y satisfying the formula (2) was 78.6], and the total unsaturation degree was 0.07 meq/g.

(r-43): polyether polyol obtained by adding 68.7 moles of PO to 1 mole of glycerin employing potassium hydroxide as a catalyst, then adding 21 moles of EO, and thereafter removing the catalyst component by a usual method.

Mn was 5000, the hydroxyl value was 33.7, x was 7, y was 82% [the lower limit of y satisfying the formula (2) was 87.0], and the total unsaturation degree was 0.06 meq/g.

(r-44): polyether polyol obtained by adding 57.3 moles of PO to 1 mole of glycerin employing potassium hydroxide as a catalyst, then adding 36 moles of EO, and thereafter removing the catalyst component by a usual method.

Mn was 5000, the hydroxyl value was 33.7, x was 12, y was 90% [the lower limit of y satisfying the formula (1) was 94.4], and the total unsaturation degree was 0.06 meq/g.

(r-45) polymer polyol obtained by polymerizing acrylonitrile in the polyether polyol (r-42) over 6 hours at 120 to 130° C. employing azobisisobutylonitrile as a polymerization initiator, the azobisisobutylonitrile being 2% with respect to acrylonitrile, in which the content of polymer was 20% and the hydroxyl value was 24.

(B-41): MDI urethane-modified with polypropylene glycol (Mn=2000), as an organic polyisocyanate having a content of NCO of 26.5%.

(B-42): crude MDI, as an organic polyisocyanate having a content of NCO of 31%.

(C-41): water (D-41): "MINICO L-1020" manufactured by Nippon Nyukazai Co., Ltd. (mixture of triethylenediamine and dipropylene glycol)

(D-42): "TOYOCAT-ET" manufactured by Tosoh Corporation [mixture of bis(dimethylaminoethyl)ether and dipropylene glycol]

(D-43): "TOYOCAT-ETF" manufactured by Tosoh Corporation [mixture of carboxylates of bis(dimethylaminoethyl)ether and dipropylene glycol]

(D-44): "U-CAT 1000" manufactured by San Apro, Ltd. (N,N,N',N'-tetramethylhexamethylenediamine)

Test Examples
Tests of Wheels

<1>: hardness type C of a foam released from a mold 150 seconds after the injection <2>: hardness type C of a foam released from a mold 210 seconds after the injection <3>: hardness type C of a foam one day after the molding <4>: thickness (mm) of a wheel in the case where the release was carried out 150 second after the injection <5>: thickness (mm) of a wheel in the case where the release was carried out 210 seconds after the injection Note that a portion of the iron core corresponding to a portion where <1>to <5>were measured had a thickness of 13 mm, and a portion of the mold corresponding to the same had an inside dimension of 28 mm.

Evaluation of Hardenability: when released from a mold 150 seconds after the injection, the molded foam maintained the wheel shape: ○ did not maintain the wheel shape:×

Evaluation of Swelling upon Release: when released 150 seconds after the injection, a thickness of a molded wheel was less than 29 mm: ○ not less than 29 mm:×

Tests of Instrument Panels

<6>: hardness type C on a skin portion of a foam released from a mold 120 seconds after the injection <7>: hardness type C on a skin portion of a foam one day after the molding <8>: thickness (mm) of a molded product in the case where the release was carried out 120 seconds after the injection <9>: tensile strength (kgf/cm$^2$) of a foam one day after the molding <10>: tensile strength (kgf/cm$^2$) of a foam after a heat resistance test (110° C., 2000 hours)

Note that, in a portion where <6>to <8>were measured, the skin portion had a thickness of 1 mm, and the core material portion had a thickness of 5 mm, and the mold had an inside dimension of 15 mm.

Evaluation of Hardenability: when released from a mold 120 seconds after the injection, the molded foam maintained the instrument panel shape: ○ did not maintain the instrument panel shape:×

Evaluation of Shrinkage upon Release: when released 120 seconds after the injection, a thickness of a molded instrument panel was not less than 14 mm: ○ less than 14 mm:×

<9>and <10>were measured according to JIS K-6301.

TABLE 12

|  | Example 41 | Example 42 | Example 43 | Example 44 | Example 45 |
|---|---|---|---|---|---|
| (c-1) | 85 | — | — | — | — |
| (c-2) | — | 85 | — | 65 | — |
| (c-3) | — | — | 85 | — | — |
| (c-4) | — | — | — | — | 85 |
| (d-1) | 2 | 2 | 2 | 2 | 2 |
| (d-2) | 8 | 8 | 8 | 8 | 8 |
| (r-43) | — | — | — | 20 | — |
| (r-45) | 15 | 15 | 15 | 15 | 15 |

TABLE 12-continued

|  | Example 41 | Example 42 | Example 43 | Example 44 | Example 45 |
|---|---|---|---|---|---|
| (C-41) | 0.35 | 0.35 | 0.35 | 0.35 | 0.35 |
| (D-41) | 0.6 | 0.6 | 0.6 | 0.6 | 0.6 |
| (D-42) | 0.1 | 0.1 | 0.1 | 0.1 | 0.1 |
| (D-43) | 0.1 | 0.1 | 0.1 | 0.1 | 0.1 |
| (B-41) | 56.5 | 56.5 | 56.5 | 56.5 | 56.5 |
| <1> | 28 | 29 | 29 | 28 | 30 |
| <2> | 35 | 37 | 37 | 36 | 39 |
| <3> | 72 | 73 | 73 | 70 | 73 |
| <4> | 28.8 | 28.5 | 28.5 | 28.7 | 28.3 |
| <5> | 28.5 | 28.3 | 28.3 | 28.3 | 28.2 |
| Hardenability | ○ | ○ | ○ | ○ | ○ |
| Swelling upon Release | ○ | ○ | ○ | ○ | ○ |

Table 13

|  | Comparative Example 41 | Comparative Example 42 | Comparative Example 43 | Comparative Example 44 |
|---|---|---|---|---|
| (d-1) | 2 | 2 | 2 | 2 |
| (d-2) | 8 | 8 | 8 | 8 |
| (r-41) | 85 | — | — | — |
| (r-42) | — | 85 | — | — |
| (r-43) | — | — | 85 | — |
| (r-44) | — | — | — | 85 |
| (r-45) | 15 | 15 | 15 | 15 |
| (C-41) | 0.35 | 0.35 | 0.35 | 0.35 |
| (D-41) | 0.6 | 0.6 | 0.6 | 0.6 |
| (D-42) | 0.1 | 0.1 | 0.1 | 0.1 |
| (D-43) | 0.1 | 0.1 | 0.1 | 0.1 |
| (B-41) | 56.5 | 56.5 | 56.5 | 56.5 |
| <1> | 5 | 29 | 26 | 27 |
| <2> | 8 | 37 | 36 | 35 |
| <3> | — | 73 | 69 | 68 |
| <4> | unmeasurable | 29.8 | 30.2 | 30.2 |
| <5> | unmeasurable | 28.9 | 29.1 | 29.3 |
| Hardenability | × | ○ | ○ | ○ |
| Swelling upon Release | unmeasurable | × | × | × |

TABLE 14

|  | Example 46 | Example 47 | Example 48 | Example 49 | Example 50 | Example 51 |
|---|---|---|---|---|---|---|
| (c-1) | — | — | 100 | — | — | — |
| (c-2) | — | — | — | 100 | — | 70 |
| (c-3) | 70 | — | — | — | 100 | — |

TABLE 14-continued

|  | Example 46 | Example 47 | Example 48 | Example 49 | Example 50 | Example 51 |
|---|---|---|---|---|---|---|
| (c-4) | — | 50 | — | — | — | — |
| (c-5) | — | — | — | — | — | — |
| (c-6) | — | — | — | — | — | — |
| (d-1) | — | — | 0.5 | 0.5 | 0.5 | 0.5 |
| (r-43) | — | — | — | — | — | 30 |
| (r-45) | 30 | 50 | — | — | — | — |
| (C-41) | 2.5 | 2.5 | 2.5 | 2.5 | 2.5 | 2.5 |
| (D-41) | 0.3 | 0.3 | 0.2 | 0.2 | 0.2 | 0.2 |
| (D-44) | 1.2 | 1.2 | 08 | 0.8 | 0.8 | 0.8 |
| (B-42) | 47.6 | 47.1 | 49.5 | 49.5 | 49.5 | 49.5 |
| <6> | 23 | 25 | 25 | 27 | 28 | 25 |
| <7> | 60 | 62 | 63 | 61 | 60 | 60 |
| <8> | 14.7 | 14.7 | 14.7 | 14.8 | 14.8 | 14.6 |
| Hardenability | ○ | ○ | ○ | ○ | ○ | ○ |
| Swelling upon Release | ○ | ○ | ○ | ○ | 0 ○ | |
| <9> | 5.0 | 5.0 | 5.2 | 5.3 | 5.0 | 5.1 |
| <10> | 3.4 | 3.2 | 3.4 | 3.5 | 3.3 | 3.6 |

TABLE 15

|  | Example 52 | Example 53 |
|---|---|---|
| (c-1) | — | — |
| (c-2) | — | — |
| (c-3) | — | — |
| (c-4) | — | — |
| (c-5) | 100 | — |
| (c-6) | — | 100 |
| (d-1) | 0.5 | 0.5 |
| (r-43) | — | — |
| (r-45) | — | — |
| (C-41) | 2.5 | 2.5 |
| (D-41) | 0.2 | 0.2 |
| (D-44) | 0.8 | 0.8 |
| (B-42) | 49.5 | 49.5 |
| <6> | 25 | 28 |
| <7> | 63 | 60 |
| <8> | 14.8 | 14.8 |
| Hardenability | ○ | ○ |
| Swelling upon Release | ○ | ○ |
| <9> | 5.2 | 5.1 |
| <10> | 4.3 | 4.3 |

TABLE 16

|  | Comparative Example 45 | Comparative Example 46 | Comparative Example 47 | Comparative Example 48 |
|---|---|---|---|---|
| (d-1) | 0.5 | — | 0.5 | 0.5 |
| (r-41) | 100 | — | — | — |
| (r-42) | — | 50 | — | — |
| (r-43) | — | — | 100 | — |
| (r-44) | — | — | — | 100 |
| (r-45) | — | 50 | — | — |
| (C-41) | 2.5 | 2.5 | 2.5 | 2.5 |
| (D-41) | 0.3 | 0.3 | 0.2 | 0.2 |
| (D-44) | 1.2 | 1.2 | 0.8 | 0.8 |
| (B-41) | 49.5 | 47.2 | 49.5 | 49.5 |
| <6> | 8 | 7 | 22 | 23 |
| <7> | — | — | 60 | 60 |
| <8> | unmeasurable | unmeasurable | 13.5 | 13.2 |
| Hardenability | x | x | ○ | ○ |
| Swelling upon Release | unmeasurable | unmeasurable | x | x |
| <9> | — | — | 4.9 | 5.0 |
| <10> | — | — | 3.2 | 3.2 |

EXAMPLES RELATING TO FLEXIBLE POLYURETHANE FOAMS

Example 61 to 65 and Comparative Examples 61 to 63

Polyurethane foams were foamed in molds according to the foam recipe shown in Table 17, taken out of the molds, and left to stand over a whole day and night. Properties of the obtained polyurethane mold foams were measured, as to the entirety in the case where an apparent density was measured, as to samples cut into a size of 5 cm×5 cm×3 cm in the case where a center portion density was measured, as to samples cut into a size of 5 cm×5 cm×3 cm in the case where a compression set was measured, and as to samples cut into a size of 22 cm×22 cm×5 cm in the case where the other properties were measured. The results of measurement are shown in Tables 17 and 18.

TABLE 17

|  | Example | | | | |
|---|---|---|---|---|---|
|  | 61 | 62 | 63 | 64 | 65 |
| Foaming Recipe | | | | | |
| f1-1 | 80 | | | | |
| f1-2 | | 80 | | 80 | 80 |
| f1-3 | | | 80 | | |
| f2-1 | 20 | 20 | 20 | 20 | 20 |
| e1-1 | | | | | 0.3 |
| e1-2 | | | | | 1.7 |
| Water | 3 | 3 | 3 | 4.8 | 4.8 |
| D-61 | 0.3 | 0.3 | 0.3 | 0.3 | 0.3 |
| D-62 | 0.1 | 0.1 | 0.1 | 01. | 0.1 |
| D-63 | 0.1 | 0.1 | 0.1 | 0.1 | 0.1 |
| E-61 | 1 | 1 | 1 | 1 | 1 |
| E-62 | | | | | 0.1 |
| e2-1 | 2 | 2 | 1 | 2 | 2 |
| e2-2 | 2 | 2 | | 2 | 2 |
| B-61 | 46.6 | 46.6 | 40.1 | 66.4 | 67.5 |
| NCO Index | 105 | 105 | 105 | 105 | 105 |
| Weight Mean of Primary Hydroxyl Content of (f1) and (f2) in Polyol (A) | 70% | 87% | 87% | 87% | 87% |
| Weight Mean of HLB of (f1) and (f2) in Polyol (A) | 4.0 | 5.7 | 4.6 | 5.7 | 5.7 |
| Properties | | | | | |
| ① | Excellent | Excellent | Excellent | Excellent | Excellent |
| ② | 50.0 | 50.2 | 50.1 | 34.5 | 34.5 |
| ②' | 47.0 | 47.1 | 47.2 | 32.2 | 32.0 |
| ③ | 23.0 | 23.2 | 22.9 | 14.3 | 20.1 |
| ④ | 77 | 77 | 78 | 70 | 69 |
| ⑤ | 2.7 | 2.5 | 2.3 | 4.1 | 4.5 |
| ⑥ | 9.7 | 9.1 | 8.3 | 11.5 | 12.6 |

TABLE 18

|  | Comparative Example | | |
|---|---|---|---|
|  | 61 | 62 | 63 |
| Foaming Recipe | | | |
| f1-1 | | | |
| f1-2 | | | |
| f1-3 | | | |
| f2-1 | 20 | 20 | 20 |
| r-61 | 80 | | |
| r-62 | | 80 | 80 |
| Water | 3 | 3 | 4.8 |
| D-61 | 0.3 | 0.3 | 0.3 |
| D-62 | 0.1 | 0.1 | 0.1 |
| D-63 | 0.1 | 0.1 | 0.1 |
| E-61 | 1 | 1 | 1 |
| e2-1 | 2 | 2 | 2 |
| e2-2 | 2 | 2 | 2 |
| B-61 | 46.6 | 46.1 | 65.9 |
| NCO Index | 105 | 105 | 105 |
| Weight Mean of Primary Hydroxyl Content of (f1) and (f2) in Polyol (A) | 15% | 87% | 87% |
| Weight Mean of HLB of (f1) and (f2) in Polyol (A) | 4.0 | 6.8 | 6.8 |
| Properties | | | |
| ① | Unevaluated since foam broke down when foaming | Excellent | Excellent |
| ② | | 50.4 | 35.1 |
| ②' | | 43.0 | 32.0 |
| ③ | | 21.4 | 14.7 |
| ④ | | 74 | 69 |
| ⑤ | | 4.0 | 4.3 |
| ⑥ | | 12.1 | 15.9 |

<Codes Identifying Materials Used>

(f1-1): polyether polyol in which the content of terminal oxyethylene groups was 0 mass %, the hydroxyl value was 28 (mgKOH/g), Mn was 6000, the primary hydroxyl content of terminal hydroxyl groups was 70% [the primary hydroxyl content y was not less than 40% of the lower limit in the fourteenth invention], HLB was 4.0, the total unsaturation degree was 0.065 meq/g. The primary hydroxyl content y was not less than 40% of the lower limit in the fourteenth invention.

It was obtained, in the same manner as that of Example 1 (before the addition of EO), by adding PO to glycerin employing tris(pentafluorophenyl)boron as a catalyst, and thereafter removing the catalyst component.

(f1-2): polyether polyol in which the content of terminal oxyethylene groups was 13 mass %, the hydroxyl value was 28 (mgKOH/g), Mn was 6000, the primary hydroxyl content of terminal hydroxyl groups was 90% [the lower limit of y satisfying the formula (2) was 82.9], HLB was 6.0, the total unsaturation degree was 0.06 meq/g.

It was obtained, in the same manner as that of Example 1, by adding PO to glycerin employing tris(pentafluorophenyl) boron as a catalyst, then, adding EO, and thereafter removing the catalyst component.

(f1-3): polyether polyol in which the content of terminal oxyethylene groups was 10 mass %, the hydroxyl value was 25 (mgKOH/g), Mn was 6500, the primary hydroxyl content of terminal hydroxyl groups was 90% [the lower limit of y satisfying the formula (2) was 79.1], HLB was 4.6, the total unsaturation degree was 0.03 meq/g.

It was obtained by adding PO to glycerin employing cesium hydroxide as a catalyst until Mn became 5000, and after removing cesium hydroxide, in the same manner as that of Example 1, adding PO employing tris(pentafluorophenyl)

boron as a catalyst, then, adding EO, and thereafter removing the catalyst component.

(f2-1): polymer polyol having a hydroxyl value of 24 mgKOH/g, obtained by polymerizing a mixture of acrylonitrile and styrene (mass ratio: 3/7) in the polyether polyol (f1-1) over 6 hours at 120 to 130° C. employing azobisisobutyronitrile as a polymerization initiator, the azobisisobutyronitrile being 2 mass % with respect to a sum of acrylonitrile and styrene.

(r-61): polyether polyol in which the content of terminal oxyethylene groups was 0 mass %, the hydroxyl value was 28 (mgKOH/g), Mn was 6000, the primary hydroxyl content of terminal hydroxyl groups was 3% [y was lower than 40% of the lower limit in the fourteenth invention], HLB was 4.0, the total unsaturation degree was 0.13 meq/g.

It was obtained by adding PO to glycerin employing potassium hydroxide as a catalyst, and thereafter removing the catalyst component by a usual method.

(r-62): polyether polyol in which the content of terminal oxyethylene groups was 22 mass %, the hydroxyl value was 28 (mgKOH/g), Mn was 6000, the primary hydroxyl content of terminal hydroxyl groups was 90% [the lower limit of y satisfying the formula (1) or (2) was 93.7], HLB was 7.4, the total unsaturation degree was 0.06 meq/g.

It was obtained by adding PO to glycerin employing potassium hydroxide as a catalyst, then, adding EO, and thereafter removing the catalyst component by a usual method.

(E1-1): diethylene glycol monoacrylate (E1-2): sorbitol diacrylate (B-61): "CE-729" manufactured by Nippon Polyurethane Industry Co., Ltd., which is an organic polyisocyanate (TDI/crude MDI=80/20, NCO %=44.7).

(D-61): "MINICO L-1020", catalyst manufactured by Nippon Nyukazai Co., Ltd. (33 mass % dipropylene glycol solution of triethylenediamine)

(D-62): "TOYOCAT-F4", catalyst manufactured by Tosoh Corporation (mixture of trimethylaminoethyl piperazine, tetramethylhexamethylenediamine, and imidazole)

(D-63): "Polycat-41", catalyst manufactured by San Apro, Ltd. (trisdimethylaminopropyl-s-triazine)

(E-61): "L-3601", foam stabilizer manufactured by Nippon Unicar Co., Ltd.) (dimethylsiloxane-based foam stabilizer)

(E-62): 31% aqueous solution of t-butyl hydroperoxide (e2-1): diethanolamine (chain extender, crosslinking agent)

(e2-2): triethanolamine (chain extender, crosslinking agent)

<Foaming Condition>

Mold inside dimension: 50 cm×50 cm×10 cm material: aluminum mold temperature: 60±2° C.

Foaming method:

pre-mixing the components other than (B), adding (B) therein, stirring the same for 8 seconds, and then pouring the same in a mold.

Mixing method: hand mixing

Agitator blade rotation: 5000 r.p.m

Raw material temperature: 25±1° C.

<Symbols in "Properties" Column in Tables 17 and 18>

①: appearance of polyurethane foam determined by visual observation

②: apparent density (kg/m³) of polyurethane foam

②': density (kg/m³) at the center of polyurethane foam

Figure 7:
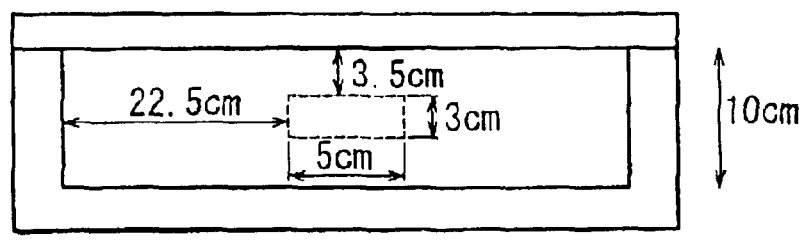
FIG. 7 is a cross-sectional view illustrating a position at which a sample for density measurement is taken out from a central portion.

The center is illustrated in FIGS. 7 and 8. In the drawings, 12 denotes a mold, and 13 denotes an area where a sample for measurement of density was cut out.

②: foam hardness (kgf/314 cm²) of polyurethane foam

④: ball rebound (%) of polyurethane foam

⑤: compression set (%) of polyurethane foam

⑥: wet heat compression set (%) of polyurethane foam (The measurement of the foregoing properties ② to ⑥ was carried out according to JIS K 6401 (1997).)

EXAMPLES RELATING TO FLEXIBLE POLYURETHANE SLAB FOAMS

Example 71 to 74 and Comparative Examples 71 to 76

Polyurethane slab foams were foamed according to the foam recipe shown in Tables 19 and 20, taken out of the molds, and left to stand over a whole day and night. Properties of the obtained polyurethane slab foams were measured, as to samples cut into a size of 5 cm×5 cm×3 cm in the case where a compression set was measured, and as to samples cut into a size of 22 cm×22 cm×5 cm in the case where the other properties were measured. The results of measurement are shown in Tables 19 and 20.

TABLE 19

| | Example | | | |
|---|---|---|---|---|
| Foam Recipe | 71 | 72 | 73 | 74 |
| (A1-71) | 100 | | | |
| (A1-72) | | 100 | | |
| (A1-73) | | | 100 | |
| (A1-74) | | | | 100 |
| (r-71) | | | | |
| (r-72) | | | | |
| (r-73) | | | | |
| (r-74) | | | | |
| (D71) | 0.0 | 0.0 | 0.0 | 0.0 |
| (D72) | 0.1 | 0.1 | 0.1 | 0.1 |
| (C71) | 4.5 | 4.5 | 4.5 | 4.5 |
| (E71) | 1.0 | 0.8 | 1.0 | 0.8 |
| (B71) | 54.8 | 54.8 | 54.8 | 54.8 |
| NCO Index | 105 | 105 | 105 | 105 |
| Foam Properties | | | | |
| Core Density | 24.3 | 24.2 | 24.3 | 24.2 |
| Hardness (25%-ILD) | 10.3 | 10.3 | 10.2 | 10.2 |
| Ball Rebound | 42 | 42 | 41 | 41 |
| Air Permeability | 2.4 | 2.2 | 2.4 | 2.2 |
| Compression Set | 3.1 | 3.5 | 3.3 | 3.6 |

TABLE 20

| | Comparative Example | | | | | |
|---|---|---|---|---|---|---|
| Foam Recipe | 71 | 72 | 73 | 74 | 75 | 76 |
| (A1-71) | | | | | | |
| (A1-72) | | | | | | |
| (A1-73) | | | | | | |
| (A1-74) | | | | | | |
| (r-71) | | | 100 | | | |
| (r-72) | | | | 100 | | |
| (r-73) | 100 | | | | 100 | |
| (r-74) | | 100 | | | | 100 |
| (D71) | 0.15 | 0.15 | 0.0 | 0.0 | 0.0 | 0.0 |
| (D72) | 0.1 | 0.1 | 0.1 | 0.1 | 0.1 | 0.1 |
| (C71) | 4.5 | 4.5 | 4.5 | 4.5 | 4.5 | 4.5 |
| (E71) | 1.0 | 0.8 | 1.0 | 0.8 | 1.0 | 1.8 |
| (B71) | 54.8 | 54.8 | 54.8 | 54.8 | 54.8 | 54.8 |
| NCO Index | 105 | 105 | 105 | 105 | 105 | 105 |

TABLE 20-continued

| | Comparative Example | | | | | |
|---|---|---|---|---|---|---|
| Foam Recipe | 71 | 72 | 73 | 74 | 75 | 76 |
| Foam Properties | | | | | | |
| Core Density | 24.2 | 24.5 | 24.3 | 24.2 | Unmeasurable since foam broke down when foaming | |
| Hardness (25%-ILD) | 11.1 | 11.2 | 4.2 | 4.2 | | |
| Ball Rebound | 34 | 34 | 11 | 10 | | |
| Air Permeability | 2.1 | 2.3 | 2.4 | 2.2 | | |
| Compression Set | 4.2 | 4.2 | 10.0 | 10.5 | | |

<Codes Identifying Materials Used>
*Polyether polyol (A1)

(A1-71): PO adduct of glycerin (hydroxyl value=56, primary hydroxyl content of terminal hydroxyl groups= 70%)

(A1-71): PO-EO (5 mass %)—PO block adduct of glycerin (hydroxyl value=56, primary hydroxyl content of terminal hydroxyl groups=70%)

(A1-73): PO adduct of glycerin (hydroxyl value=56, primary hydroxyl content of terminal hydroxyl groups= 40%)

(A1-74): PO-EO (5 mass %)—PO block adduct of glycerin (hydroxyl value=56, primary hydroxyl content of terminal hydroxyl groups=40%)

(r-71): PO adduct of glycerin (hydroxyl value=56, primary hydroxyl content of terminal hydroxyl groups=30%)

(r-72): PO-EO (5 mass %)—PO block adduct of glycerin (hydroxyl value=56, primary hydroxyl content of terminal hydroxyl groups=30%)

(r-73): PO adduct of glycerin (hydroxyl value=56, primary hydroxyl content of terminal hydroxyl groups=3%)

(r-74): PO-EO (5 mass %)—PO block adduct of glycerin (hydroxyl value=56, primary hydroxyl content of terminal hydroxyl groups=3%)

Note that (A1-71) to (A1-74) were produced, in the same manner as that of Example 1, by adding PO to glycerin employing tris(pentafluorophenyl)boron as a catalyst, then, adding EO and further PO as required, and thereafter removing the catalyst component.

Besides, note that (r-71) to (r-74) were produced by adding PO to glycerin employing potassium hydroxide as a catalyst (0.4 mass % with respect to the sum of glycerin, PO, and EO), then, adding EO and further PO as required, and thereafter removing the catalyst component.

*Organic Polyisocyanate (B)

(B71): TDI, NCO %=48.3 (trade name: "CORONATE T-80", manufactured by Nippon Polyurethane Industry Co., Ltd.)

*Foaming agent (C)

(C71): water

*Catalyst (D)

(D71): tin octanoate (trade name: "NEOSTANN U-28", manufactured by Nitto Kasei Co., Ltd.)

(D72): TEDA (triethylenediamine)

*Foam stabilizer (E)

(E71): dimethylsiloxane-based foam stabilizer (trade name: "L-540", manufactured by Nippon Unicar Co., Ltd.)

<Foaming Condition>

Box size: 350 cm×350 cm×300 cm
Material: wood
Mixing method: hand mixing
Mixing time: 6 seconds
Agitator blade rotation: 5000 r.p.m
Raw material temperature: 25±1° C.

<Descriptions in "Properties" Column in Tables 19 and 20>

* The method for measuring foam properties and the used units are shown below.

Core density: according to JIS K6401: 1997; unit: kg/m$^3$
Hardness (25%-ILD): according to JIS K6401; unit: kgf
Ball rebound: according to JIS K6401; unit: %
Compression set: according to JIS K6401; unit: %

* The polyurethane slab foams were evaluated by visual observation of polyurethane foams after foaming.

INDUSTRIAL APPLICABILITY

The polyether compounds of the first through third invention, when used as polyol components, have an effect of providing resins with a high reaction rate and excellent resin properties (tensile strength, flexural strength, water-absorption swelling ratio, etc.).

The resin-forming compositions of the fourth invention provide the following effects:

(1) cured products of the compositions have excellent flexibility, softness, and low-temperature rubber-like elasticity;

(2) excellent waterproofness (water-absorption swelling ratio) is obtained, as compared with that of the cases employing conventional EO-added polyethers; and (3) desired resin properties are obtained with a shorter reaction time, as compared with the cases employing conventional polyethers, thereby providing improved productivity.

By the method for producing rigid polyurethane foams according to the present invention, rigid polyurethane foams with more excellent hardenability and a smaller degree of swelling when released from a mold, and a greater foam strength than conventionally can be produced.

Since they have the foregoing effects, the rigid polyurethane foams obtained by the method of the present invention are significantly effective for heat insulation materials for refrigerators, freezers, and construction materials.

By the method for producing semi-rigid polyurethane foams according to the present invention, foams with excellent hardenability can be obtained when molded with a real mold, and they do not swell nor shrink when released from molds, as compared with the conventional methods.

Since they have the foregoing effects, the semi-rigid polyurethane foams obtained by the method of the present invention are widely used in shock absorbing materials and cushioning materials provided inside interiors of cars (wheels, instrument panels, sun visors, door trims, sheets, pillars, etc.).

By the method for producing flexible polyurethane foams according to the present invention, flexible polyurethane foams with a uniform density can be obtained without the impairment of moisture resistant properties, as compared with the methods in which conventional polyether polyols are used.

By the method for producing flexible polyurethane slab foams according to the present invention, polyurethane slab foams with significantly excellent foaming stability can be obtained, as compared with the cases employing conventional polyether polyols. Furthermore, since significantly stable foam properties can be realized without employing heavy-metal catalysts, it is possible to produce polyurethane foams at a low cost with extremely small influence on the environment.

What is claimed is:

1. A polyether polyol obtained by block addition or random and block addition of an alkylene oxide to an active hydrogen compound, the alkylene oxide including a 1,2-alkylene oxide having not less than three carbon atoms as a principal constituent and also including ethylene oxide, the polyether polyol being a terminal ethylene oxide adduct, wherein a primary hydroxyl content of terminal hydroxyl groups of polyether polyol before the addition of terminal ethylene oxide is not less than 40%, and wherein a mean number x of moles of the added ethylene oxide per one active hydrogen atom is not more than 20, a primary hydroxyl content y of terminal hydroxyl groups is not less than 40%, and x and y satisfy a relationship expressed by a formula (1) shown below when x is 10 to 20, and satisfy a relationship expressed by a formula (2) shown below when x is not more than 10:

$$y \geq 0.328x + 90.44 \tag{1}$$

$$y > 42x^{0.47}(1-x/41) \tag{2}$$

2. A monohydroxy or polyhydroxy polyether that is obtained by adding an ethylene oxide to terminal hydroxyl groups of a polyoxyalkylene polyol or monool (j) and that satisfies requirements (i) to (iii) shown below, wherein the polyoxyalkylene polyol or monool (j) is expressed by a formula (4) shown below, and not less than 40% (not less than 60% in the case of a monool) of —AO—H groups of the polyoxyalkylene polyol or monool (j), as hydroxyl-group-containing groups positioned at terminals, are primary-hydroxyl-group-containing groups expressed by a formula (5) shown below:

(i) a mean number x of moles of the added ethylene oxide per one hydroxyl group is not more than 20;

(ii) a primary hydroxyl content y of terminal hydroxyl groups is not less than 60% in the case of a monohydroxy polyether, and not less than 40% in the case of a polyhydroxy polyether;

$$\text{(iii) } x \leq 5.5 \times z - 6.5 \times \text{Ln}(z) - 6.46 \tag{3}$$

where z represents 1.03−y/100, and Ln(z) represents a natural logarithm of z,

$$R^1\text{—}[\text{—}(ZO)_p\text{—}(AO)_q\text{—}H]_m \tag{4}$$

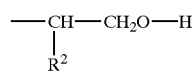
$$\tag{5}$$

where, in (4)

R$^1$ represents a m-valent group, which is obtained by removing active hydrogen from water, an alcohol compound, a phenol compound, an amine compound, a carboxylic acid compound, a thiol compound, or a phosphoric acid compound, Z represents an alkylene group or a cycloalkylene group having 2 to 12 carbon atoms, which may be substituted with a halogen atom or an aryl group, A represents an alkylene group having 3 to 12 carbon atoms, which may be substituted with a halogen atom or an aryl group, m represents a number of 1 or 2 to 100, p represents a number of 0 or not less than 1 q represents a number of not less than 1 in average, and p+q is 1 to 200 in average, and, in (5)

R$^2$ represents an alkyl group having 1 to 10 carbon atoms or an aryl group having 6 to 10 carbon atoms, which may be substituted with a halogen atom.

3. A polyether polyol obtained by block addition or random and block addition of an alkylene oxide to an active hydrogen compound, the alkylene oxide including 1,2-alkylene oxides having not less than three carbon atoms as a principal constituent and also including an ethylene oxide, the polyether polyol being a terminal ethylene oxide adduct, wherein a primary hydroxyl content of terminal hydroxyl groups of polyether polyol before the addition of terminal ethylene oxide is not less than 40%, and wherein a hydrophilic-lipophilic balance (HLB) and a primary hydroxyl content (%) of terminal hydroxyl groups of the polyether polyol satisfy a relationship expressed by a formula (6) shown below:

$$(HLB) \leq 0.1 \times (\text{primary hydroxyl content}) - 2 \tag{6}$$

4. An active hydrogen component for production of a rigid polyurethane foam, the active hydrogen component comprising a polyether polyol (a1), the polyether polyol (a1) comprising a polyether polyol obtained by further adding an ethylene oxide to a polyether polyol that is obtained by adding a 1,2-alkylene oxide having not less than three carbon atoms to a polyhydric alcohol so that not less than 1 mole of the 1,2-alkylene oxide is added per one primary hydroxyl group, wherein a primary hydroxyl content of terminal hydroxyl groups of polyether polyol constituting (a1), obtained by adding 1,2-alkylene oxide having not less than three carbon atoms, is not less than 40%, and wherein, in the polyether polyol (a1), a hydroxyl value is not less than 200, a mean number x of moles of the added ethylene oxide per one active hydrogen atom is not more than 2, a primary hydroxyl content y is not less than 20%, and x and y satisfy a relationship expressed by a formula (2) shown below:

$$y \geq 42x^{0.47}(1-x/41) \tag{2}$$

5. An active hydrogen component for production of a rigid polyurethane foam, the active hydrogen component comprising an active hydrogen compound (b) and a polyether polyol (a), wherein the active hydrogen compound (b) is obtained by adding an alkylene oxide having not less than 2 carbon atoms to an amine and that has a value of an active hydrogen containing group of not less than 200, and the polyether polyol (a) comprises a polyether polyol that is obtained by adding a 1,2-alkylene oxide having not less than three carbon atoms to a polyhydric alcohol so that not less than 1 mole of the 1,2-alkylene oxide is added per one mole of primary hydroxyl groups, and/or a polyether polyol that is obtained by further adding an ethylene oxide to said polyether polyol, wherein a primary hydroxyl content of terminal hydroxyl groups of polyether polyol constituting (a), obtained by adding 1,2-alkylene oxide having not les than three carbon atoms, is not less than 40%, and wherein, in the polyether polyol (a), a hydroxyl value is not less than 200, a mean number x of moles of the added ethylene oxide per one active hydrogen atom is not more than 2, a primary hydroxyl content y is not less than 40%, and x and y satisfy a relationship expressed by a formula (2) shown below:

$$y \geq 42x^{0.47}(1-x/41) \quad (2).$$

6. An active hydrogen component for production of a semi-rigid polyurethane foam, the active hydrogen component comprising a polyether polyol (c1) that is obtained by block addition or random and block addition of an alkylene oxide that includes a 1,2-alkylene oxide having not less than three carbon atoms as a principal constituent and also includes ethylene oxide, wherein (c1) is a terminal ethylene oxide adduct and has a primary hydroxyl content of terminal hydroxyl groups of polyether polyol before the addition of terminal ethylene oxide is not less than 40%, and wherein, in the polyether polyol (c1), a mean number x of moles of the added ethylene oxide per one active hydrogen atom is not more than 20, a primary hydroxyl content y is not less than 40%, and x and y satisfy a relationship expressed by a formula (1) shown below when x is 10 to 20, and satisfy a relationship expressed by a formula (2) shown below when x is not more than 10:

$$y \geq 0.328x+90.44 \quad (1)$$

$$y \geq 42x^{0.47}(1-x/41) \quad (2).$$

7. An active hydrogen component for production of a semi-rigid polyurethane foam, the active hydrogen component comprising a polyether polyol (c) and an active hydrogen compound (d), wherein the active hydrogen compound (d) has a value of active hydrogen containing groups of not less than 250, and the polyether polyol (c) is obtained by addition of an alkylene oxide that includes a 1,2-alkylene oxide having not less than three carbon atoms as a principal constituent, wherein (c) is a polyether polyol obtained by adding 1,2-alkylene oxide having not less than three carbon atoms to an active hydrogen compound and/or polyether polyol obtained by further adding ethylene oxide to the polyol and a primary hydroxyl content of terminal hydroxyl groups of the 1,2-alkylene oxide adduct is not less than 40%, and wherein, in the polyether polyol (c), a hydroxyl value is 10 to 200, a mean number x of moles of an added ethylene oxide per one active hydrogen atom is not more than 20, a primary hydroxyl content y is not less than 40%, and x and y satisfy a relationship expressed by a formula (1) shown below when x is 10 to 20, and satisfy a relationship expressed by a formula (2) shown below when x is not more than 10:

$$y \geq 0.328x+90.44 \quad (1)$$

$$y \geq 42x^{0.47}(1-x/41) \quad (2).$$

8. The active hydrogen component for production of a semi-rigid polyurethane foam according to claim 6, wherein a total unsaturation degree of (a) or (a1) is not more than 0.05 meq/g.

9. A resin-forming composition, comprising a monohydroxy or polyhydroxy polyether (K), a compound (L) reactive with a hydroxyl group, and as needed, another component (M) reactive with (K) and/or (L), wherein the monohydroxy or polyhydroxy polyether (K) is obtained by adding an ethylene oxide to terminal hydroxyl groups of a polyoxyalkylene polyol or monool (j), and satisfies requirements (i) to (iii) shown below, wherein the polyoxyalkylene polyol or monool (j) is expressed by a formula (4) shown below, and not less than 40% (not less than 60% in the case of a monool) of —AO—H groups of the polyoxyalkylene polyol or monool (j), as hydroxyl-group-containing groups positioned at terminals, are primary-hydroxyl-group-containing groups expressed by a formula (5) shown below:

(i) a mean number x of moles of the added ethylene oxide per one hydroxyl group is not more than 20;

(ii) a primary hydroxyl content y of a terminal hydroxyl groups is not less than 60% in the case of a monohydroxy polyether, and not less than 40% in the case of a polyhydroxy polyether;

(iii) $x \leq 5.5 \times z - 6.5 \times \mathrm{Ln}(z) - 6.46$ \quad (3)

where z represents 1.03−y/100, and Ln(z) represents a natural logarithm of z,

where, in (4)

$R^1$ represents a m-valent group, which is obtained by removing active hydrogen from water, an alcohol compound, a phenol compound, an amine compound, a carboxylic acid compound, a thiol compound, or a phosphoric acid compound, Z represents an alkylene group or a cycloalkylene group having 2 to 12 carbon atoms, which may be substituted with a halogen atom or an aryl group, A represents an alkylene group having 3 to 12 carbon atoms, which may be substituted with a halogen atom or an aryl group, m represents a number of 1 or 2 to 100, p represents a number of 0 or not less than 1 q represents a number of not less than 1 in average, and p+q is 1 to 200 in average, and, in (5)

$R^2$ represents an alkyl group having 1 to 10 carbon atoms or an aryl group having 6 to 10 carbon atoms, which may be substituted with a halogen atom.

10. The resin-forming composition according to claim 9, wherein (L) is at least one compound selected from the group consisting of polyisocyanates, polycarboxylic acids, ester-forming derivatives of the polycarboxylic acids, and polyepoxides.

11. The resin-forming composition according to claim 10, wherein (K) is a high-molecular-weight polyol, (L) is an aromatic dicarboxylic acid or an ester-forming derivative of the aromatic dicarboxylic acid, and (M) is a low-molecular-weight diol.

12. The resin-forming composition according to claim 10, wherein (K) is a polyol, and (L) is a dicarboxylic acid having a polymerizable unsaturated group or an ester-forming derivative of the dicarboxylic acid.

13. The resin-forming composition according to claim 10, wherein (K) is a high-molecular-weight polyol, (L) is a polyisocyanate, and (M) is a low-molecular-weight polyol.

14. The resin-forming composition according to claim 10, wherein (K) is a polyol, (L) is a dicarboxylic acid or an ester-forming derivative of the dicarboxylic acid, and (M) is a compound having one or more hydroxyl groups and one or more polymerizable unsaturated groups in one molecule.

15. The resin-forming composition according to claim 10, wherein (K) is a diol, (L) is a diisocyanate, and (M) is a compound having one or more hydroxyl groups and one or more polymerizable unsaturated groups in one molecule.

16. The resin-forming composition according to claim 10, wherein (K) is a polyol having 2 to 8 functional groups, and (L) is a polyepoxide.

17. The resin-forming composition according to claim 9, wherein (K) is a monool or a diol, (L) is a monocarboxylic acid having a polymerizable unsaturated group, or an ester-forming derivative of the monocarboxylic acid.

18. A method for producing a rigid polyurethane foam, the method comprising the step of adding an active hydrogen compound (A), an organic polyisocyanate (B), a foaming agent (C), a urethanation catalyst (D), and, as needed, an additive (E), so as to be foamed and cured, wherein (A) comprises the active hydrogen component according to claim 4.

19. A method for producing a rigid polyurethane foam, the method comprising the step of adding an active hydrogen compound (A), an organic polyisocyanate (B), a foaming agent (C), a urethanation catalyst (D), and, as needed, an additive (E), so as to be foamed and cured, wherein (A) comprises the active hydrogen component according to claim 5.

20. The method for producing a rigid polyurethane foam according to claim 19, wherein a content of (b) is 5 to 80 mass % based on a sum of (a) and (b).

21. A method for producing a semi-rigid polyurethane foam, the method comprising the step of adding an active hydrogen compound (A), an organic polyisocyanate (B), a foaming agent (C), a urethanation catalyst (D), and, as needed, an additive (E), so as to be foamed and cured, wherein (A) comprises the active hydrogen component according to claim 6.

22. A method for producing a semi-rigid polyurethane foam, the method comprising the step of adding an active hydrogen compound (A), an organic polyisocyanate (B), a foaming agent (C), a urethanation catalyst (D), and, as needed, an additive (E), so as to be foamed and cured, wherein (A) comprises the active hydrogen component according to claim 7.

23. The method for producing a semi-rigid polyurethane foam according to claim 22, wherein a content of (d) is 0.1 to 30 mass % based on a sum of (c) and (d).

24. The method for producing a semi-rigid polyurethane foam according to claim 21, wherein a total unsaturation degree of (c) or (c1) is not more than 0.05 meq/g.

25. A method for producing a flexible polyurethane foam, the method comprising the step of reacting an active hydrogen compound comprising a polyol (A1) with an organic polyisocyanate (B) in the presence of a foaming agent (C1) comprising water, a urethanation catalyst (D), and a foam stabilizer (E1), wherein a hydrophilic-lipophilic balance (HLB) of a polyether polyol contained in (A1) and a primary hydroxyl content (%) of terminal hydroxyl groups of the polyether polyol contained in (A1) satisfy a relationship expressed by a formula (6) shown below:

$$(HLB) \leq 0.1 \times (\text{primary hydroxyl content}) - 2 \quad (6)$$

wherein (A1) is propylene oxide adduct, 1,2-butylene oxide adduct, or terminal ethylene oxide adduct of these adducts, and a primary hydroxyl content of terminal hydroxyl groups of polyether polyol in a state in which terminal ethylene oxide is not added is not less than 40%.

26. A method for producing a flexible polyurethane foam, the method comprising the step of reacting an active hydrogen compound comprising a polyol (A1) with an organic polyisocyanate (B) in the presence of a foaming agent (C1) comprising water, a urethanation catalyst (D), and a foam stabilizer (E1), wherein (A1) comprises a polyether polyol (c) obtained by addition of an alkylene oxide that includes a 1,2-alkylene oxide having not less than three carbon atoms as a principal constituent, wherein, in the polyether polyol (c), a mean number x of moles of the added ethylene oxide per one active hydrogen atom is not more than 20,
a primary hydroxyl content y is not less than 40%, and
x and y satisfy a relationship expressed by a formula (1) shown below when x is 10 to 20, and satisfy a relationship expressed by a formula (2) shown below when x is not more than 10:

$$y \geq 0.328x + 90.44 \quad (1)$$

$$y \geq 42x^{0.47}(1 - x/41) \quad (2)$$

wherein (c) is a polyether polyol obtained by adding a 1,2-alkylene oxide having not less than three carbon atoms to an active hydrogen compound and/or polyether polyol obtained by further adding ethylene oxide and a primary hydroxyl content of terminal hydroxyl groups of the 1,2-alkylene oxide adduct is not less than 40%.

27. The method for producing a flexible polyurethane foam according to claim 25, wherein a mean number of hydroxyl groups per one molecule of the polyether polyol contained in (A1) is 2 to 4, and a hydroxyl value thereof is 15 to 40 mgKOH/g.

28. The method for producing a flexible polyurethane foam according to claim 25, wherein a total unsaturation degree of the polyether polyol contained in (A1) is not more than 0.05 meq/g.

29. The method for producing a flexible polyurethane foam according to claim 25, wherein the active hydrogen compound further includes an active hydrogen compound containing a terminal radical-polymerizable-functional group (e1).

30. A method for producing a flexible polyurethane slab foam, the method comprising the step of reacting an active hydrogen compound comprising a polyol (A1) with an organic polyisocyanate (B) in the presence of a foaming agent (C), a catalyst (D), a foam stabilizer (E1), and, as needed, another additive (E2), wherein (A1) is a polyether polyol in which not less than 40% of —AO—H groups, as hydroxyl-group-containing groups positioned at terminals, are primary-hydroxyl-group-containing groups expressed by a formula (5) shown below:

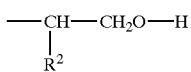 (5)

where

A represents an alkylene group having 3 to 12 carbon atoms, which may be substituted with a halogen atom or an aryl group, and $R^2$ represents an alkyl group having 1 to 10 carbon atoms or an aryl group having 6 to 10 carbon atoms, which may be substituted with a halogen atom.

31. The method for producing a flexible polyurethane slab foam according to claim 30, wherein the catalyst (D) is at least one selected from the group consisting of carboxylates of alkali metals or alkali earth metals, alkoxides of alkali metals or alkali earth metals, phenoxides of alkali metals or alkali earth metals, tertiary amines, and quaternary ammonium salts.

32. The method for producing a flexible polyurethane slab foam according to claim 30, wherein (A1) is a polyether polyol having 2 to 4 hydroxyl groups in average and having a hydroxyl value of 30 to 110 mgKOH/g.

33. A heat insulation material or structure material for use in construction materials, household electric appliances, or transport vehicles, the material comprising the rigid polyurethane foam obtained by the method according to claim 18.

34. A shock absorbing material or cushioning material employed inside interiors of cars, the material comprising the semi-rigid polyurethane foam obtained by the method according to claim 21.

35. A flexible polyurethane foam obtained by the method according to claim 25, the polyurethane foam having a core density of 20 to 33 kg/m$^3$, and a wet heat compression set of not more than 15%.

* * * * *

UNITED STATES PATENT AND TRADEMARK OFFICE
CERTIFICATE OF CORRECTION

PATENT NO.    : 6,831,112 B2
DATED         : December 14, 2004
INVENTOR(S)   : Kaku et al.

It is certified that error appears in the above-identified patent and that said Letters Patent is hereby corrected as shown below:

Column 77,
Line 24, "$y>42x^{0.47}$" should read -- $y \geq 42x^{0.47}$ --.

Column 78,
Line 65, "having not les than three carbon atoms" should read -- having not less than three carbon atoms --.

Signed and Sealed this

Twenty-eighth Day of March, 2006

JON W. DUDAS
*Director of the United States Patent and Trademark Office*